(12) United States Patent
Havens et al.

(10) Patent No.: US 8,915,444 B2
(45) Date of Patent: Dec. 23, 2014

(54) IMAGING MODULE HAVING LEAD FRAME SUPPORTED LIGHT SOURCE OR SOURCES

(75) Inventors: William H. Havens, Syracuse, NY (US); David Stewart Pitou, Santa Rosa, CA (US); Laurence Ray McColloch, Santa Clara, CA (US); Charles Paul Barber, Fayetteville, NY (US); Colleen Patricia Gannon, Jordan, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 1952 days.

(21) Appl. No.: 12/075,509

(22) Filed: Mar. 12, 2008

(65) Prior Publication Data

US 2008/0223934 A1    Sep. 18, 2008

Related U.S. Application Data

(60) Provisional application No. 60/906,726, filed on Mar. 13, 2007.

(51) Int. Cl.
*G06K 7/10*    (2006.01)

(52) U.S. Cl.
CPC .............................. *G06K 7/10712* (2013.01)
USPC .............................. 235/462.42; 235/462.43

(58) Field of Classification Search
USPC ................. 235/462.42, 454, 462.43
See application file for complete search history.

(56) References Cited

U.S. PATENT DOCUMENTS

| | | | |
|---|---|---|---|
| 5,202,775 A | 4/1993 | Feldman et al. | |
| 5,834,754 A * | 11/1998 | Feng et al. | 235/472.01 |
| 6,060,722 A | 5/2000 | Havens et al. | |
| 6,547,423 B2 | 4/2003 | Marshall et al. | |
| 6,832,725 B2 | 12/2004 | Gardiner et al. | |
| 6,905,361 B2 | 6/2005 | Dorrhofer et al. | |
| 2007/0069030 A1 | 3/2007 | Sauerwein, Jr. et al. | |
| 2008/0093456 A1* | 4/2008 | Pasik et al. | 235/454 |

* cited by examiner

*Primary Examiner* — Daniel Hess
(74) *Attorney, Agent, or Firm* — Additon, Higgins & Pendleton, P.A.

(57) ABSTRACT

An imaging module for data collection devices, such as bar code scanners. The module includes an aiming or illumination light source or sources, seated on a support is mounted in a housing. The support is fixed in the housing to provide for its precise placement therein, in a predetermined position.

25 Claims, 41 Drawing Sheets

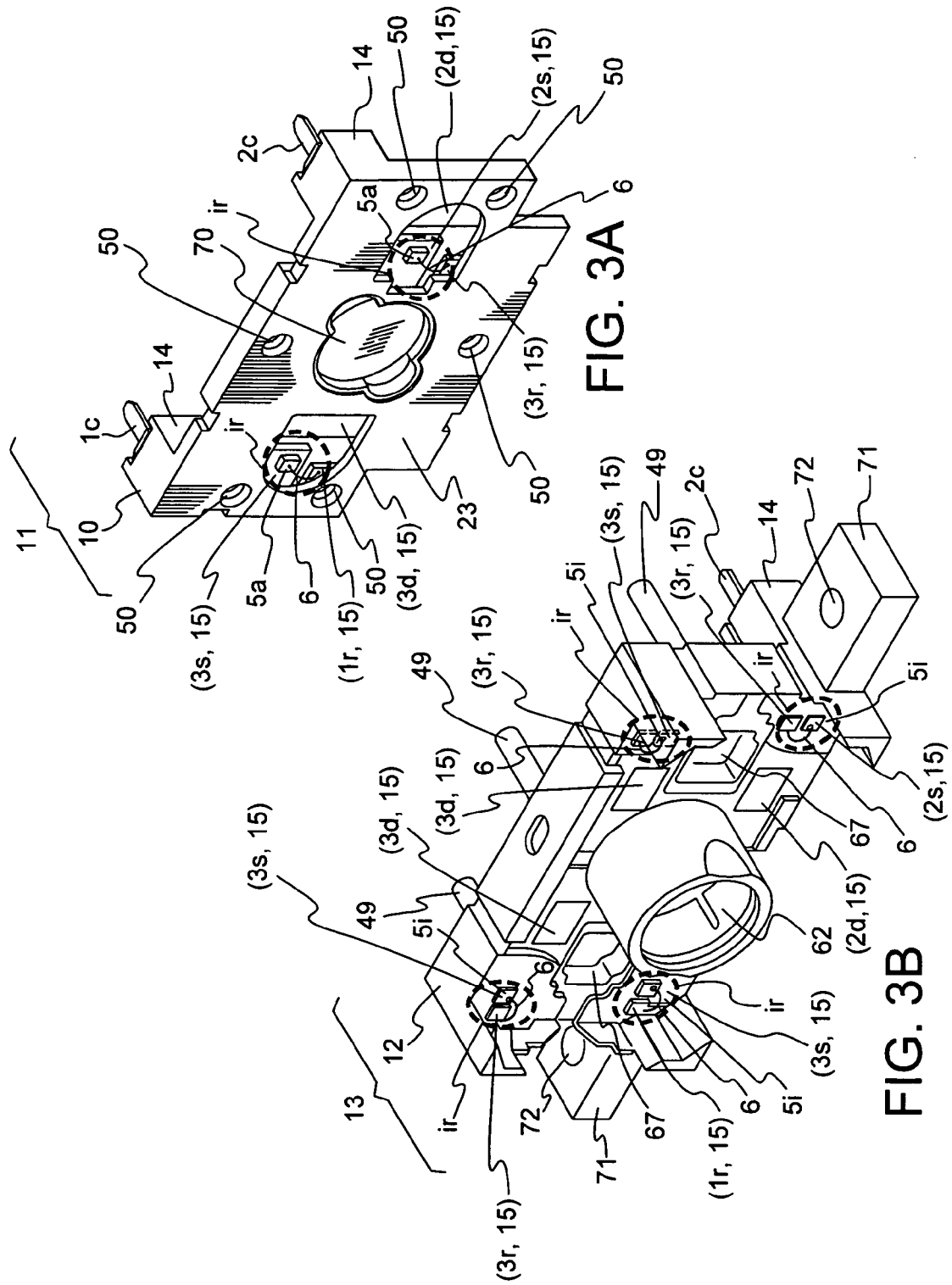

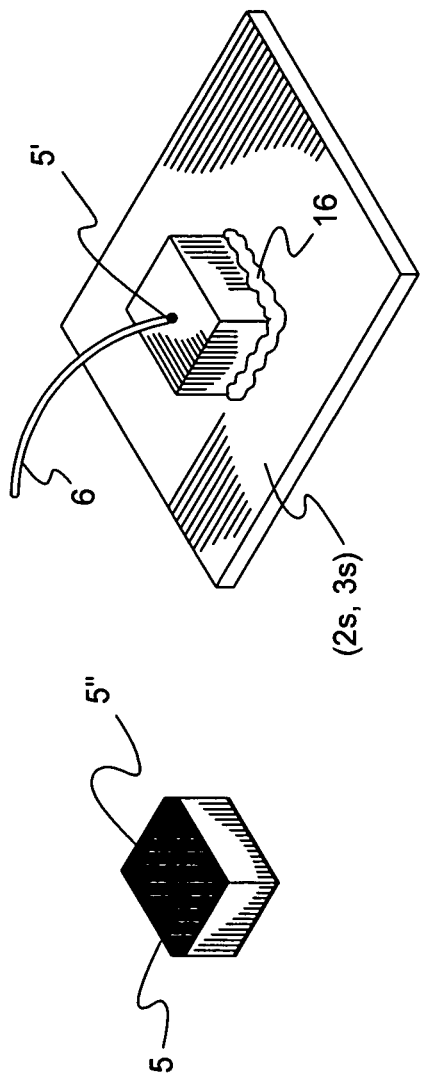
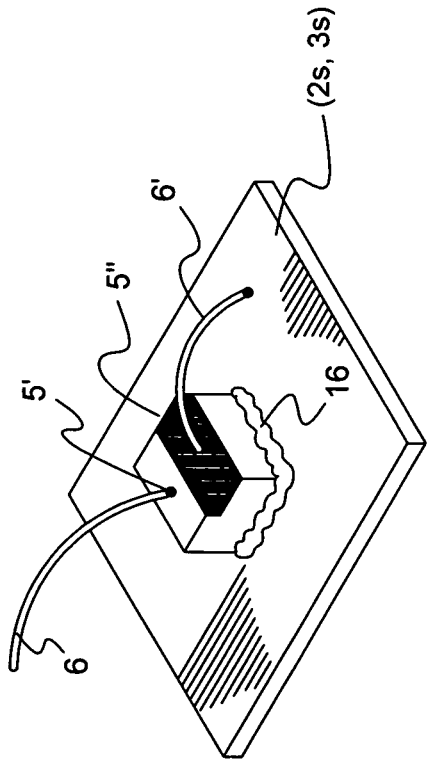
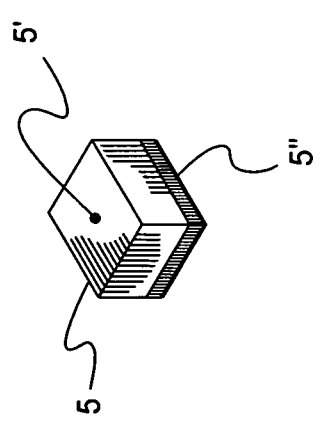
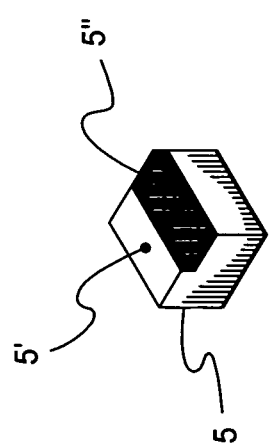

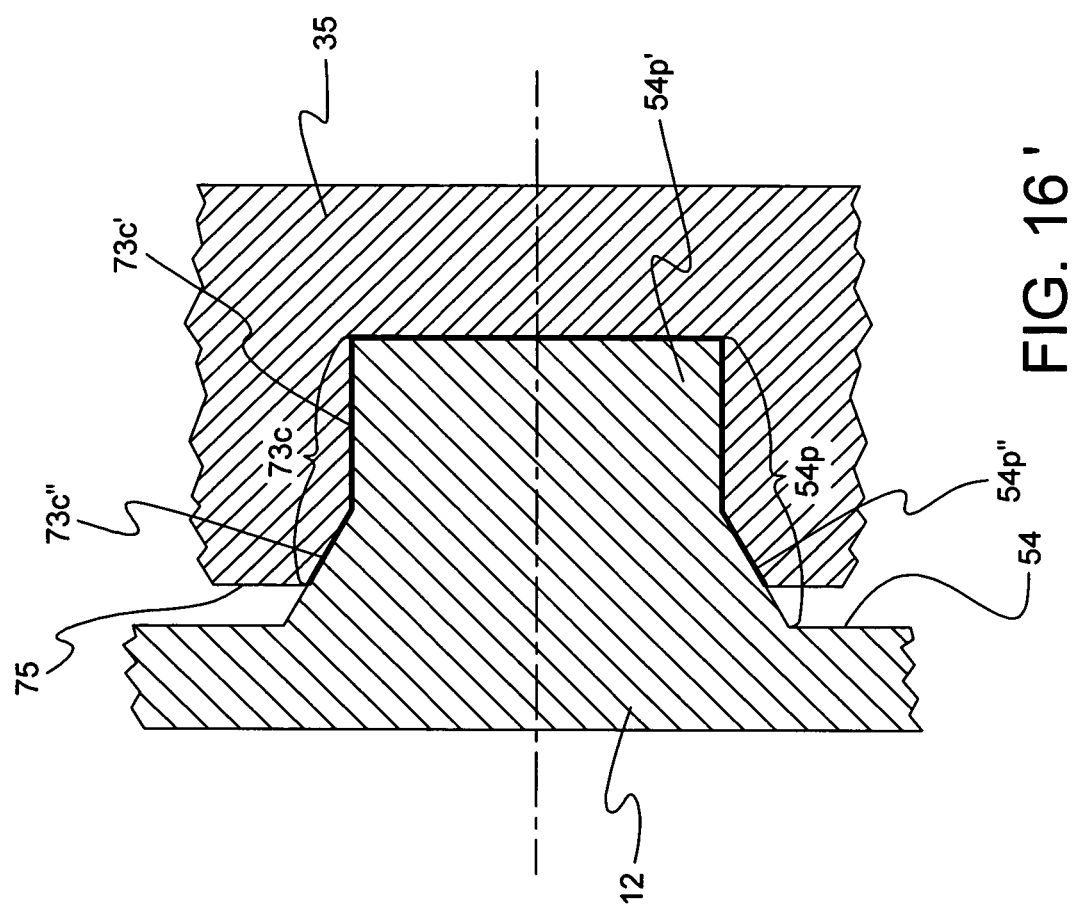

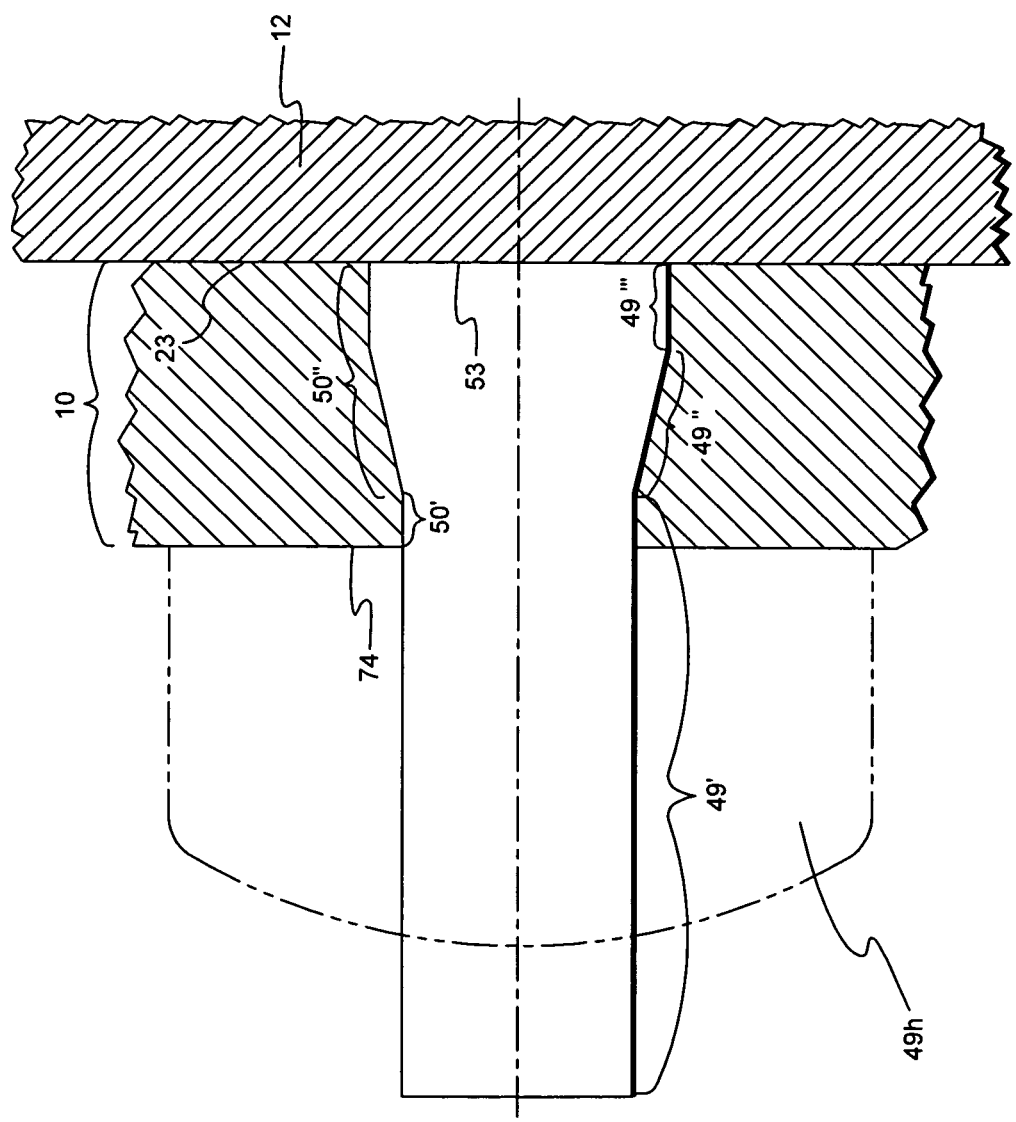

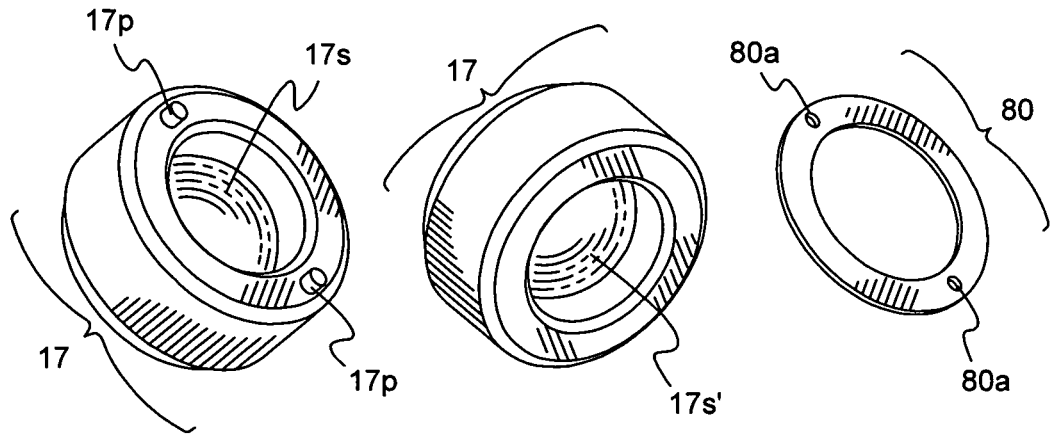
FIG. 29'  FIG. 29"  FIG. 29'''
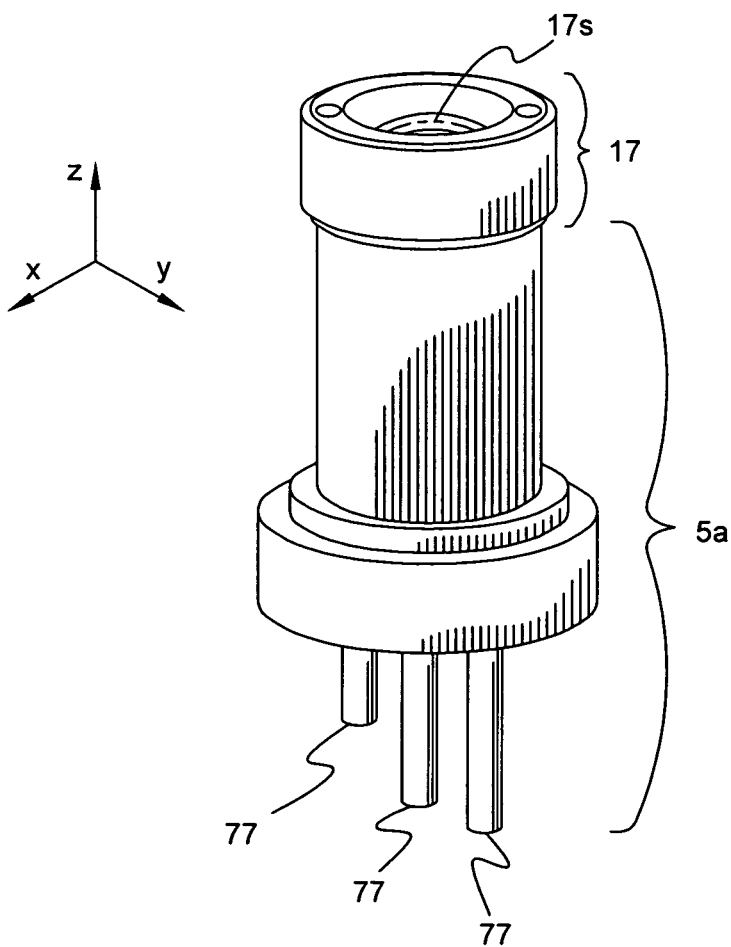
FIG. 29

IMAGING MODULE HAVING LEAD FRAME SUPPORTED LIGHT SOURCE OR SOURCES

CROSS-REFERENCE TO RELATED APPLICATIONS

This application claims benefit under 35 USC §119(e) of prior U.S. Provisional Patent Application No. 60/906,726, filed Mar. 13, 2007. This provisional patent application is incorporated herein in its entirety, by reference thereto.

BACKGROUND OF THE INVENTION

1. Field of the Invention

The present invention pertains to imaging modules, particularly imaging modules for imaging and data collection devices.

2. Description of Background and Other Information

With respect to imaging modules and the light sources they employ, there have been difficulties associated with optimal placement of the light sources with respect to their optics. Problems in this regard have been ascertained as to illumination and aiming light sources and optics.

SUMMARY OF THE INVENTION

It has been discovered that the desired optimal light source placement can be effected by providing a light source support that is precisely located in a predetermined position, by being fixed, in that position, within a housing. Also, provided as a thermally conductive element, the light source support facilitates the removal of light source generated heat, while the housed support provides additional rigidity to the module.

BRIEF DESCRIPTION OF THE DRAWINGS

Other characteristics and advantages of the invention can be better understood from the following description, with reference to the annexed drawings showing, by way of non-limiting examples, how the invention can be embodied, and in which:

FIG. 3A is a perspective view of an aiming subassembly of the invention, mounting LED dies as aiming light sources;

FIG. 3B is a perspective view of an illumination subassembly of the invention, mounting LED dies as illumination light sources;

FIG. 4A is a top perspective view of the LED die as shown in FIGS. 3A and 3B;

FIG. 4A' is a bottom perspective view of the LED die of FIG. 4A;

FIG. 4A" is a top perspective view of the LED die of FIG. 4A, mounted on a lead frame seating section, of an aiming or illumination subassembly;

FIG. 4B is a top perspective view of another embodiment of the LED die, for use as an aiming or illumination light source of the invention;

FIG. 4B" is a top perspective view of the LED die of FIG. 4B, mounted on a lead frame seating section, of an aiming or illumination subassembly;

FIGS. 5A'-5C' are perspective views showing a variation of the mounting seen in FIGS. 5A-5C, with the mounting site being in the form of an aperture;

FIGS. 6' and 6" are bottom and top perspective vies of the aimer focusing lens shown in FIGS. 6 and 8;

FIG. 6'" is a perspective view of the aimer focusing lens of FIGS. 6' and 6" mounted on an aiming subassembly;

FIG. 14' is a front perspective view of the illumination housing of FIG. 14, showing locator projections for mounting an optical plate;

FIG. 19 is a cutaway side functional view, in section, showing a securing projection and a receptor aperture mating illumination and aiming housings, and further showing, by phantom lines, a projection head provided by deforming the protruding portion of the projection;

FIG. 29 is a perspective view of the laser diode aimer focusing lens embodiment shown in FIGS. 29' and 29", and of the aperture stop shown in FIG. 29''', mounted on a laser diode aiming light source of the invention;

FIGS. 29' and 29" are top and bottom perspective views of an embodiment of an aimer focusing lens for a laser diode aiming light source of the invention;

FIG. 29''' is a perspective view of an aperture stop for the laser diode aimer focusing lens embodiment shown in FIGS. 29' and 29", and for the laser diode aimer focusing lens embodiment shown in FIG. 37;

FIG. 33' is a perspective view of another embodiment of an optical tree, for use as an alternative to the optical plate of the imaging module embodiment shown in FIG. 8;

FIG. 34' is a perspective view, in the assembled state, of a variation of the imaging module embodiment shown in FIG. 13, having two of the FIG. 33 trees in place of the optical plate;

FIG. 38 is a perspective view of a variation of the optical plate.

DESCRIPTION OF THE INVENTION

Figure 8:
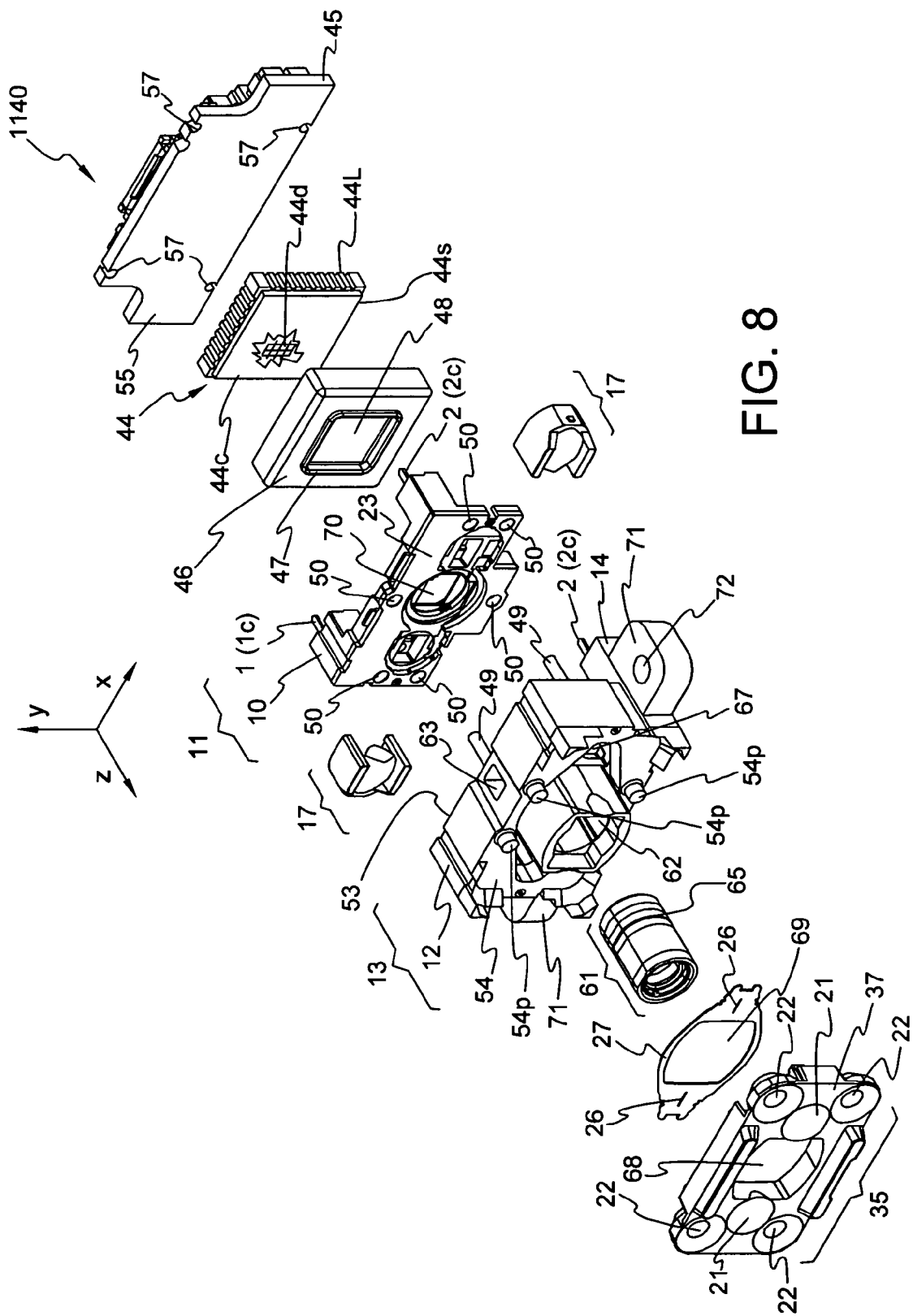
FIG. 8 is a perspective assembly view of an embodiment, of the imaging module of the invention, employing LED light sources as the aiming light sources.

An imaging module of the invention—FIG. 8 showing an embodiment thereof, in the assembly state, as module 1140—includes a light source support bearing at least one illumination light source, and/or a light source support bearing at least one aiming light source. The former light source support is also identified as an illumination light source support, and the latter light source support correspondingly is also identified as an aiming light source support.

Preferred light source supports of the invention are lead frames. Accordingly, preferred illumination light source supports are illumination light source lead frames, or illumination lead frames, and preferred aiming light source supports are aiming light source lead frames, or aiming lead frames.

The illumination and aiming light sources of the invention serve the functions conventional in the art for these components.

In this regard, the purpose of illumination light sources—where they are employed—is to ensure the presence of sufficient light for proper operation of the image sensor chip, or photoconductor, components of the imaging modules. Where the necessary amount of illumination light is supplied by the aiming light, and/or from a source or sources external to the module—e.g., ambient light—then imaging modules of the invention can be operated without illumination light sources. Imaging modules without illumination lead frames, and without illumination light sources, are within the scope of the invention.

Further in this regard, aiming light sources serve to project visible light, in the form of an aiming pattern, onto the intended targets of imaging modules, so that the modules can be positioned properly to image the targets correctly. Where an imaging module of the invention is a bar code scanner component, a visible line is a preferred projected aiming pattern, and the intended target is a type of indicia, such as a bar code, to be read by the scanner; the aiming light is employed to align the optical system of the scanner with the indicia.

Particularly preferred light source supports of the invention are lead frames used in providing the current that powers the light source or sources mounted on the lead frame. This function—i.e., the function of providing the current—can be performed by means of the lead frame comprising components that contribute to the formation of at least one electrical circuit. The lead frame may be limited to one electrical circuit, or may include multiple (i.e., two or more) circuits. Lead frame circuits may be in parallel, or in series, or a combination thereof; circuits in series are preferred.

In embodiments where a charge passes from one lead frame component to another through a light source, the electrical circuit includes, as lead frame components, a connector-receiver and a connector-seat.

The connector-receiver serves both a connecting function and a receiving function. As its connecting function, this component acts to connect the circuit to the printed circuit board of the imaging module. As its receiving function, the connector-receiver provides one or multiple attachment sites, each for an electrically conductive bridging component, such as a bonding wire, that is also connected to a light source seated on a separate component of the lead frame circuit.

The connector-receiver can be configured as providing both the connecting function and the receiving function, without discernable connector and receiver sections. Preferably, the connector-receiver comprises a connector section and one or multiple receiver sections.

The connector-seat correspondingly serves both a connecting function and a seating function. In its connecting function, the connector-seat, like the connector-receiver, connects the circuit to the printed circuit board of the imaging module. As its seating function, the connector-seat provides one or multiple mounting sites, with a light source being seated at each.

The connector-seat may provide yet another function. In addition to its connecting and seating functions, the connector-seat optionally can also serve a heat dissipating function. Where the connector-seat serves as a heat dissipator, it acts to draw away, from its mounted lighting source or sources, heat that is generated by this source.

The connector-seat can be configured as providing both the connecting function and the seating function, without discernable connector and seating sections. Preferably, the connector-seat comprises a connector section and one or multiple seating sections. Where the connector-seat additionally acts to dissipate heat, correspondingly it can be configured as also providing this function without a discernable heat dissipator section or sections. Preferably, in providing the heat dissipating function, the connector-seat comprises a heat dissipator section, or multiple heat dissipator sections.

Where the lead frame electrical circuit includes only one light source, the lead frame components of the circuit may be limited to the connector-receiver and the connector-seat, or may include one or multiple further components. With a circuit thusly having only one light source, this source is mounted on the connector-seat—on the seating section, where the connector-seat comprises a connector section and a seating section.

With a lead frame electrical circuit that comprises multiple light sources, the lead frame components of the circuit can additionally include, as one or multiple further components, an interconnector for one or multiple additional light sources. An interconnector serves a seating function, like a connector-seat, and also a receiving function, like a connector-receiver.

In its seating function, an interconnector provides one or multiple mounting sites for its associated light source or sources. In its receiving function, an interconnector provides one or multiple attachment sites, each for an electrically conductive bridging component; this bridging component is connected to a light source seated either on another interconnector, or on the connector-seat. And like the connector-seat, an interconnector also can optionally serve an additional, heat dissipating function for its mounted light source.

An interconnector can be configured as providing both its receiving and seating functions without discernable receiver and seating sections. Preferably, the interconnector comprises a receiver section and a seating section. Where an interconnector additionally acts to dissipate heat, correspondingly it can be configured as also providing this function without a discernable heat dissipator section or sections. Preferably, in providing the heat dissipating function, the interconnector comprises a heat dissipator section, or multiple heat dissipator sections.

In a lead frame circuit, the mounting and attachment sites are paired, with the mounting site and attachment site of a pair being provided from different components. Each of these pairings accordingly forms an interconnective region of the circuit.

As to the indicated connector-receiver, connector-seat, and—where present—one or multiple interconnectors, all of these particular lead frame components are electrically insulated—electrically separated—from each other. In accordance with this electrical insulation, current cannot pass between any of these components, or between one of these components and a light source seated on another, without an electrically conductive connecting component, such as a bonding wire, to bridge this separation and carry the current.

All of these particular lead frame components preferably also are physically separate from each other. In this regard, none is touching any of the others.

And yet further, these lead frame components all are electrically conductive; connector-seats and interconnectors employed as heat dissipators also are thermally conductive. Preferably, the connector-receivers, connector-seats, and interconnectors all are both electrically conductive and thermally conductive.

The lead frame components may be composed of any suitable materials that are thusly conductive, particularly suitable metals and alloys. Suitable materials include copper alloys, particularly beryllium copper alloys. A commercially available copper alloy that may be employed is Olin 194, from Olin Corporation, East Alton, Ill. Mild (low carbon) steel may also be used. Preferably lead frame components are plated with gold, silver, or palladium; of these three, gold is the easiest to employ, and palladium the most difficult. Portions of the lead frame components to be soldered, such as connector-receiver and connector-seat leads, or ends, inserted into the printed circuit board, preferably are solder plated.

Figure 1A:
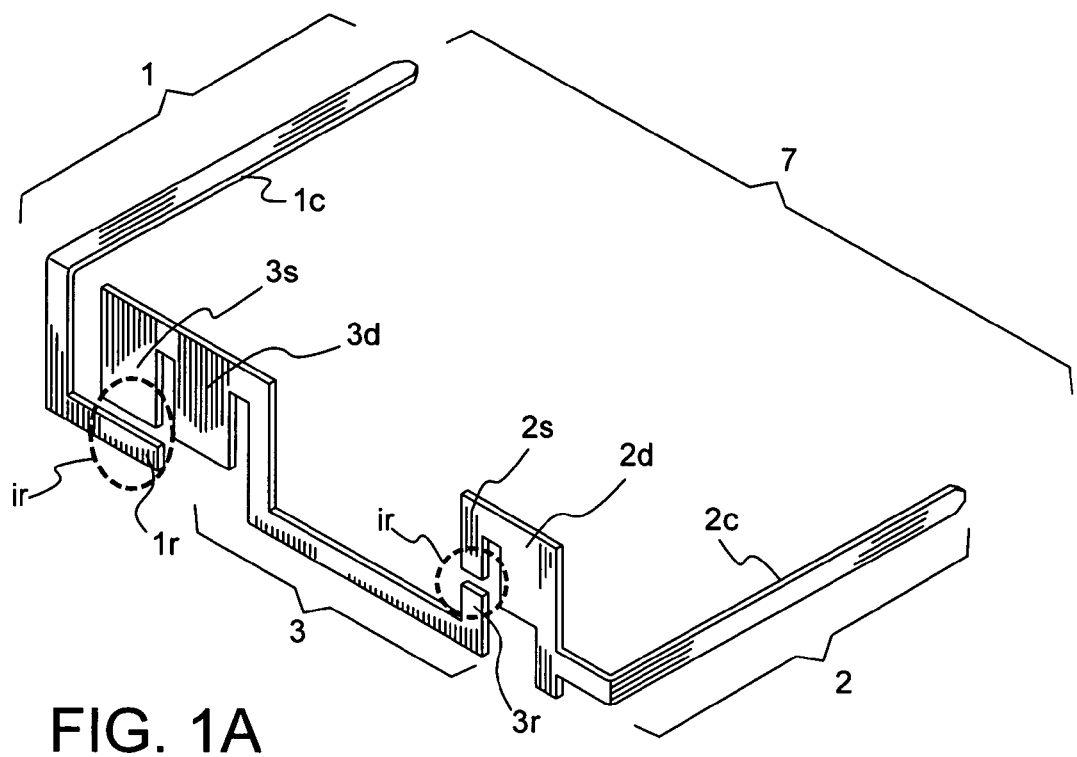
FIGS. 1A-1H are perspective views of lead frames of the invention.

A lead frame having only one circuit, and mounting two light sources, is shown in FIG. 1A. Lead frame 7 includes connector-receiver 1, connector-seat 2, and interconnector 3. Connector-receiver 1 comprises connector section 1c and receiver section 1r, and connector-seat 2 comprises connector section 2c, seating section 2s, and heat dissipator section 2d. Interconnector 3 comprises seating section 3s, receiver section 3r, and heat dissipator section 3d. Receiver section 1r and seating section 3s together form an interconnective region ir, and a second interconnective region ir is formed by the pairing of seating section 2s and receiver section 3r.

Figure 1C:
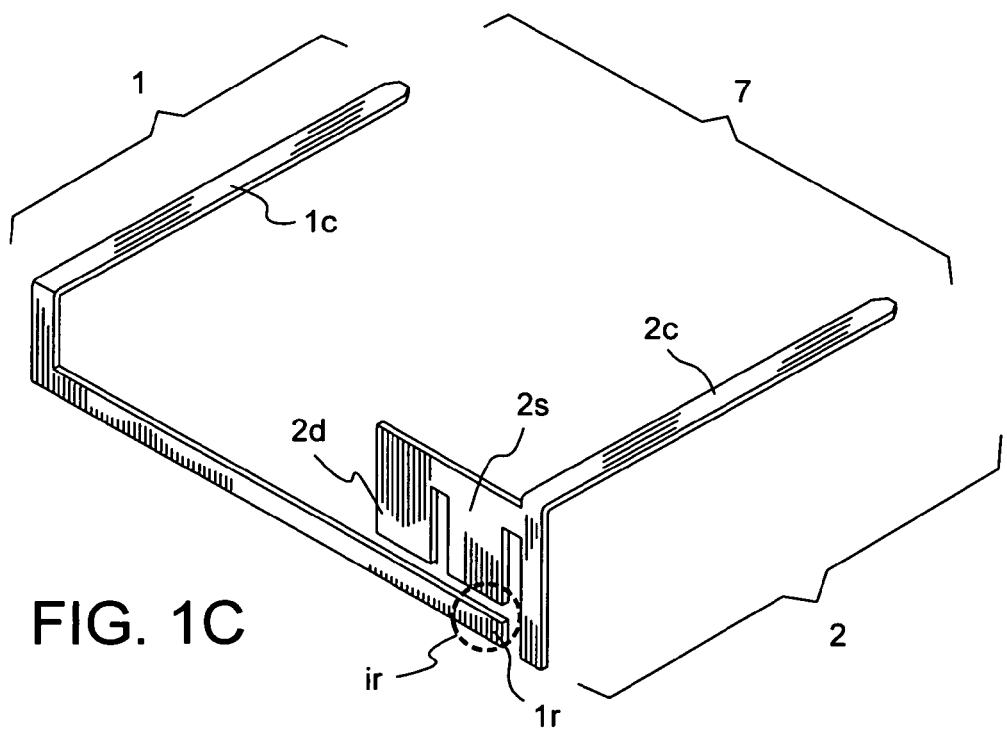
Figure 1B:
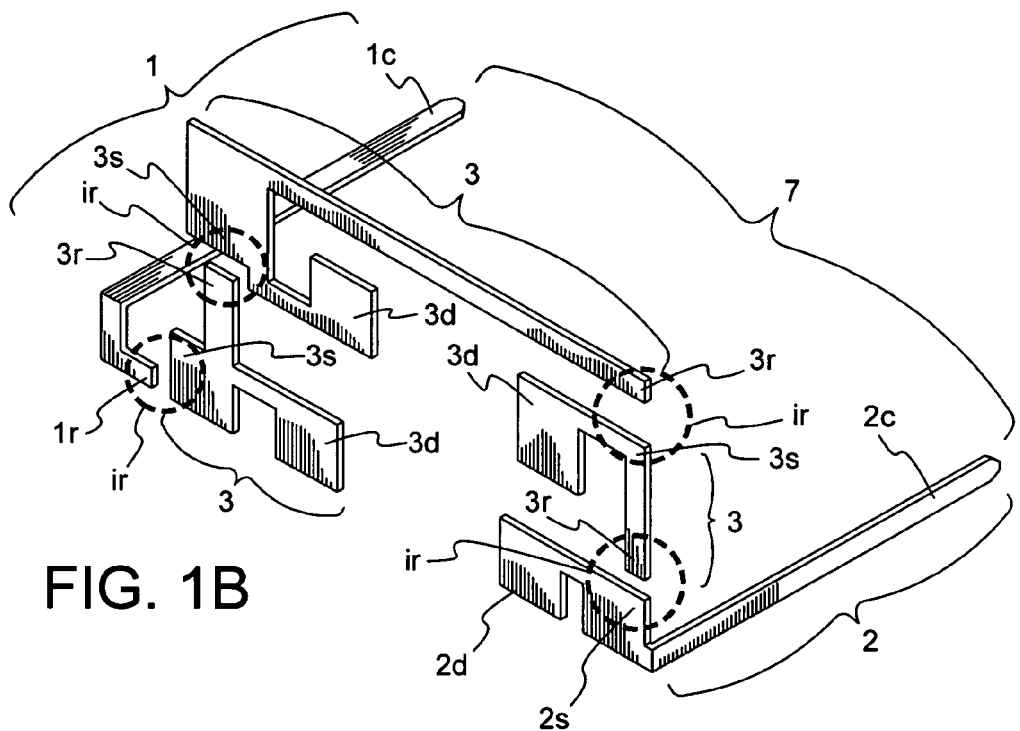

Another single circuit lead frame, but mounting four light sources, is shown in FIG. 1B. Lead frame 7 includes three interconnectors 3, and correspondingly four interconnective regions ir.

FIG. 1C shows yet another single circuit lead frame of the invention, but mounting only one light source—on seating section 2s of connector-seat 2. Lead frame 7 accordingly has only one interconnective region ir—formed by the indicated seating section 2s, with receiver section 1r—and is without any interconnectors.

Figure 1D:
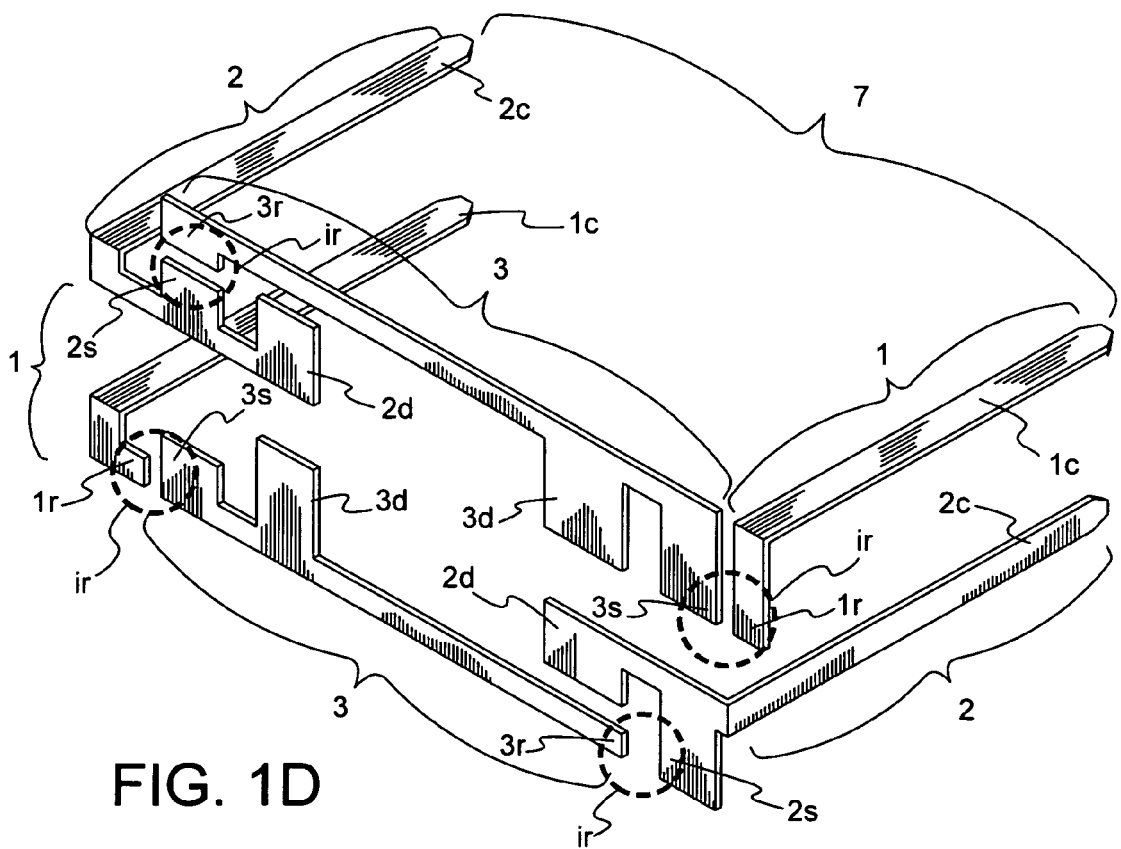

FIG. 1D shows a lead frame of the invention incorporating two electrical circuits, and mounting a total of four light sources, with a corresponding total of four interconnective regions. Each circuit, in the lead frame 7 of FIG. 1D, mounts two of the light sources, and accordingly includes its own separate connector-receiver 1, connector-seat 2, and interconnector 3. Each circuit also includes two interconnective regions ir—one formed by its seating and receiver sections 2s and 3r, and the other formed by its seating and receiver sections 3s and 1r.

For lead frames characterized by a series-parallel combination, this configuration may be provided by means of a connector-receiver with multiple attachment sites in parallel, a connector-seat correspondingly with multiple mounting sites in parallel, and a separate interconnector for each pair of connector-receiver and connector-seat attachment and mounting sites.

Figure 1E:
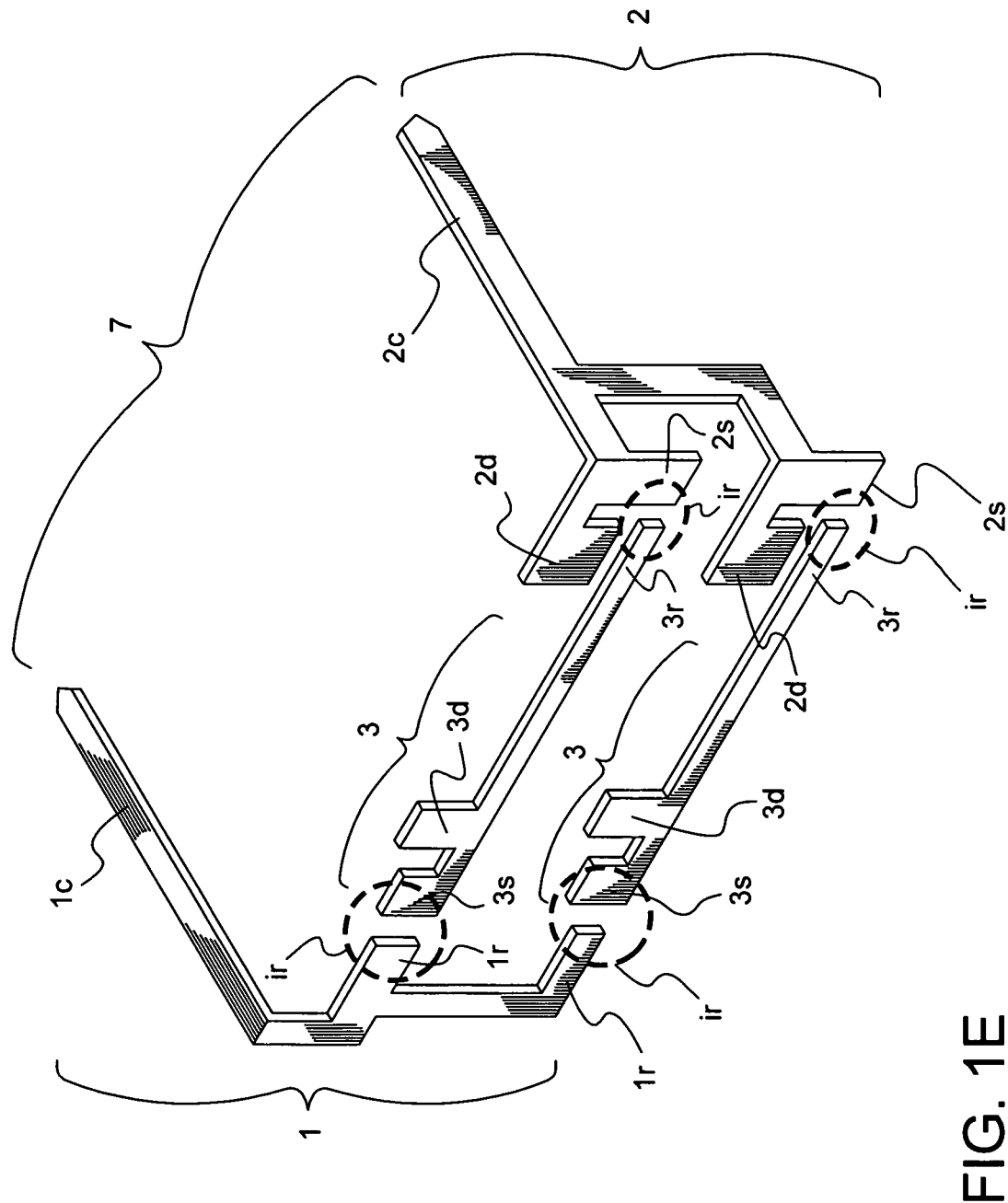

In this regard, FIG. 1E shows a lead frame of the invention incorporating—like that of FIG. 1D—two electrical circuits, but in series and in parallel. As with the FIG. 1D lead frame, this embodiment mounts a total of four interconnective regions, and with a different interconnector for each circuit. And also as with the lead frame of FIG. 1D, each circuit in the FIG. 1E lead frame not only mounts two of the light sources, but also includes two interconnective regions. However, in lead frame 7 of FIG. 1E, connector-receiver 1 includes two receiver sections 1r in parallel, and connector-seat 2 includes two seating sections in parallel. Correspondingly, one circuit includes an interconnector 3, together with one of the one receiver section 1r and one seating section 2s, while the other circuit includes a separate interconnector 3, together with the other receiver and seating sections 1r and 2s. Each of the two circuits includes two interconnective regions ir—one formed by its seating and receiver sections 2s and 3r, and the other formed by its seating and receiver sections 3s and 1r.

With lead frames in parallel, the parallel configuration may be provided by means of a connector-receiver with multiple attachment sites in parallel and a connector-seat correspondingly with multiple mounting sites in parallel, and with these sites paired directly to provide the interconnective regions ir.

Figure 1F:
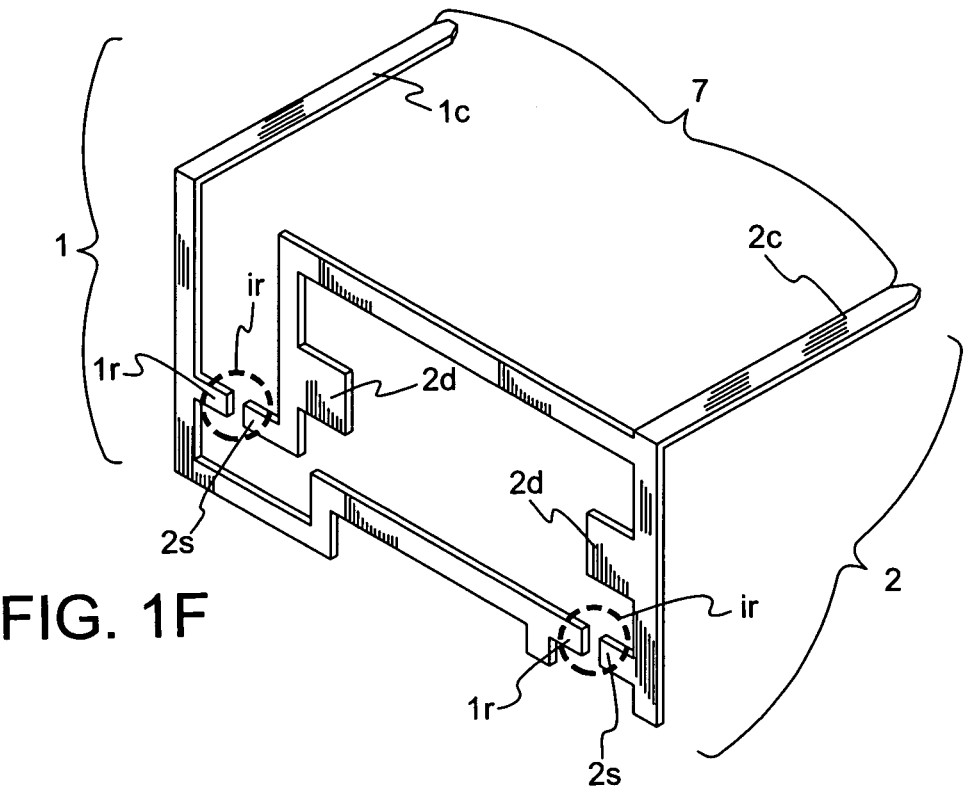
Figure 1G:
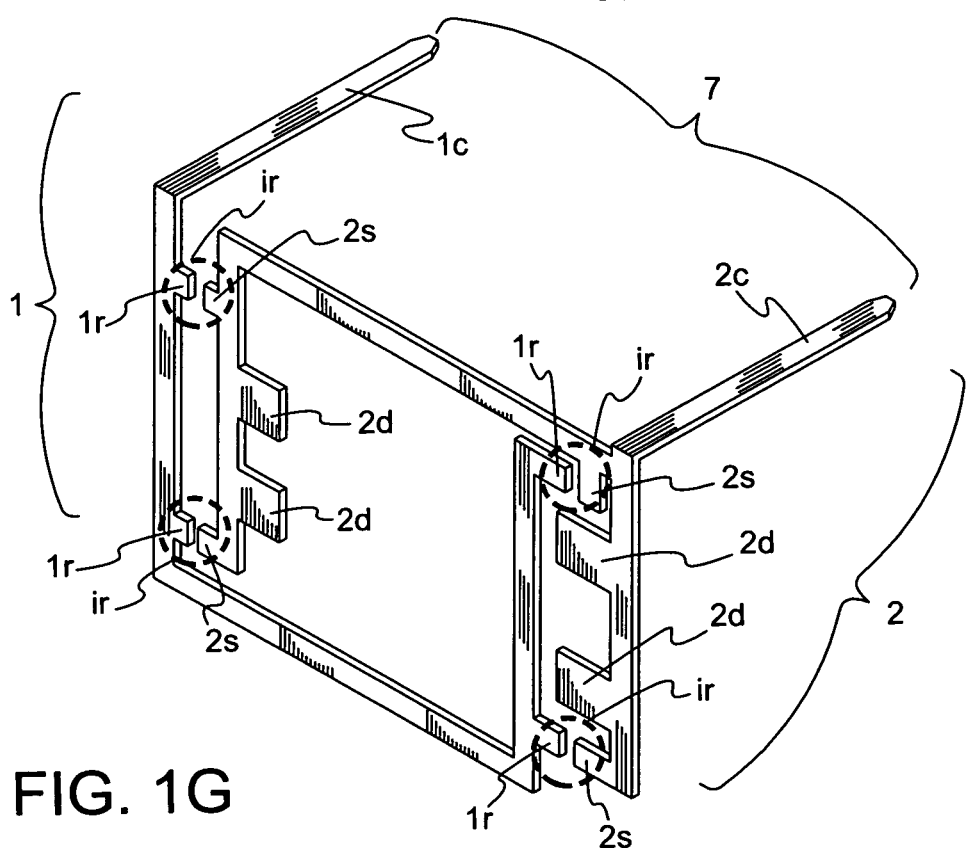

FIGS. 1F and 1G show lead frames of the invention mounting multiple light sources in parallel. In lead frame 7 of FIG. 1F, connector-receiver 1 includes two receiver sections 1r in parallel, and connector-seat 2 correspondingly includes two seating sections 2s in parallel. Connector-receiver 1 and connector-seat 2 of the FIG. 1G lead frame 7 have four receiver and seating sections 1r and 2s thusly in parallel. For both the FIGS. 1F and 1G lead frames, each interconnective region ir is formed by a pairing of different receiver and seating sections 1r and 2s.

Further lead frames in series, in parallel, and in series-parallel combination, in conformance with the foregoing, are within the scope of the invention.

And yet additionally, as to lead frames of the invention that include components—i.e., connector-seats and/or interconnectors—with discernable heat dissipator sections and seating sections, the heat dissipator section or sections of such a component can reside in a plane different than that of the component's seating section or sections, and also at an angle to and intersecting with that of the component's seating section or sections. Preferably, these different, angled, and intersecting planes are at 90°, or about 90° angles—are perpendicular, or substantially perpendicular—to each other. Particularly, the heat dissipator section or sections here can reside in a plane or planes parallel, or substantially parallel, to a side, top, and/or bottom surface or surfaces of the housing in which the lead frame is situated—actually in fact can be located in the housing top, bottom, and/or side or sides. This location in different, angled, and intersecting planes allows for heat dissipators with greater surface area, which results in improved heat dissipation.

Figure 1H:
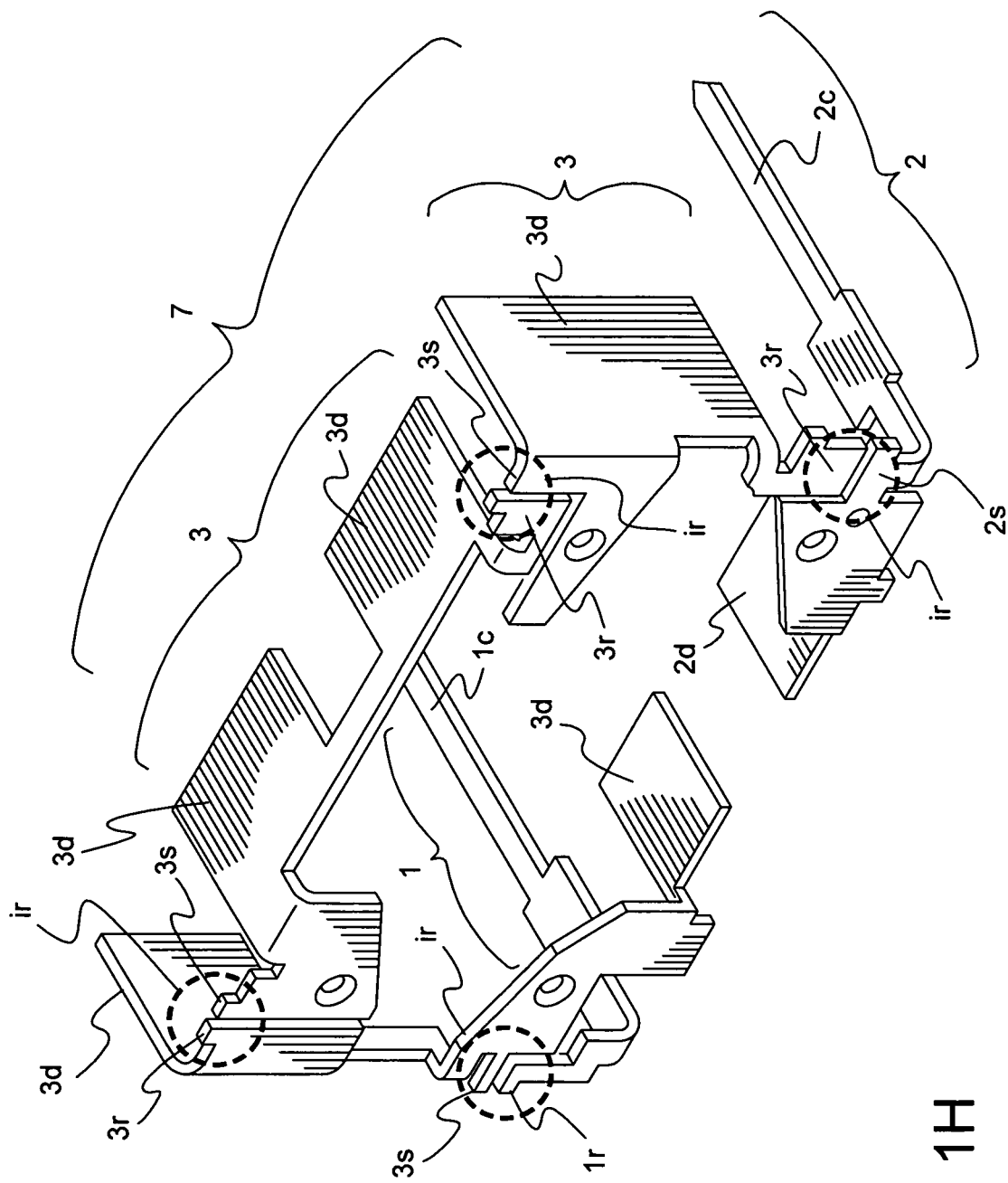

An example is shown in lead frame 7 of FIG. 1H, which is a variation of the FIG. 1B lead frame 7. As can be seen, in this variation heat dissipator sections 2d and 3d are at right angles to their respective seating sections 2s and 3s.

A light source support is located in a housing, and preferably is immobilized therein. By means of this immobilization, the support can be positioned exactly in a precise location, and secured there in place. Particularly in the case of a lead frame, the components thereof can be placed precisely, in specific positions, within the housing in which they are immobilized; it is therefore possible for the lead frame components to be fixed in exactly predetermined locations in the housing, and accordingly rendered stationary therein.

Thusly situating the light source support within a housing allows for the placement of the support—in the case of a lead frame, the placement of its components—in the housing to be finely controlled. Precise location in any of the X, Y, and Z dimensions, as defined in FIGS. 8 and 13, and also as is conventional in the optics art, accordingly can be achieved. Therefore, as to light source supports—and particularly as to lead frame components and component sections—for which exact positioning is critical, this objective can be accomplished.

Preferably the housing comprises a plastic. Preferred plastics include those that are infrared (IR) absorbing, and especially preferred are black IR absorbing plastics. Commercially available black IR absorbing plastics that may be used include glass filled Valox®, from GE Plastics, Pittsfield, Mass., and liquid crystal polymer (LCP) polyester resins; Ryton®, from Chevron Phillips Chemical Company LLC, The Woodlands, Tex., is tan colored, and therefore less preferred, but also may be used. Additional commercially available liquid crystal polymers, including glass filled liquid crystal polymers, that may be used include G-540, G-540 roughened, G-930, and G-930 roughened Xylar® liquid crystal polymers, from Amoco Performance Products, Inc., Marietta, Ohio, and Vectra® liquid crystal polymers, from Ticoma Engineering Polymers, Celanese Corporation, Florence, Ky.

The light source support preferably is located within the housing by being integrated therein. Also as a matter of preference, the integration of the light source support in the housing is accomplished by the support being embedded therein. Where the light source support is a lead frame, as a matter of particular preference, the lead frame is embedded in the housing by molding of the lead frame into the housing.

Figure 2:
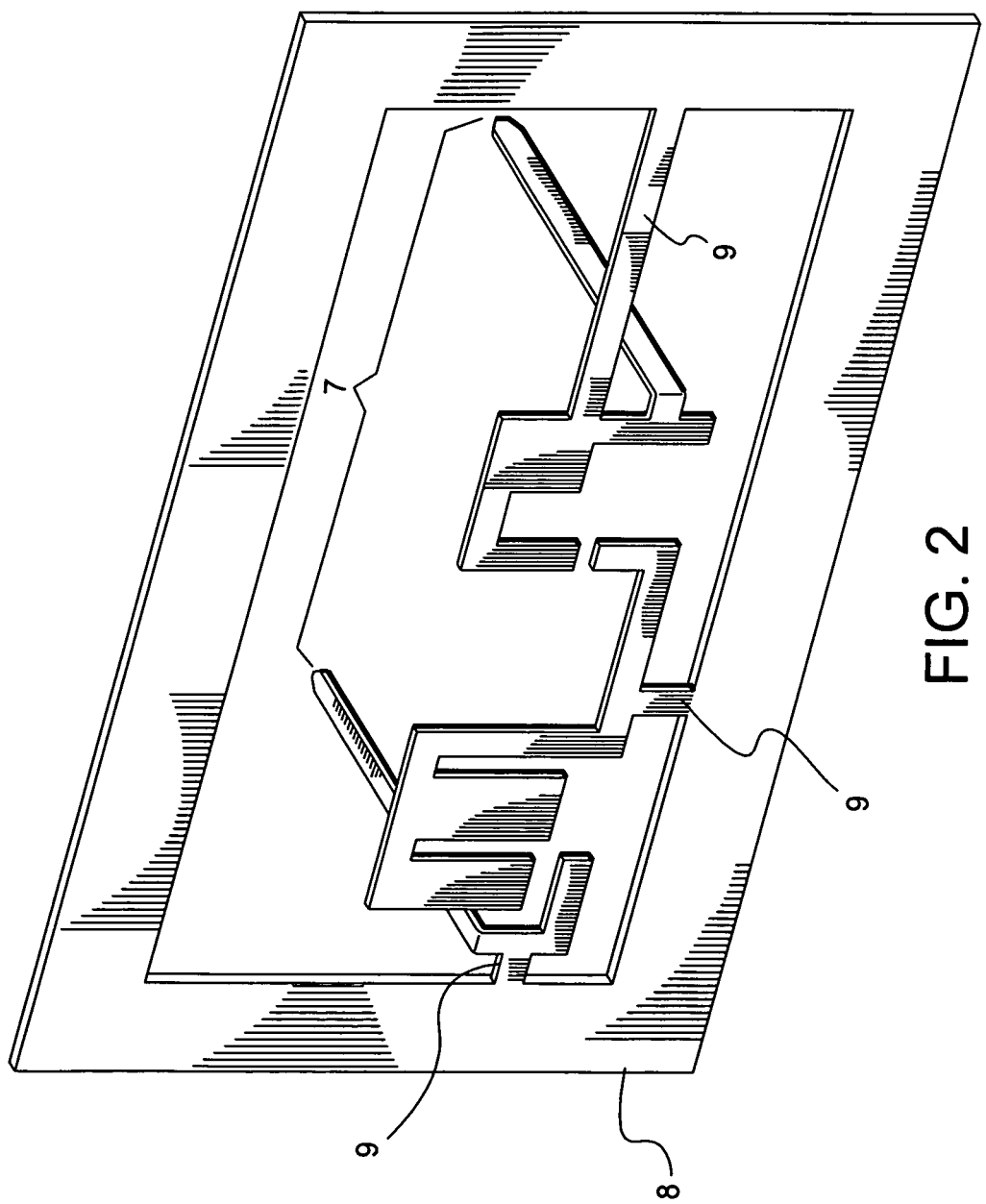
FIG. 2 is a perspective view of a molding frame holding a lead frame of the invention, for forming a housing around the lead frame.

One means for molding the lead frame into the housing is with the use of a molding frame. FIG. 2 shows molding frame 8, with the components of lead frame 7 of FIG. 1B connected thereto by temporary connections 9. Molding frame 8, with the thusly connected lead frame components, is placed in a suitable mold, with alignment of frame 8 therein—to achieve proper positioning of the lead frame components in the resulting molded subassembly—being provided. The lead frame components, still attached to aligned frame 8, are up against metal supports, and pressed against these supports by metal positioning pins to secure the components during the molding process. The closing of the mold clamps the frame, components, and pins in place.

The plastic, heated to a molten state, is injected in liquid form into the closed mold. The plastic is allowed to cool to its solid state, and the molding frame—with its thusly formed and attached lead frame and housing subassembly—is removed from the mold. The temporary connections are broken by suitable means, and the subassembly is removed from the frame.

The mold is configured to provide the requisite holes and apertures in the housing. The mold further is configured to expose the requisite surfaces or surface portions of the lead frame components, as shown in FIGS. 3A and 3B.

With this method of preparing the subassembly, factors that can be finely controlled to provide precise placement of the lead frame components in the housing include: the positioning of the lead frame components on the molding frame, by means of their temporary connections; the placement of the molding frame with attached lead frame components in the mold, along with the location of the metal supports and positioning pins in the mold—and accordingly the positioning of the lead frame components in the mold; the immobilization of the lead frame components by the supports and pins, to retain these components in place under the heat and pressure of the molding process; and the configuration of the mold, to provide the desired housing dimensions.

Light source supports of the invention—particularly in the case of lead frames, including the examples of FIGS. 1A-1H—are suitable as either illumination light source supports or aiming light source supports. A housing for an illumination light source support is accordingly an illumination housing, and a housing for an aiming light source support is an aiming housing. An illumination subassembly comprises an illumination light source support and an illumination housing, and an aiming subassembly correspondingly comprises an aiming light source support and an aiming housing.

Moreover, both illumination and aiming light source supports can be located in a single housing. A housing for both illumination and aiming light source supports accordingly is an illumination and aiming housing, and an illumination and aiming subassembly comprises: an illumination light source support, or multiple illumination light source supports; an aiming light source support, or multiple aiming light source supports; and an illumination and aiming housing.

FIG. 3A shows the lead frame of FIG. 1A integrated in an aiming housing 10, to provide an aiming subassembly 11, and FIG. 3B shows the lead frame of FIG. 1B integrated in an illumination housing 12, to provide an illumination subassembly 13. The ends of connector sections 1c and 2c extend out of housing legs 14. Each housing has open spaces 15, exposing areas of receiver sections 1r and 3r, seating sections 2s and 3s, and heat dissipator sections 2d and 3d. Receiver sections 1r and 3r pair with seating sections 2s and 3s to form interconnective regions ir.

Light sources 5 are seated in both the aiming and illumination subassemblies 11 and 13, on seating sections 2s and 3s. Aiming light sources 5a are mounted in aiming subassembly 11, and illumination light sources Si are mounted in illumination subassembly 13. Bonding wires 6 electrically connect the circuit lead frame components in series through the respective light sources 5a (FIG. 3A—aiming subassembly 11) and 5i (FIG. 3B—illumination subassembly 13).

Illumination housing 12 further includes mounting ears or wings 71, for aiding in the mounting of the imaging module on a member external to the imaging module, such as a member on or in a suitable data collection device. Mounting wings include fastener holes 72, for receiving fasteners such as mounting screws.

As to light sources 5 through which charge passes from one lead frame component to another, those such as are known in the art can be used. In this regard, LED (light emitting diode) dies are suitable as illumination light sources 5i, and as aiming light sources 5a.

An example of an LED die that may be employed is shown as die 5 in FIGS. 4A-4A". This LED die 5 includes a first electrical contact 5' on one side, and a plating on its reverse side, providing second electrical contact 5". Light sources of this embodiment are those seated in aiming subassembly 11 of FIG. 3A—as aiming light sources 5a—and in illumination subassembly 13 of FIG. 3B—as illumination light sources 5i. Commercially available LED dies of this embodiment that may be used include Lumineds HWFR-B517 LED chips, from Lumineds Lighting, LLC, San Jose, Calif., and EPISTAR ES-SAHR822 LED chips, from EPISTAR Corporation, Hsinchu, Taiwan.

In the subassemblies of FIGS. 3A and 3B, bonding wires 6 connect the thusly mounted LED dies 5 to receiver sections 1r and 3r. Each LED die accordingly is electrically connected to a lead frame component on which that LED die is not seated.

The connection of the bonding wire at both ends is by welding. FIG. 4A" shows the LED die embodiment of FIGS. 4A and 4A' seated, or mounted, on a seating section 2s or 3s. The welding of bonding wire 6 to die 5 is at first electrical contact 5', and the die is fixed to seating section 2s or 3s by conductive epoxy 16. This epoxy serves to connect the die thermally and electrically, as well as to fix the die physically, to its seating section. Among the commercially available conductive epoxies suitable for this purpose is Ablebond 8510, from Ablestik, Rancho Dominguez, Calif.

Another embodiment of LED die 5 that may be employed—as aiming light source 5a and illumination light source 5i—is shown in FIGS. 4B and 4B". In this embodiment, electrical contacts 5' and 5" are both situated on the same side of die 5.

FIG. 4B" shows the LED die embodiment of FIG. 4B seated on a seating section 2s or 3s. For this embodiment of die 5, second bonding wire 6' also is provided, connecting electrical contact 5" and the seating section. As with bonding wire 6, wire 6' likewise is welded at both ends—i.e., at one wire end, to electrical contact 5", and at the other wire end, to seating section 2s or 3s.

Further regarding light sources 5 through which charge passes from one lead frame component to another, yet additionally suitable, as both illumination light sources 5i and aiming light sources 5a, are leaded light sources, as are known in the art. Leaded light sources that may be used include leaded LED lamps.

Figure 4C:
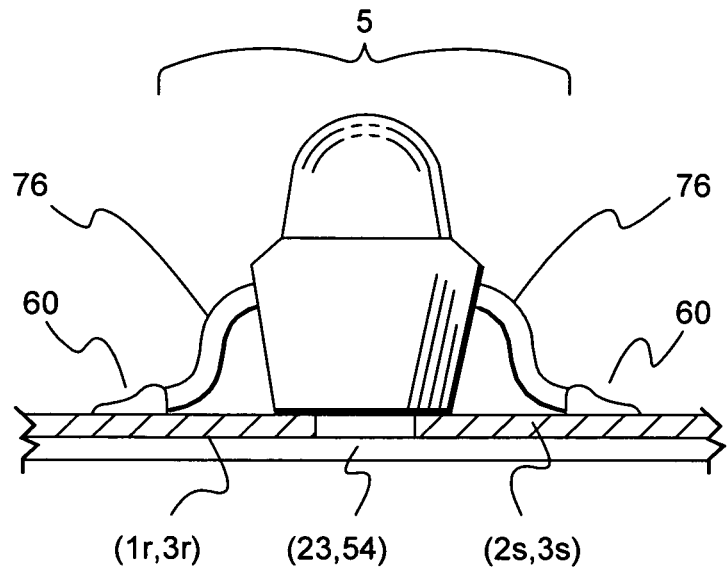
FIGS. 4C and 4C' are side and perspective views of a side leaded LED lamp, for use as an aiming or illumination light source of the invention, mounted on the front surface of an aiming or illumination subassembly.
Figure 4C:
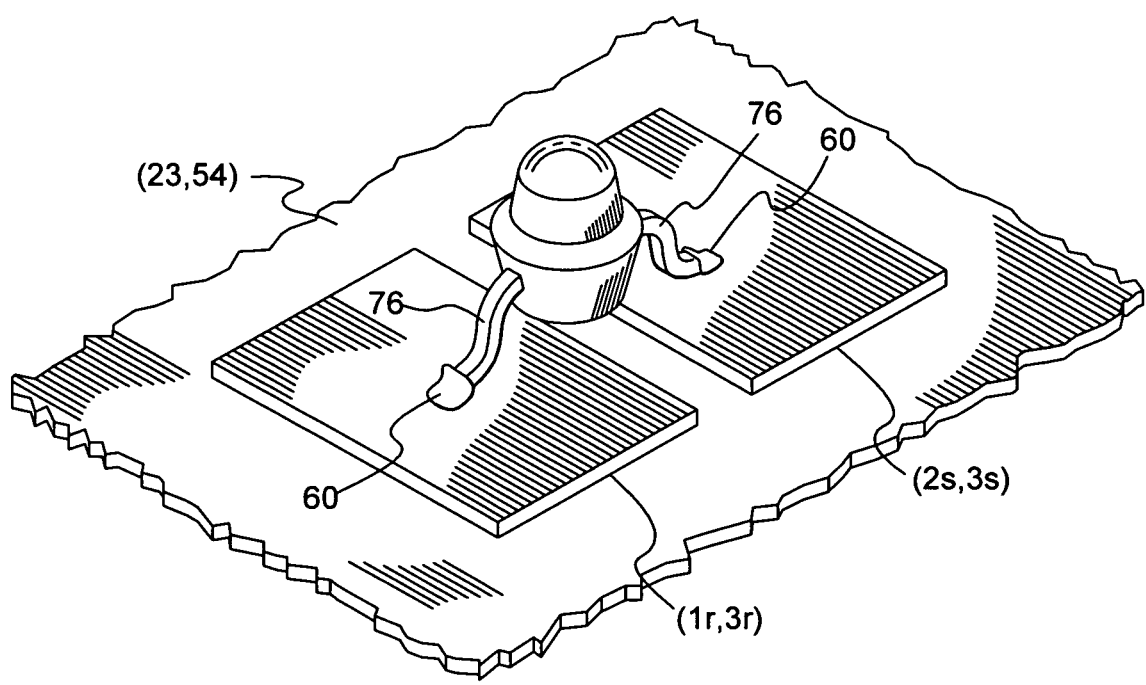

Among the suitable leaded LED lamps are side leaded LED lamps, an example of which is shown in FIGS. 4C and 4C'. LED lamp 5 itself electrically connects the circuit lead frame components in series, by means of side extending leads 76, which are also referred to in the art as "gull wings." In interconnective region ir, on aiming housing front surface 23 or illumination housing front surface 54, one lead 76 is soldered (as shown by solder 60) to seating section 2s or 3s, and the other lead 76 is soldered to receiver section 1r or 3r. As is understood in the art, each lead 76 must be soldered to its proper seating (2s, 3s) or receiver (1r, 3r) section—with respect to the polarity of the LED lamp 5—so that current can pass through this light source.

In FIGS. 4C and 4C', side leaded LED lamp 5 is positioned between the seating and receiver sections to which it is connected. It may also be located on either section, or otherwise positioned in any other manner—consistent with LED polarity—that allows the indicated connections to both sections.

A commercially available leaded LED lamp that provides red light, and is suitable as an illumination light source, is the HLMT-QG00 LED lamp, from Avago Technologies Limited, San Jose, Calif. A commercially available leaded LED lamp that provides green light, and is suitable as an aiming light source, is the HLMP-QM00 LED lamp, also from Avago Technologies Limited.

Figure 7:
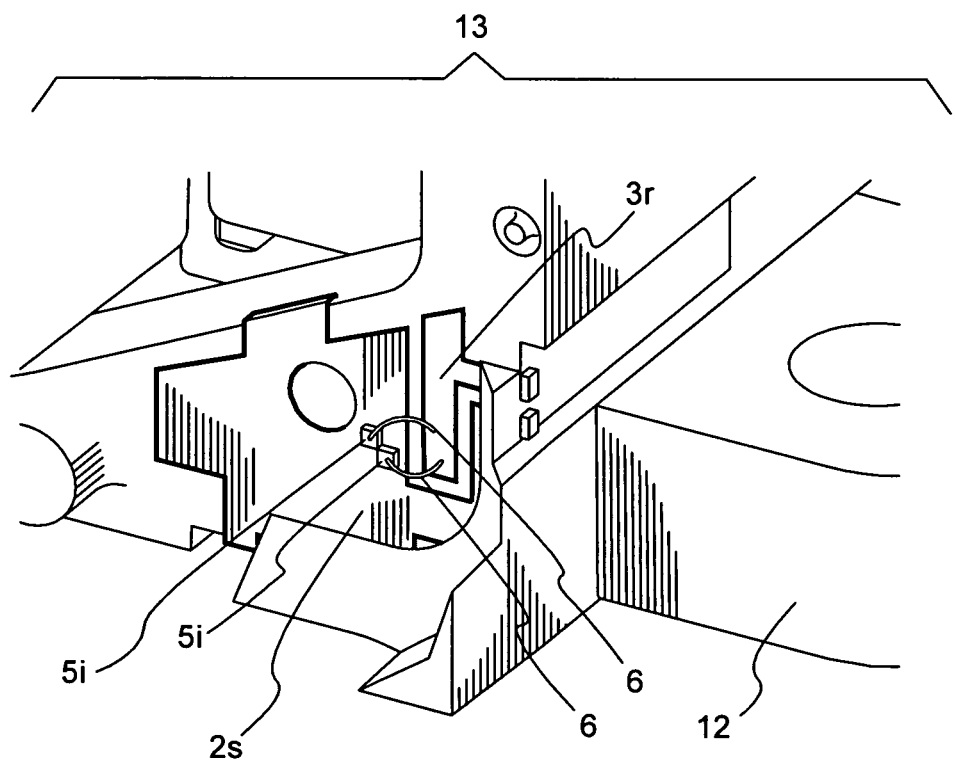
FIG. 7 is a magnified partial perspective view of an illumination subassembly, having multiple light sources mounted on the same lead frame seating section.

Further as to the lead frame 7 embodiments of FIGS. 1E-1G, parallel configuration yet additionally can be provided by the mounting of multiple light sources 5 on the same seating section 2s and/or 3s. An example of such multiple mounting is seen in FIG. 7. As shown therein, two LED dies 5 of FIGS. 4A-4A" are mounted—as illumination light sources 5i—on the same seating section 2s, in an illumination subassembly 13 of the embodiment shown in FIG. 3B. Each of these illumination light sources 5i is connected to seating section 3r by its own bonding wire 6.

In the immediately preceding configuration, and in fact with all embodiments—including those of FIGS. 1E-1G—where multiple light sources 5 are seated on the same lead frame component, the thusly mounted light sources preferably have the same, or at least essentially the same, or at least substantially the same, forward voltage; in such instance, the current will be divided between these light sources. However, where one light source 5 has a sufficiently lower forward voltage than the other light source or sources 5 with which it is mounted in parallel, then that lower forward voltage light source will utilize most of the current, and therefore will be considerably brighter than the other light source or light sources. In the case of LED die light sources, a means for providing dies with sufficiently similar forward voltage is, particularly in the case of gallium aluminum arsenide dies, to take all the dies that are to be mounted on the same lead frame component from the same portion of the wafer when they are manufactured. Dies that are next to each other on the wafer typically also have very similar electrical properties.

Aiming optics, and the relative positioning of aiming optic and light source components, are described with reference to FIGS. 3A, 6-6''', and 8. Each aiming light source 5a may have an associated aimer focusing optic 17—particularly an aimer focusing lens 17—located in front of aiming light source 5a.

Preferred aimer focusing lenses for this purpose are anamorphic lenses, also known as football lenses. Cylinder lenses are also suitable.

Further, each aimer focusing anamorphic lens 17 comprises bottom rim 18, lower lens surface 20, and upper lens surface 24. Anamorphic lens lower lens surface 20 comprises apex 19, and anamorphic lens upper lens surface 24 comprises apex 25.

Anamorphic lenses 17 are mounted on front surface 23 of aiming housing 10, in front of aiming light sources 5a. Each anamorphic lens 17 is fixed to aiming housing front surface 23 by anamorphic lens bottom rim 18, with a suitable adhesive.

Exact positioning of aiming light source 5a relative to the focal point of anamorphic lens 17—particularly with an LED die employed as aiming light source 5a—is crucial for optimal operation of this lens. Connector-seat 2 and interconnector 3, of aiming subassembly 11, accordingly are situated in aiming housing 10 to space each of seating sections 2s and 3s precisely the proper distance from apex 19 of its anamorphic lens lower lens surface 20, so that each aiming light source 5a correspondingly is precisely distanced from apex 19—i.e., in the Z dimension. Further to achieve optimal location of the LED die as regards the anamorphic lens, each aiming LED die also is precisely placed on its seating section 2s or 3s—i.e., in the X and Y dimensions.

Each aiming light source 5a further may be associated with one or both of an aiming pattern aperture 26 and an aimer imaging optic 21. Where employed, aiming pattern aperture 26 is located in front of aiming light source 5a; if aimer focusing optic 17 is also employed, then aiming pattern aperture 26, where employed, is also located in front of aimer focusing optic 17. Where employed, aimer imaging optic 21 is located in front of aiming light source 5a. If aimer focusing optic 17 is also employed, then aimer imaging optic 21, where employed, likewise is located in front of aimer focusing optic 17. And yet additionally if aiming pattern aperture 26 is employed, then aimer imaging optic 21, if employed, likewise is located in front of aiming pattern aperture 26.

Where all three of aimer focusing optic 17, aiming pattern aperture 26, and aimer imaging optic 21 are employed with aiming light source 5a, aiming pattern aperture 26 serves to shape the light—the light emanating from aiming light source 5a, through aimer focusing lens 17—into an aiming pattern, which thusly is provided in the form of aperture 26. Aimer imaging optic 21 accordingly images aiming pattern aperture 26 onto a target area.

Preferred aiming pattern apertures are aiming slits 26. Preferred aimer imaging optics are aimer imaging lenses 21.

The relationship of illumination optic and light source components correspondingly is described with reference to FIGS. 3B, 8, and 9. In this regard, each illumination light source 5i may have an associated illumination optic 22—particularly, an illumination lens 22. Illumination optic 22 is located in front of its illumination light source 5i. Illumination optic 22 is provided to maximize the proportion, of the light produced by illumination light source 5i, which reaches a target area corresponding to a field of view of imaging module image sensor chip 44. Further, illumination optic 22 assists in developing a substantially uniform illumination pattern over the target area.

Among the lenses suitable to be employed as illumination lenses 22 are converging lenses. Converging lenses that may be used include convex lenses and biconvex lenses. Further converging lenses that may be used include tulip lenses; a tulip lens comprises a convex or biconvex inner portion, and a redirecting circumferential conic outer portion. Especially suitable are tulip lenses characterized by internal reflection—particularly, by total internal reflection.

Lenses that may be employed as illumination lenses 22 include collimator lenses as disclosed in U.S. Pat. No. 6,547,423, which is incorporated herein in its entirety, by reference thereto. Lenses providing internal reflection are preferred, and lenses providing total internal reflection (TIR) are particularly preferred.

However, total collimation in fact is not optimal. What instead is preferred is that the illumination lens gather up the maximum amount of light from the light source that can be collected, and send this light forward, toward the intended target, with a divergence of approximately 35° full width half maximum—so that the light diffuses to an extent over the image sensor field of view. Accordingly, collimator lenses, such as those disclosed in U.S. Pat. No. 6,547,423, which have been subjected to intentional degradation that introduces the desired divergent effect, are preferred over lenses that effect complete collimation.

Figure 18:
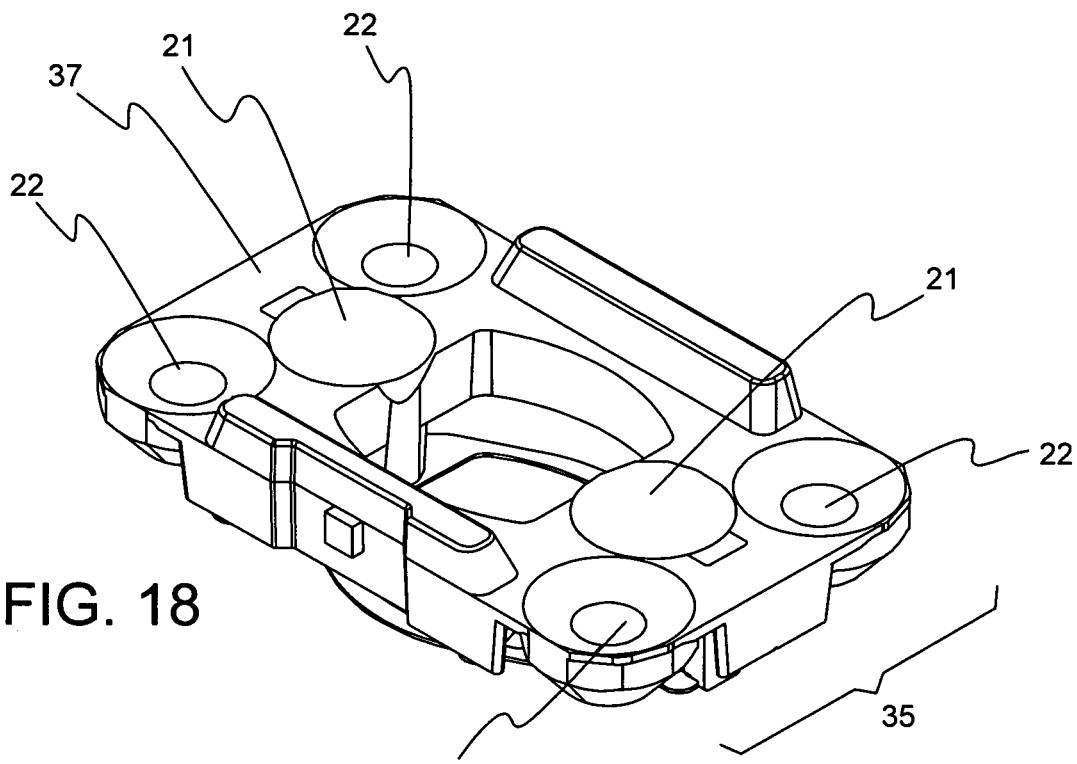
FIG. 18 is a front perspective view of an optical plate.

As seen in FIGS. 8 and 18, imaging lenses 21 and the illumination lenses 22 preferably are formed in optical plate 35, which thusly includes aimer imaging lenses 21 and illumination lenses 22, all as a single piece. Preferably optical plate 35, with its aimer imaging lenses 21 and illumination lenses 22, is molded from a transparent plastic—particularly, an optical grade plastic. Polycarbonates are preferred; suitable other plastics include the acrylonitrile butadiene styrenes (ABS). A commercially available optical grade polycarbonate that may be used is Makrolon® 2458, from Bayer MaterialScience, Baytown, Tex.; another is Calibre™ 301-22 polycarbonate resin, from Dow Plastics, North America, The Dow Plastic Company, Midland, Mich.

Figure 10:
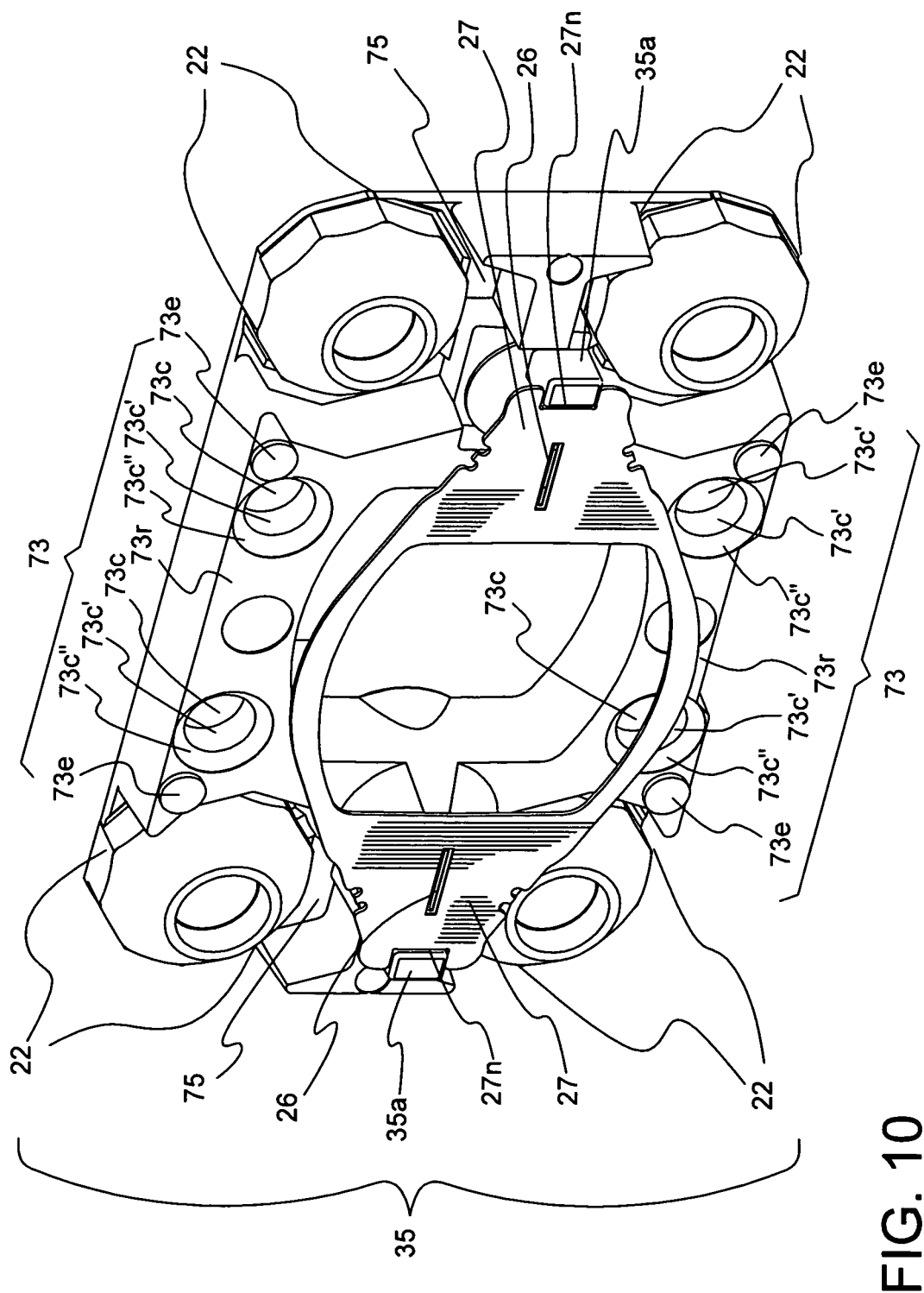
FIG. 10 is a rear perspective view of the optical plate and mounted aiming slit plate, of the imaging module embodiment shown in FIG. 8.
Figure 14:
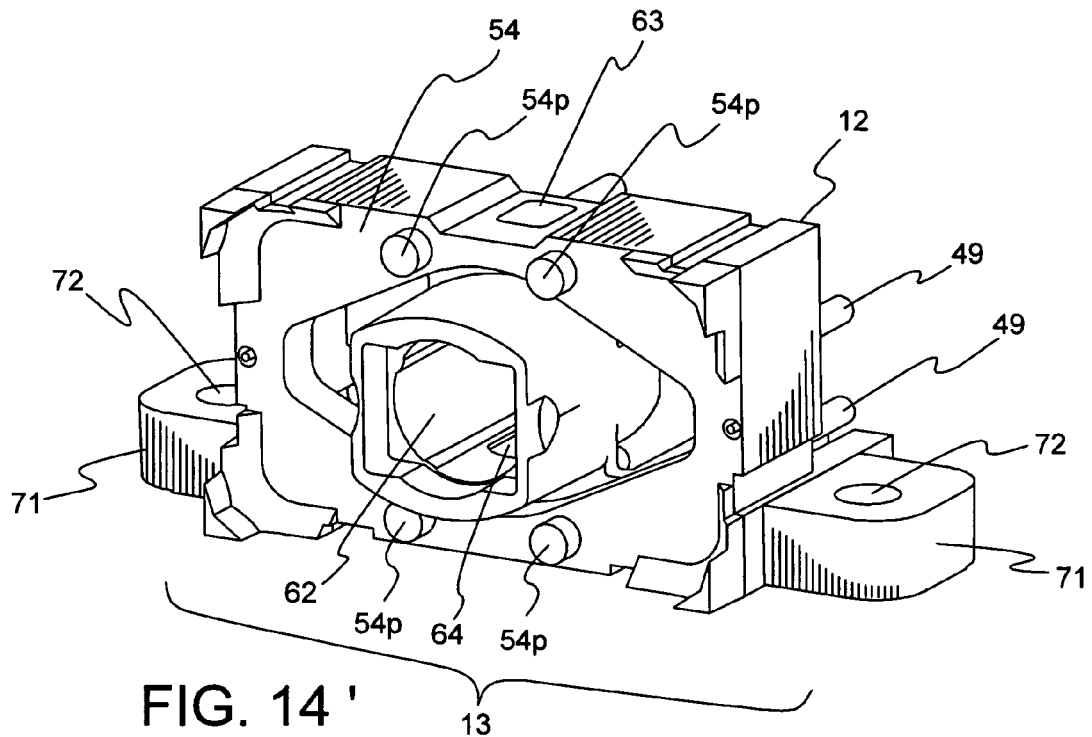
FIG. 14 is a rear perspective view of an illumination housing of the invention, showing securing projections for mating with an aiming housing.
Figure 14:
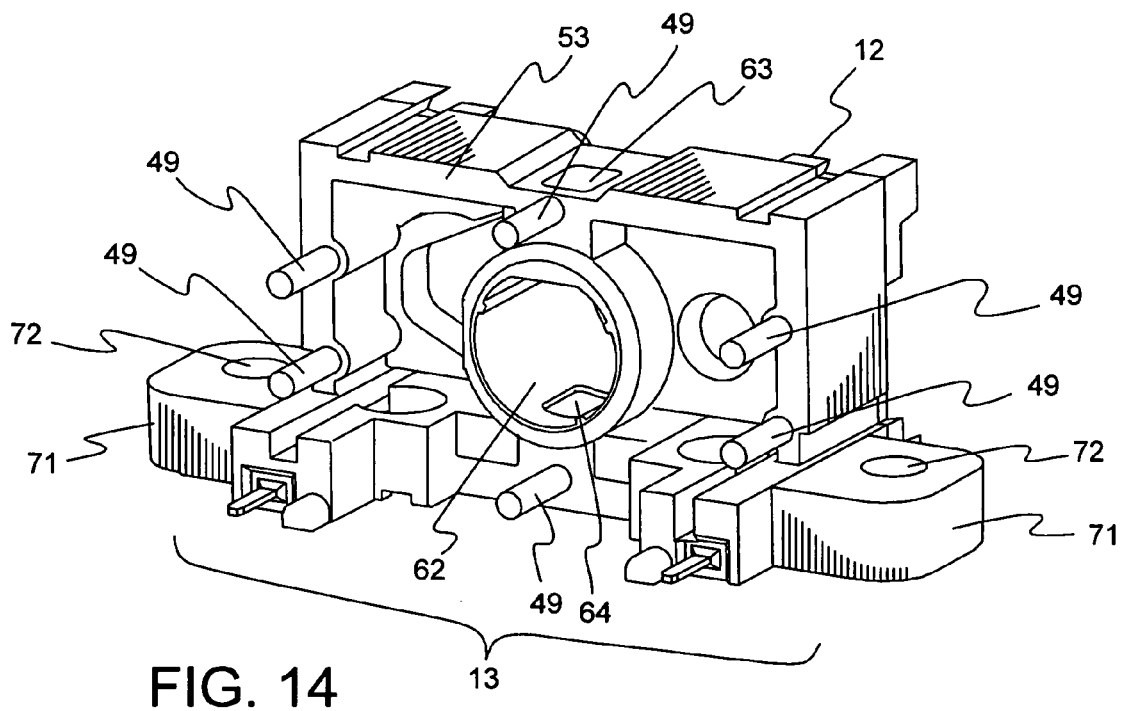

With reference to FIGS. 8, 10, and 14', elevated locator section 73 of optical plate 35—rising from optical plate rear surface 75—and locator projections 54p—extending from front surface 54 of illumination housing 12—serve to position optical plate 35 properly on illumination housing front surface 54—particularly so that aimer imaging lenses 21, illumination lenses 22, and aiming slits 26 are correctly aligned. In this regard, locator edges 73e provide the requisite spacing of optical plate 35 from front surface 54 in the Z dimension, while locator cavities 73c mate with corresponding locator projections 54p, to provide correct positioning of optical plate 35 on front surface 54 in the X and Y dimensions.

Locator cavities 73c, and their respective locator projections 54p, are complementarily sized and shaped for snug engagement of the latter in the former.

In a first embodiment, as shown in FIG. 14', locator projections 54p are cylindrical. In a corresponding first embodiment, locator cavities 73 can be of complementary cylindrical configuration.

Figure 16:
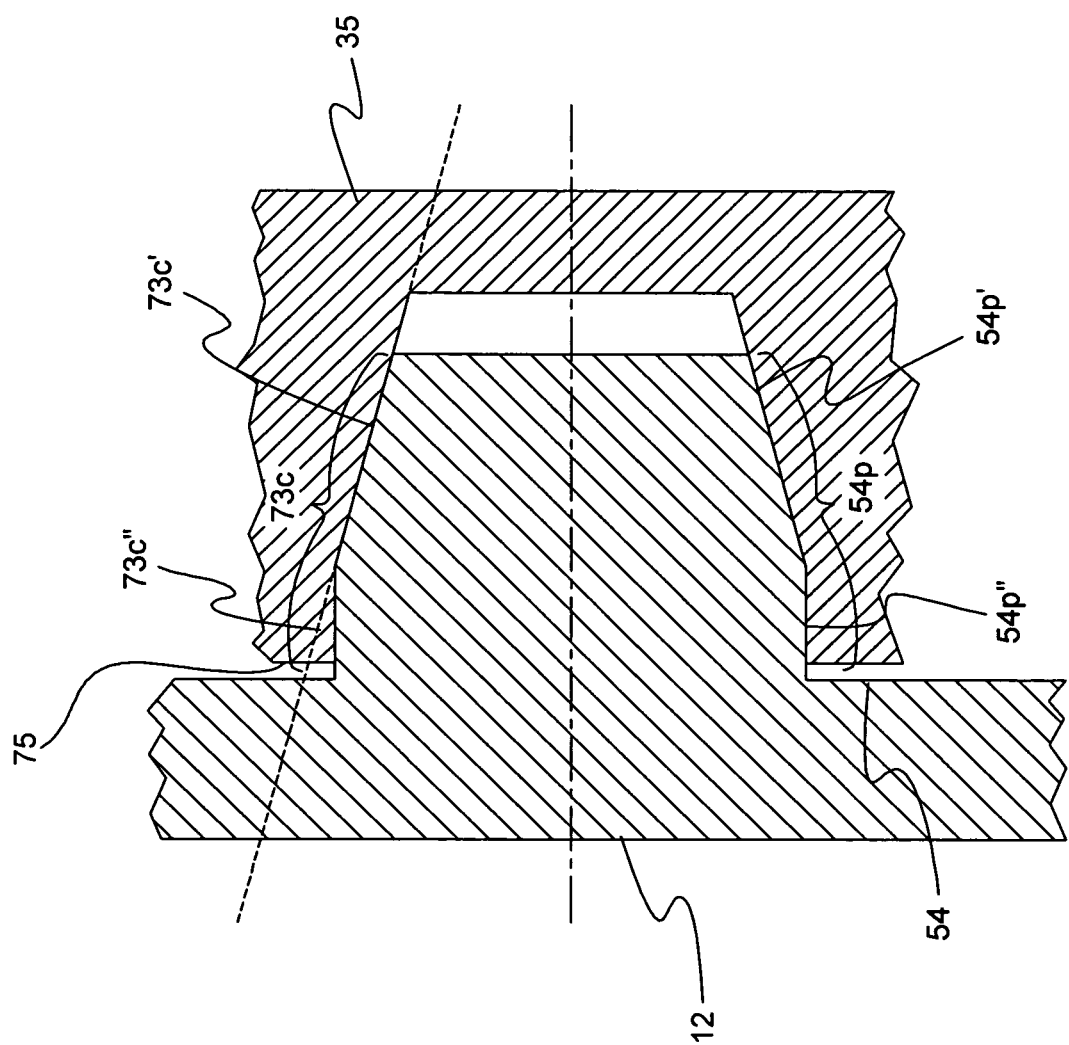
FIGS. 16 and 16' are cutaway side functional views, in section, showing different embodiments of the locator projections and cavities for joining an illumination housing and optical plate.

Corresponding second embodiments of these locator components are depicted in FIG. 16. Here, locator cavities 73c have a beveled, or conic, lower section 73c', tapering toward the front surface of optical plate 35, and a cylindrical upper section 73c". Further, locator projections 54p have a conic upper section 54p', tapering away from illumination housing front surface 54, and a cylindrical lower section 54p". The bevel angle of each lower section 73c' matches, or essentially matches, the conic angle of its mating upper section 54p'—these bevel and conic angles are equal, or sufficiently, or essentially, or substantially equal—so as to facilitate snug engagement.

In third embodiments, as shown in FIGS. 10 and 16', locator cavities 73c have a cylindrical lower section 73c', and a beveled, or conic, upper section 73c", tapering toward the front surface of optical plate 35; locator projections 54p have a cylindrical upper section 54p', and a conic lower section 54p" tapering away from illumination housing front surface 54. The bevel angle of each upper section 73c" matches, or essentially matches, the conic angle of its mating lower section 54p"—these bevel and conic angles are equal, or sufficiently, or essentially, or substantially equal—so as to facilitate snug engagement. And moreover, these corresponding third embodiments of locator cavities 73c and locator projections 54p provide a particular additional advantage, in that the tapering configuration of upper section 73c" helps to guide locator projections 54p into their respective locator cavities 73c, and thereby facilitates the proper mating of optical plate 35 and illumination housing 12.

Further with reference to FIG. 10, from locator edges 73e toward the center of optical plate 35, the height of elevated locator section 73 decreases slightly, to form recesses 73r, which serve as sites for the placement of adhesive to bond optical plate 35 and illumination housing 12. The relatively shallow depth—in comparison with edges 73—of recesses 73r provides sufficient space so that adhesive is not forced out by the joining of optical plate 35 and illumination housing 12. Epoxy adhesives, as known in the art, may be used for this purpose. Commercially available adhesives that are suitable include Black Max 380 rubber toughened cyanocrylate, PRISM 401 surface insensitive cyanocrylate, PRISM 4011 surface insensitive cyanoacrylate, 3105 light cure acrylic, and 3311 light cure acrylic, from LOCTITE Corporation, Rocky Hill, Conn.

Figure 17:
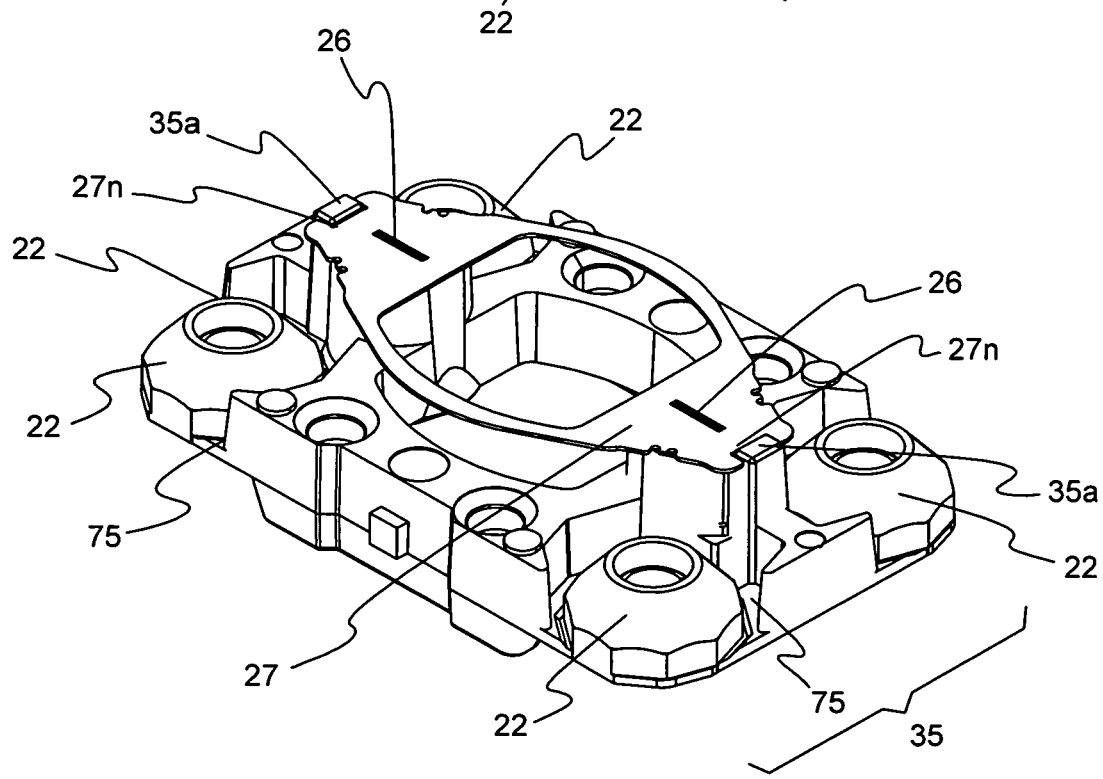
FIG. 17 is a rear perspective view of an aiming slit plate mounted on an optical plate.

As seen in FIGS. 10 and 17, aiming slits 26 are located in aiming slit plate 27, which preferably is comprised of stainless steel. Optical plate 35 includes positioning abutments 35a, and aiming slit plate 27 has notches 27n; aiming slit plate 27 is mounted on optical plate 35 by the engagement of notches 27n with abutments 35a; this engagement effects proper alignment of aiming slits 26 on optical plate 35. Aiming slit plate 27 may be bonded to optical plate 35, at abutments 35a, by a small amount of suitable adhesive, preferably placed over notches 27n of mounted optical plate 35. Preferred for this purpose are room temperature vulcanizate (RTV) silicone adhesives.

Further with regard to the illumination optics, as shown in FIGS. 8-10, 17, and 18, each tulip lens 22 comprises bottom rim 28, lower convex surface 29, upper convex surface 30, inner cylindrical surface 31, outer conic surface 32, and redirecting circumferential conic outer portion 87. Tulip lens lower convex surface 29 comprises apex 33, and tulip lens upper convex surface 30 comprises apex 34.

Tulip lenses 22 are situated in front of illumination light sources 5i. Each illumination light source 5i is positioned within the circular space defined by tulip lens inner cylindrical surface 31.

Corresponding to the crucial placing of an aiming light source 5a with respect to the corresponding aimer focusing lens 17, exact positioning of an illumination light source 5i relative to its tulip lens 22—particularly where the illumination light source 5i is an LED die—is required for efficient tulip lens performance. Accordingly—in particular referring to FIGS. 3B and 9—connector 2 and interconnectors 3, of illumination subassembly 13, are situated in illumination housing 12 to space seating sections 2s and 3s precisely at the proper distance from apex 33 of the corresponding tulip lens lower convex surface 29, so that each illumination light source 5i correspondingly is precisely distanced from apex 33—i.e., in the Z dimension. And to align each illumination light source 5i precisely with its tulip lens lower convex surface apex 33, the illumination light sources 5i also are precisely placed on their respective seating sections 2s or 3s—i.e., in the X and Y dimensions.

To prevent interference with the internal reflection characterizing the tulip lens, its outer conic surface must not be in contact with any other component surfaces. Accordingly, spacer 36 is formed in optical plate 35, to distance each tulip lens outer conic surface 32 from illumination housing 12.

To minimize the chance of spacer 36 interfering with internal reflection, preferably it is positioned as far as possible from the outer conic surface of the tulip lens. Accordingly, spacer 36 is located at front surface 37 of optical plate 35.

Spacer 36 may instead be formed in illumination housing 12. Yet further, it may be an independently formed component, distinguished from but abutting and separating both optical plate 35 and illumination housing 12. Where internal reflection is utilized, an essential property of spacer 36 is that it prevent tulip lens outer conic surface 32 from touching illumination housing 12, which would result in a reduction of the level of internal reflection provided by tulip lens 22.

However, as an alternative to internal reflection—and particularly to total internal reflection—outer conic surface 32 may provide the requisite redirection of light by other suitable means. One such means would be the plating of surface 32 to form a mirror thereon. Another would be the coating of surface 32 with white paint. Such a coating, in redirecting light toward the target area, would effect scattering, rather than reflection, of the light. Accordingly, while coating is suitable, the indicated mirror plating is preferred, and internal reflection—especially total internal reflection—is yet more preferred.

With such alternatives, spacer 36 may still be present, and further may be situated to provide its indicated intended function. However, with these alternatives, this function of spacer 36 is not required, and accordingly neither is spacer 36 itself.

Figure 15:
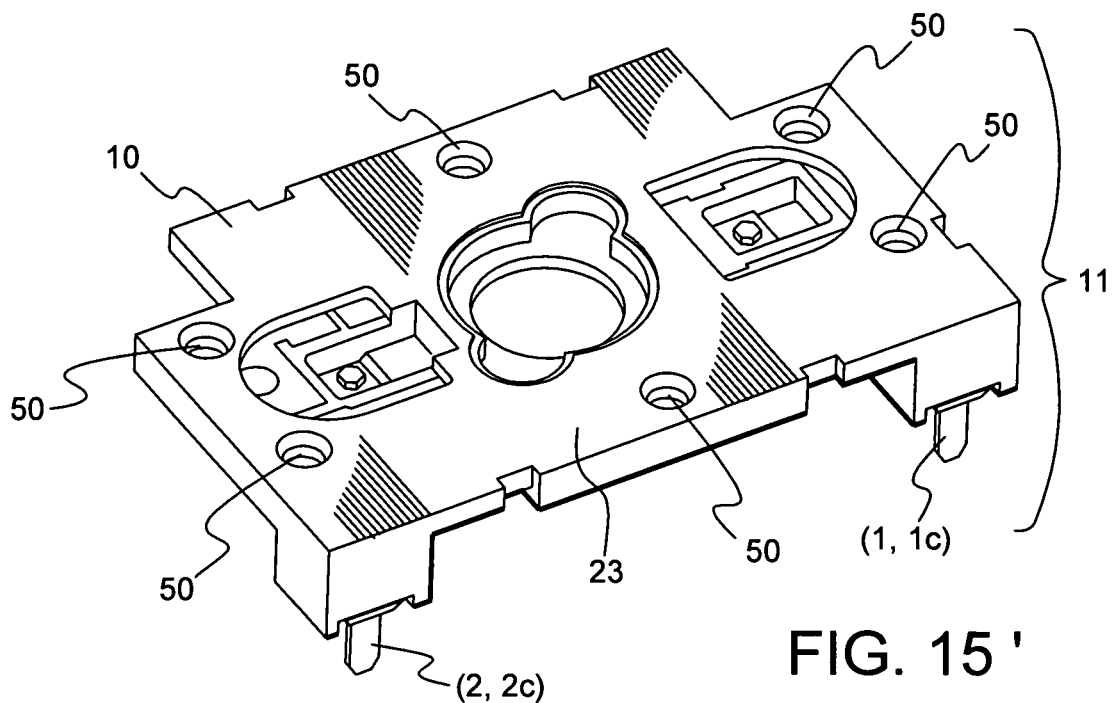
FIGS. 15 and 15' are rear and front perspective views of an aiming subassembly of the invention, showing the aiming housing receptor apertures for receiving the securing projections of an illumination housing.
Figure 15:
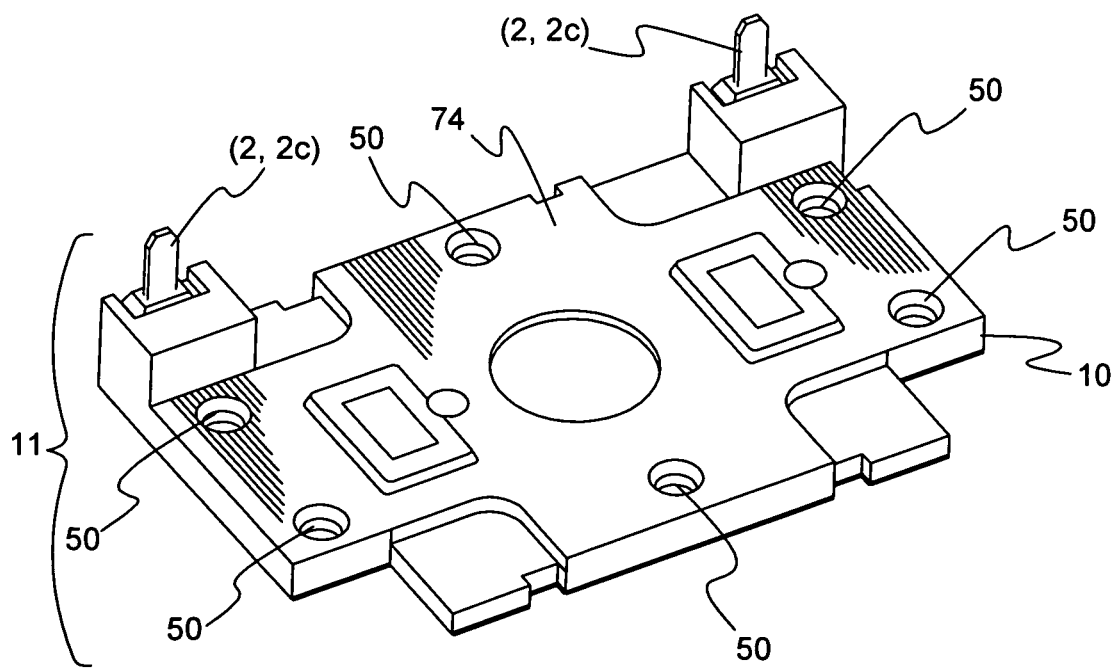
Figure 20:
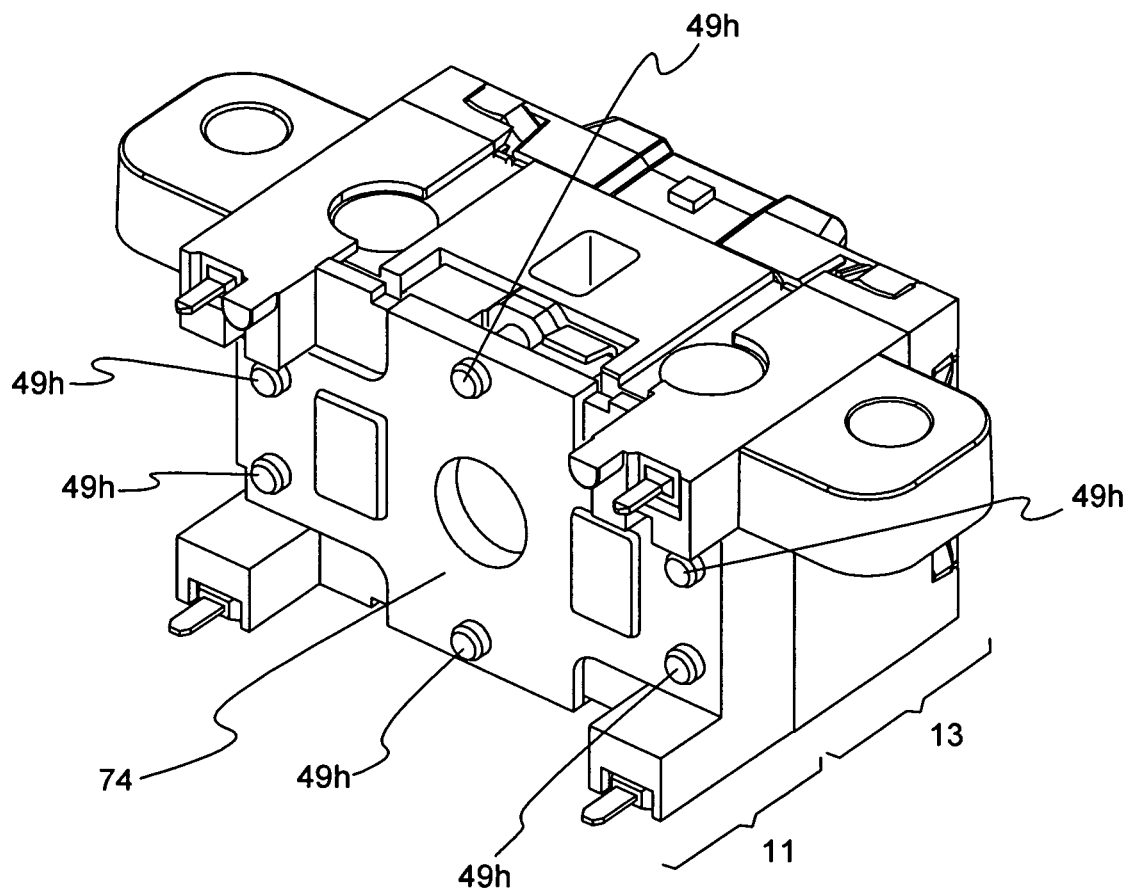
FIG. 20 is a rear perspective view of mated illumination and aiming subassemblies, and of securing projection heads keeping the two subassemblies joined.

Aiming subassembly 11 and illumination subassembly 13, as shown in FIGS. 3A and 3B, and in FIG. 8, are secured together by heat staking. Referring to FIG. 14, securing projections 49 of illumination housing 12 extend from rear surface 53 of this housing; FIGS. 15 and 15' show that receptor apertures 50 of aiming housing 10 extend completely through aiming housing 10, thusly opening onto both front surface 23 and rear surface 74 of this housing. In the heat staking process, securing projections 49 of illumination housing 12 are inserted completely through aiming housing receptor apertures 50—as seen in FIG. 19—to protrude therethrough, and thereby extend beyond aiming housing rear surface 74. To secure subassemblies 11 and 13 to one another, the protruding portions of projections 49 are deformed into heads 49h, as shown in FIG. 20—and correspondingly in FIG. 19, by the phantom lines delineating head 49h. The deformation is effected by suitable means, such as use of a heating element or an ultrasonic welder.

Like locator projections 54p and locator cavities 73c, securing projections 49 and receptor apertures 50 are complementarily sized and shaped for snug engagement of the former in the latter. Referring further to FIG. 19, aiming housing receptor apertures 50 have a cylindrical lower section 50', and a beveled, or conic, upper section 50", tapering toward aiming housing rear surface 74. Illumination housing projections 49 have a cylindrical upper section 49' corresponding to receptor aperture cylindrical lower section 50', a conic middle section 49" corresponding to receptor aperture conic upper section 50'", and a cylindrical lower section 49'", connecting projections 49 to illumination housing rear surface 53; it is the portion of cylindrical upper section 49' extending beyond aiming housing rear surface 74 that is deformed into head 49h. The bevel angle of aperture upper section 50" matches, or essentially matches, the conic angle of its mating projection middle section 49"—these bevel and conic angles are equal, or sufficiently, or essentially, or substantially equal—so as to facilitate snug engagement. Moreover, the complementarily tapering configurations of conic middle section 49" and beveled upper section 50" provide a self centering effect in the mating of illumination subassembly 13 and aiming subassembly 11, compelling these subassemblies into a tighter joining than would be provided in the absence of the tapering—e.g., than would be provided by mating projections and apertures of solely cylindrical configuration.

Image sensor 44 is mounted onto front surface 55 of printed circuit board 45, as shown in FIG. 8. Image sensor 44 includes image die 44d, ceramic or plastic substrate 44s, electrical leads 44L extending from the side of the major body of image sensor 44, and protective glass cover 44c. To mount image sensor 44 on printed circuit board front surface 55, electrical leads 44L are soldered or socketed to printed circuit board 45.

Figure 21:
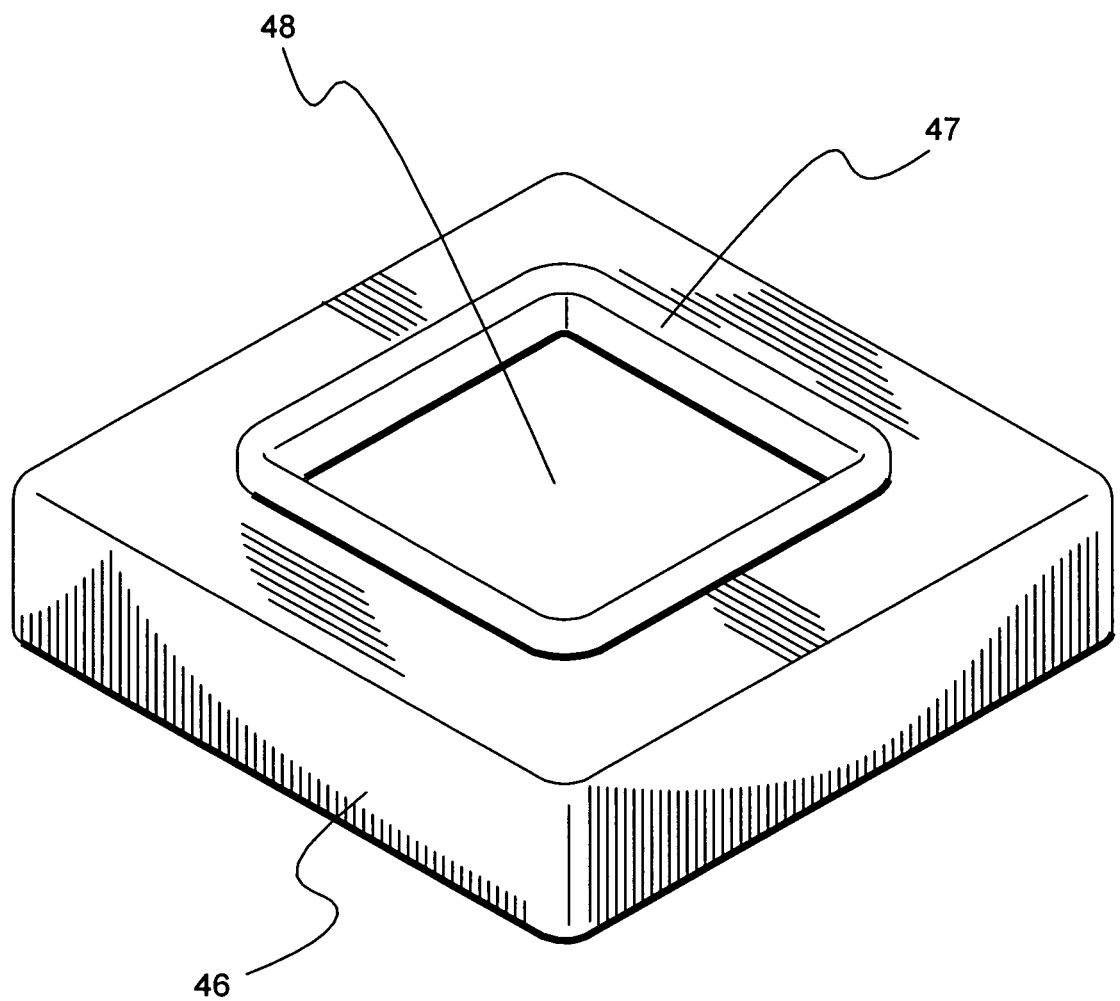
FIG. 21 is a perspective view of the imager cap of the invention.

Referring to FIG. 8, and particularly to FIG. 21, imager cap 46 includes aperture 48 and ridge 47. Aperture 48 is bordered all around by ridge 47, which extends up from the front surface of imager cap 46.

Figure 22:
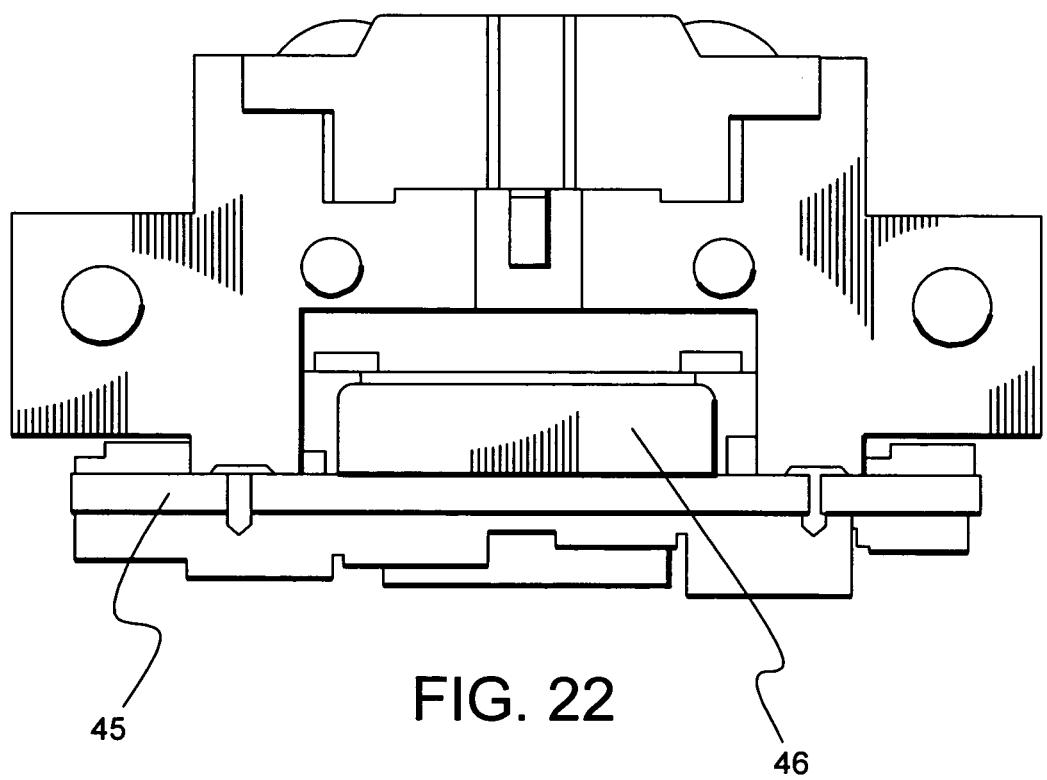
FIG. 22 is a top view of the imaging module embodiment of FIG. 8.

Image cap 46 serves to shield image sensor 44 from stray light. In serving this function, image cap 46 fits over image sensor 44 so that—as seen particularly in FIG. 22—the bottom rim of image cap 46 rests against printed circuit board front surface 55. Aiming subassembly 11 presses against ridge 47, and accordingly the bottom rim of image cap 46 in turn is pressed against printed circuit board front surface 55.

Imager cap 46, including ridge 47, is made from a comparatively softer, yielding material, such as a suitable elastomer, particularly a thermoplastic elastomer (TPE). Because of the pressure exerted by aiming subassembly 11, and the softer, yielding texture of imager cap 46, light and dust are prevented from passing either under the bottom rim of imager cap 46, or between ridge 47 and aiming subassembly 11, to reach image sensor 44.

A commercially available TPE that may be used is Monprene® 1023, having a shore A durometer of 80, from Teknor Apex Company, Pawtucket, R.I.

Figure 5C:
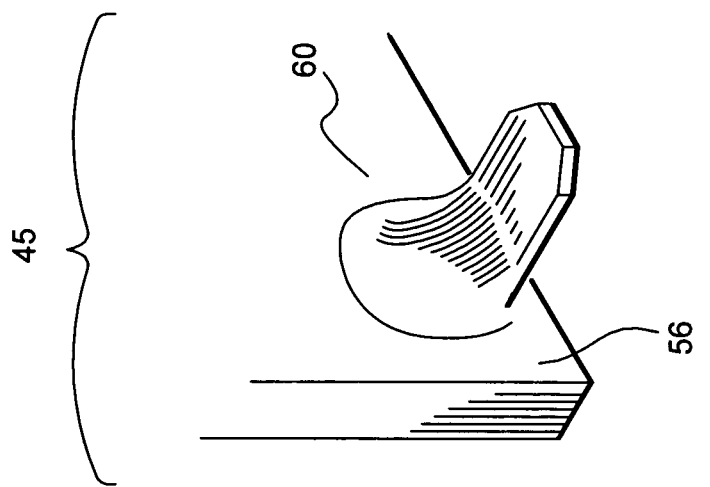
FIGS. 5A-5C are perspective views, of the mounting of a lead frame connector-receiver or connector-seat, at a mounting site of a printed circuit board of the invention.
Figure 5B:
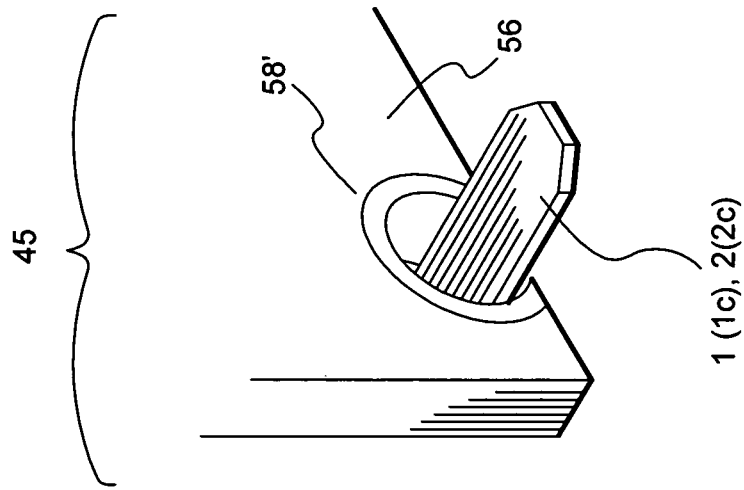
Figure 5A:
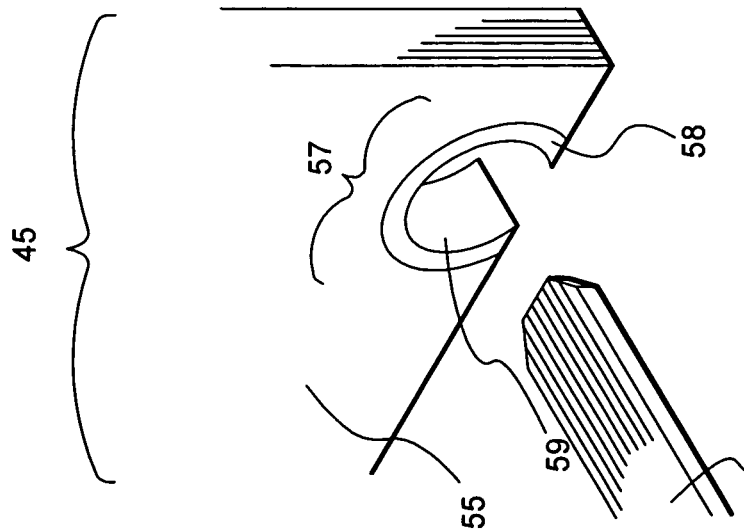
Figure 5C:
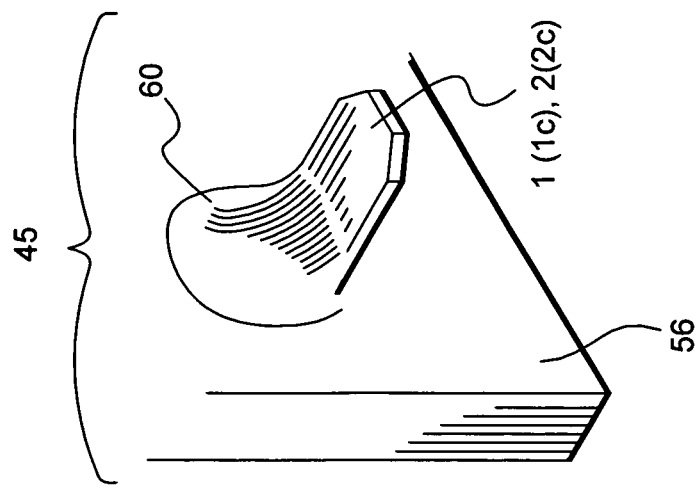
Figure 5B:
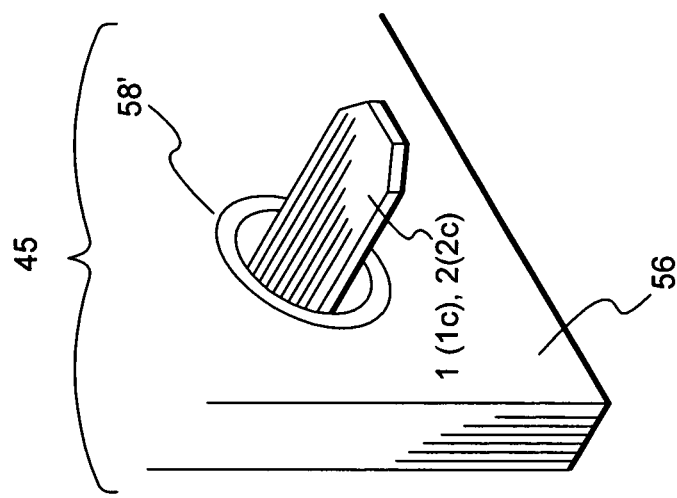
Figure 5A:
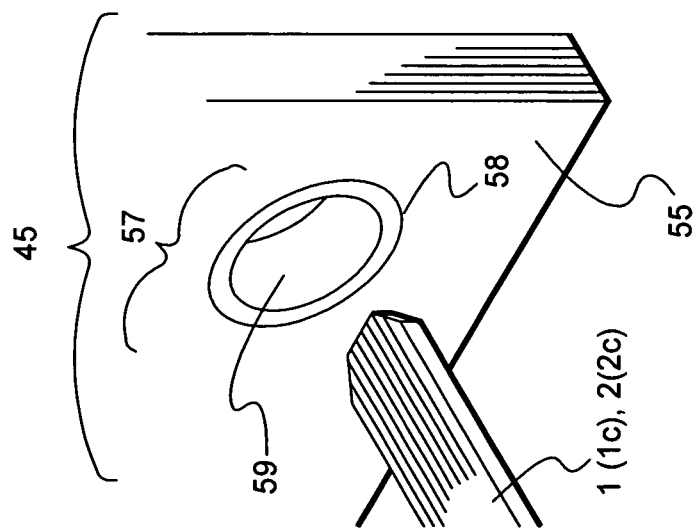

As depicted in FIG. 8, and particularly in FIGS. 5A-5C, printed circuit board 45 is provided with mounting sites 57. FIGS. 5A-5C show mounting sites 57 as a hole segment or groove. Groove 57 is electroplated through with copper, so that the interior of groove 57 is provided with copper lining 59. The copper plating extends to both front surface 55 and rear surface 56 of printed circuit board 45, with groove 57 thusly also having a bordering copper rim 58 on printed circuit board front surface 55, and a corresponding bordering copper rim 58' on printed circuit board rear surface 56.

Aiming subassembly 11 and illumination subassembly 13 are fixed to printed circuit board 45 at groove 57. The ends of connector-receiver 1 and connector-seat 2 (connector sections 1c and 2c, when the connector-receiver and connector-seat are accordingly configured) are laid in grooves 57, to extend from printed circuit board rear surface 56. These thusly protruding connector-receiver 1 and connector-seat 2 ends are secured by soldering, as represented by solder 60 in FIG. 5C. In this manner the copper plating and solder provide an electrical, thermal, and physical connection to lead frames 7, and correspondingly join aiming subassembly 11 and illumination subassembly 13, to printed circuit board 45.

As shown in FIGS. 5A'-5C', mounting sites 57 alternatively can be provided in the form of an aperture. In this embodiment, bordering copper rims 58 and 58' surround aperture 57 on printed circuit board front and rear surfaces 55 and 56, respectively, and the ends of connector-receiver 1 and connector-seat 2 (connector sections 1c and 2c, when the connector-receiver and connector-seat are accordingly configured) are inserted through apertures 57, to extend from printed circuit board rear surface 56.

Referring to FIG. 8, and to FIGS. 14 and 14', illumination housing 12 comprises optical channel 62, in which target imaging lens assembly 61, a barrel assembly, is slidably received. Preferably, barrel lens assembly 61 and optical channel 62 are manufactured to tight or extremely tight tolerances, so that target imaging lens assembly 61 does not move substantially radially within optical channel 62.

Illumination housing 12 further comprises adhesive receipt aperture 63 and elongated adjustment pin receipt aperture 64, both coextensive with the axis of optical channel 62, and both opening into optical channel 62. Preferably, adhesive receipt aperture 63 and elongated adjustment pin receipt aperture 64 are diametrically opposed. Focus adjustment groove 65 encircles the circumference of target imaging lens assembly 61.

Figure 12:
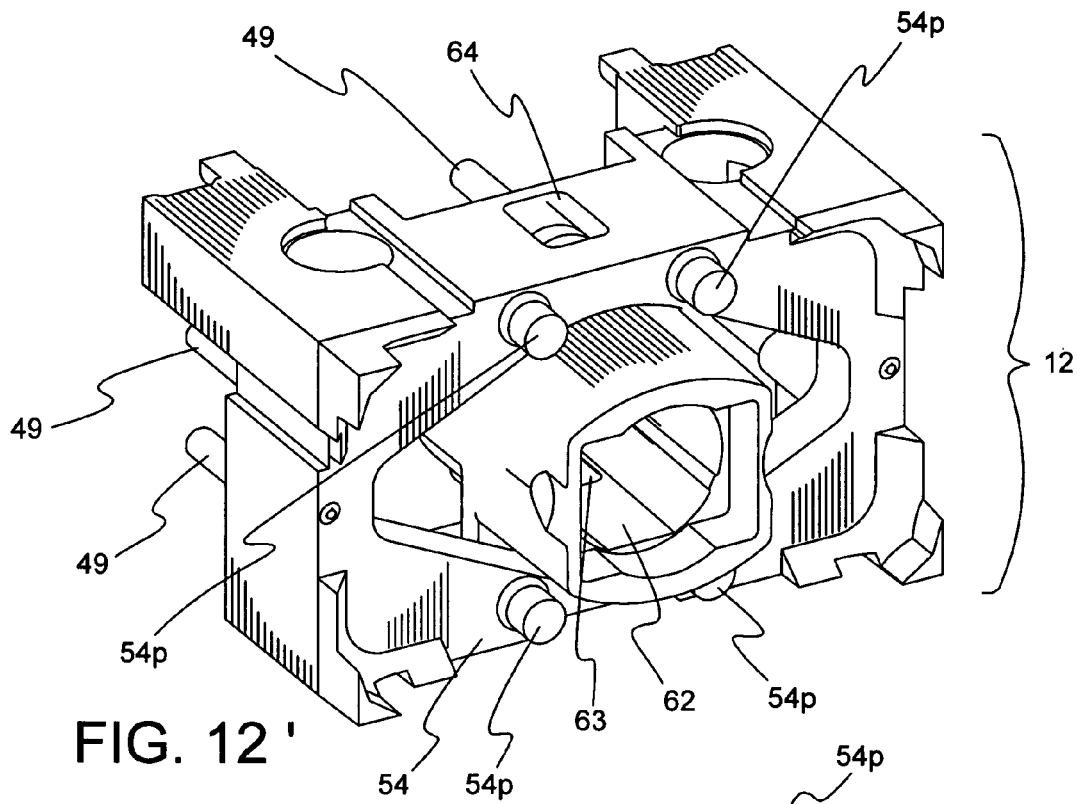
FIGS. 12 and 12' are top and bottom perspective views of an alternative embodiment of the illumination housing shown in FIG. 3B.
Figure 12:
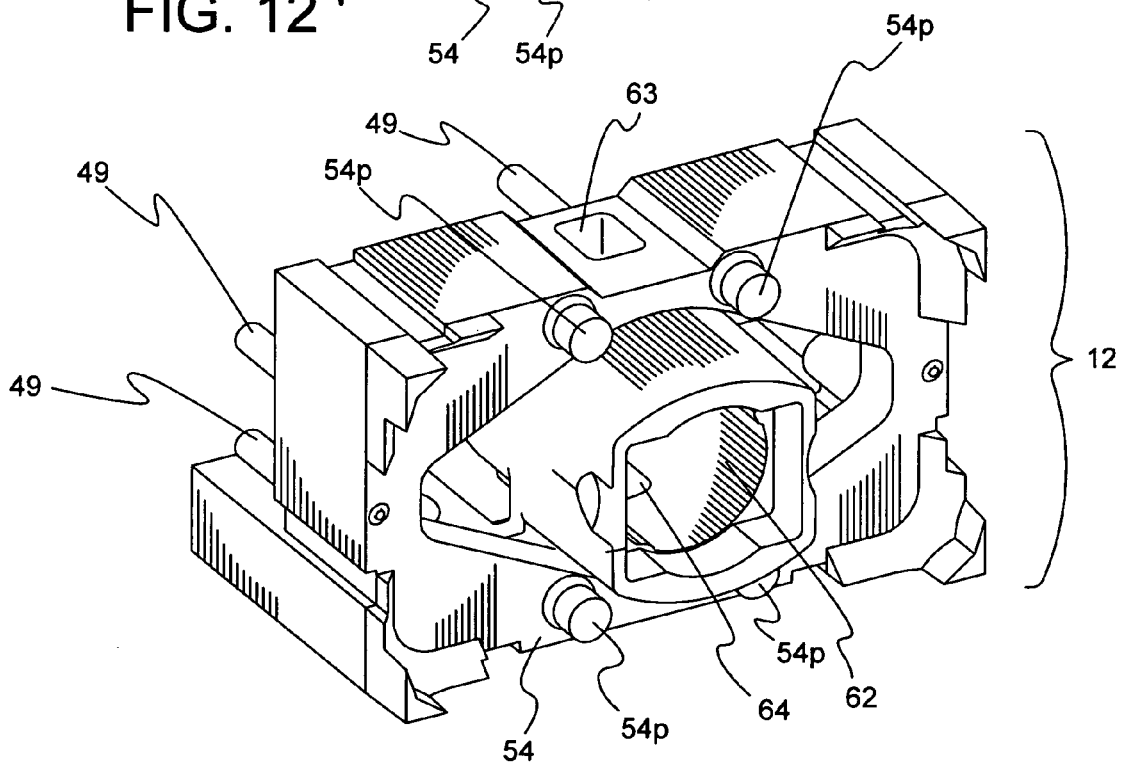

FIGS. 12 and 12' depict an alternative embodiment of illumination housing 12, this alternative embodiment being without mounting ears or wings 71. FIG. 12 shows this housing with its adhesive receipt aperture 63 uppermost; FIG. 12' is a reverse view, with the opposite housing side—and accordingly, elongated adjustment pin receipt aperture 64—on top.

The position of target imaging lens assembly 61 within optical channel 62 is adjusted to bring the lens assembly into the proper focus. Once focus is achieved, target imaging lens assembly 61 is fixed in position in optical channel 62 with an appropriate adhesive such as Loctite 4305 Flashcure Adhesive.

Figure 23:
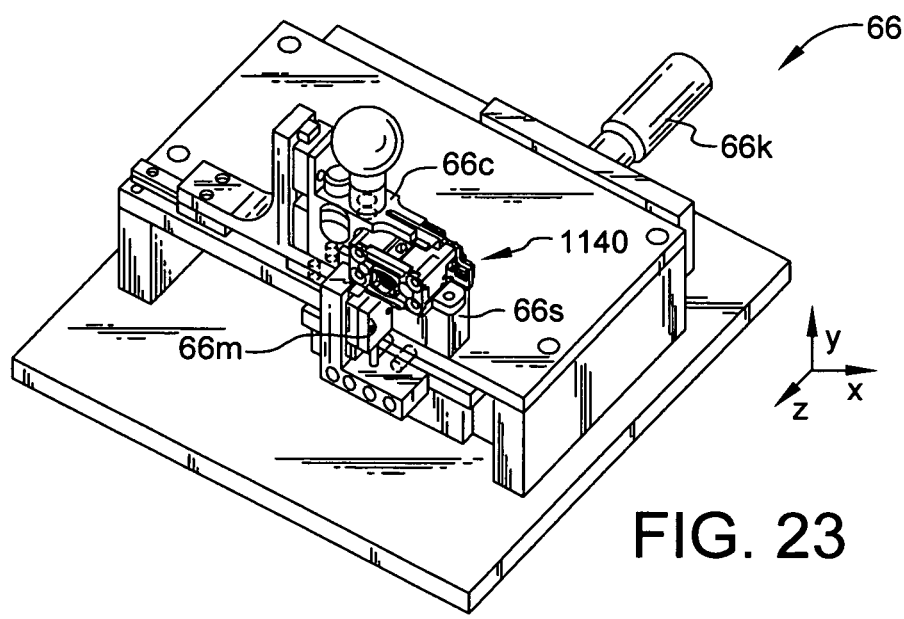
FIGS. 23 and 24 show views of a fixture which may be utilized in mounting a target imaging lens assembly within an optical channel according to the invention.
Figure 24:
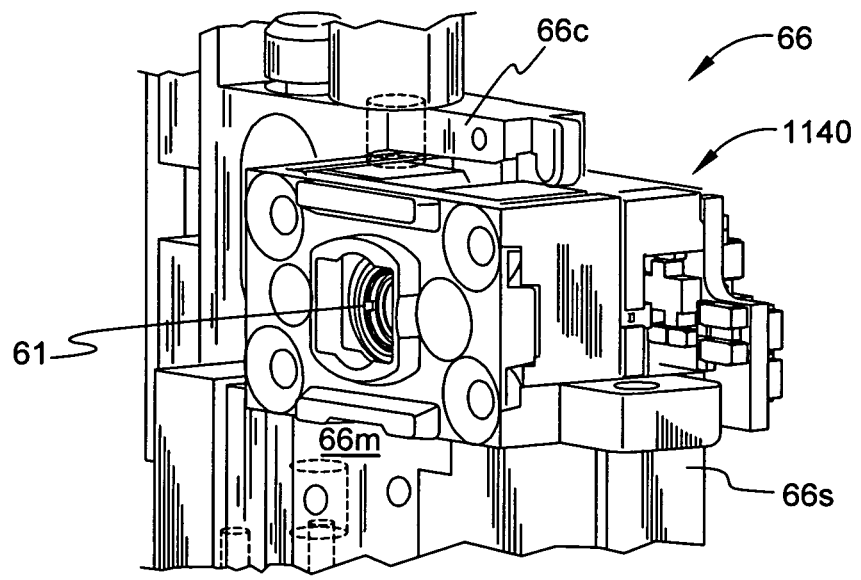

Specifically, for thusly adjusting and securing target imaging lens assembly 61, imaging module 1140—the imaging module of the invention—having target imaging lens assembly 61 nonfixedly residing in optical channel 62, is disposed in a fixture 66, which may be of a type as shown in FIGS. 23 and 24. Fixture 66 may include one stationary member 66s, one moveable member 66m that is moveable in small increments relative to stationary member 66s, adjustment pin 66p, positioned atop element 66m such that it protrudes through opening 64 (not visible in these figures), actuated by moveable member 66m, and a clamping device 66c that is actuatable for clamping the imaging module within fixture 66.

When imaging module 1140 is disposed in fixture 66, adjustment pin 66p of fixture 66 is passed through elongated adjustment pin receipt aperture 64 to engage barrel lens assembly focus adjustment groove 65. Thusly engaged, adjustment pin 66p is actuated by moveable member 66m of fixture 66 to move target imaging lens assembly 61 in optical channel 62. The lens-to-image sensor distance is then finely adjusted by adjusting the position of moveable member 66m of fixture 66 relative to the position of fixed member 66s. In the fixture of FIGS. 23 and 24, micrometer adjustment knob 66k is actuated to precision adjust the position of member 66m relative to member 66s.

When a desired lens-to-image sensor distance is achieved, an adhesive is disposed in adhesive receipt aperture 63 to bond target imaging lens assembly 61 in a fixedly secure position. The adhesive can be applied by means of an injection needle inserted into aperture 63. With target imaging lens assembly 61 fixed in position by this application of adhesive, adjustment pin 66p is retracted from aperture 64, and adhesive is also disposed therein to further secure barrel lens assembly 61 in place.

Adhesives suitable for thusly fixing target imaging lens assembly 61 in optical channel 62 include the cyanoacrylate based epoxy adhesives. Commercially available cyanoacrylate based epoxy adhesives that may be used are LOCTITE 401, LOCTITE UV 4304, LOCTITE 406, AND LOCTITE 4471, all available from LOCTITE Corporation.

Light emanates diffusely from LED dies, issuing from the entire exposed surface area of the die mounted on its seat or connector-seat. With reference to FIG. 8, and to FIGS. 3B and 9, illumination optics—particularly tulip lenses 22—are provided to collect as much as possible of the light from their respective illumination light sources 5$i$, and to distribute the thusly gathered light as evenly as possible over the image sensor 44 field of view.

Figure 6:
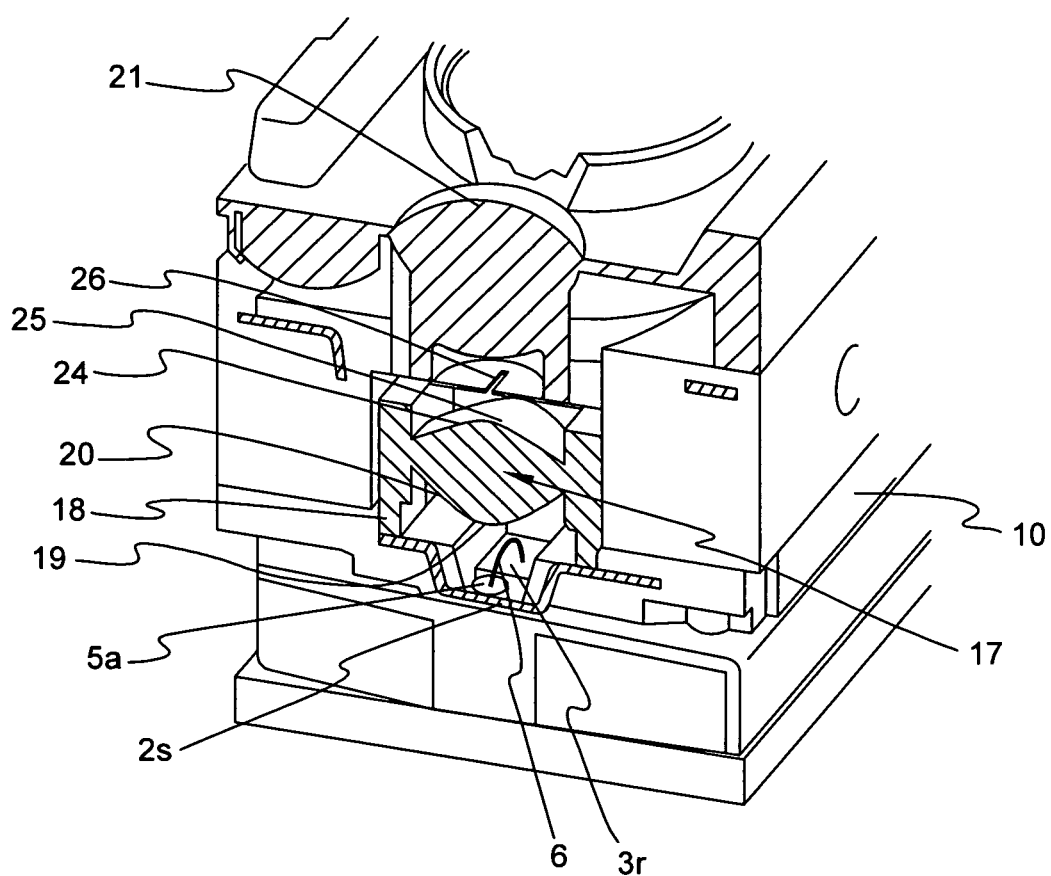
FIG. 6 is a cutaway perspective view, in the assembled state, of the aiming optic and light source components of the imaging module embodiment shown in FIG. 8.
Figure 6:
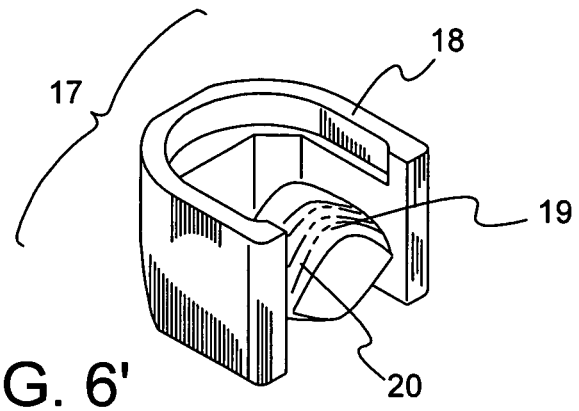
Figure 6:
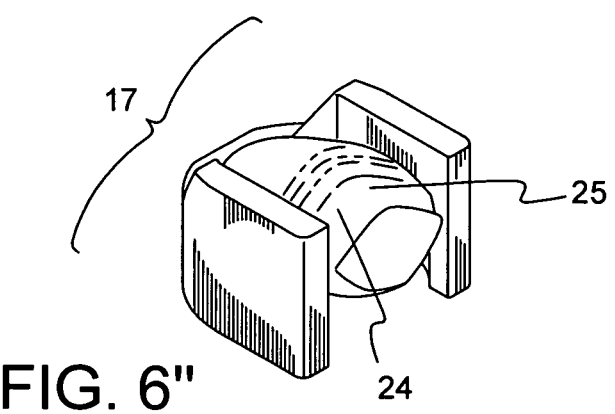
Figure 6:
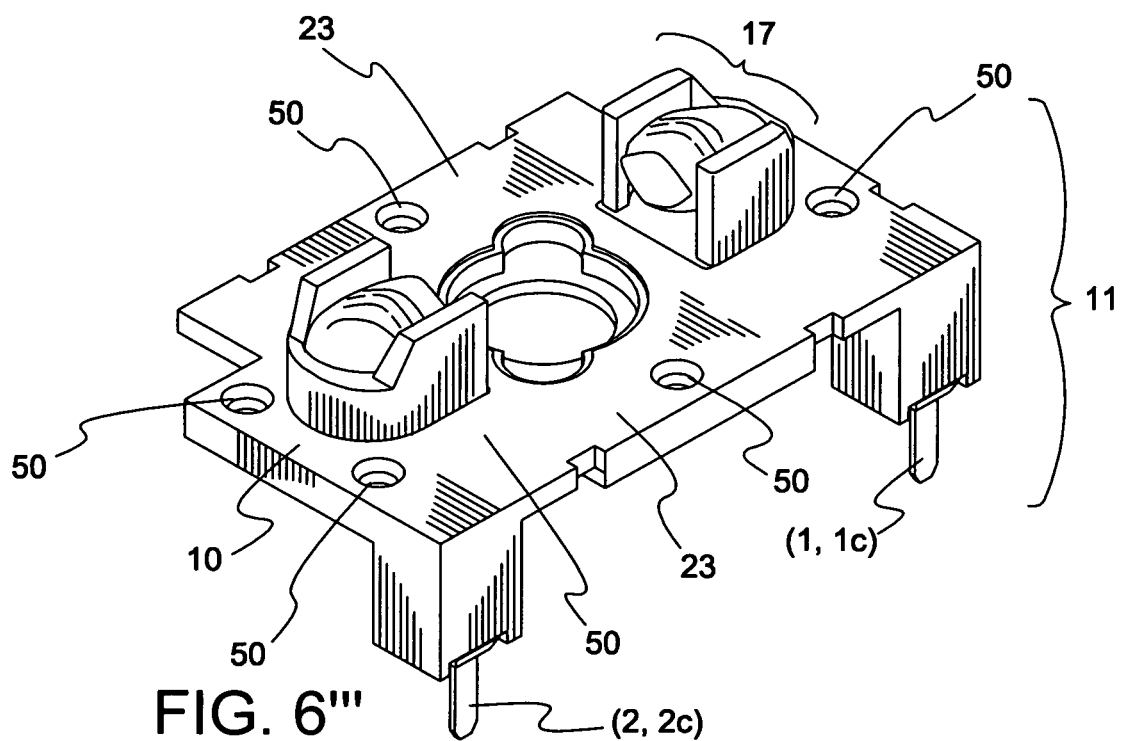

Further referring to FIG. 8, and correspondingly to FIGS. 3A and 6, the focusing optics—particularly, football or anamorphic lenses 17—also serve to collect as much as possible of the light emanating from their aiming light sources 5$a$. However, these optics focus their collected light through illumination housing apertures 67, down onto aiming slits 26. These slits shape the light into the form of a line, and the thusly configured light is organized by the aimer imaging lenses—particularly, aimer imaging lenses 21.

The imaged light continues from its imaging lens as a sharply defined and lengthening aiming line to be projected on the target. This projected line accordingly serves as an aiming pattern for aligning the imaging module with the intended target. In an imaging module of the invention having multiple aiming light sources, with their respective optics, preferably these aiming light sources and optics are configured—particularly, the imaging lenses are spaced apart—so that the lengthening aiming lines from the imaging lenses converge to form a single aiming pattern line as nearly as is possible at the target. In this regard, the indicated configuration can be to provide minimal overlap, of the lengthening aiming lines, to maximize the breadth of the resulting aiming pattern line. Alternatively, the configuration can be to provide maximal overlap, to maximize the brightness of the resulting aiming pattern line.

Light from the target area proceeds through aperture 68 of optical plate 35, aperture 69 of aiming slit plate 27, target imaging lens assembly 61, aperture 70 of aiming housing 10, and aperture 48 of imager cap 46, to reach image sensor 44.

One or multiple laser diodes may be used particularly as aiming light sources 5$a$ for the invention. Preferably a single laser diode is employed. An embodiment of the imaging module of the invention, thusly having a laser diode as aiming light source 5$a$, is shown in the assembly state in FIG. 13; a rear perspective view of this module is provided by FIG. 26.

Figure 27:
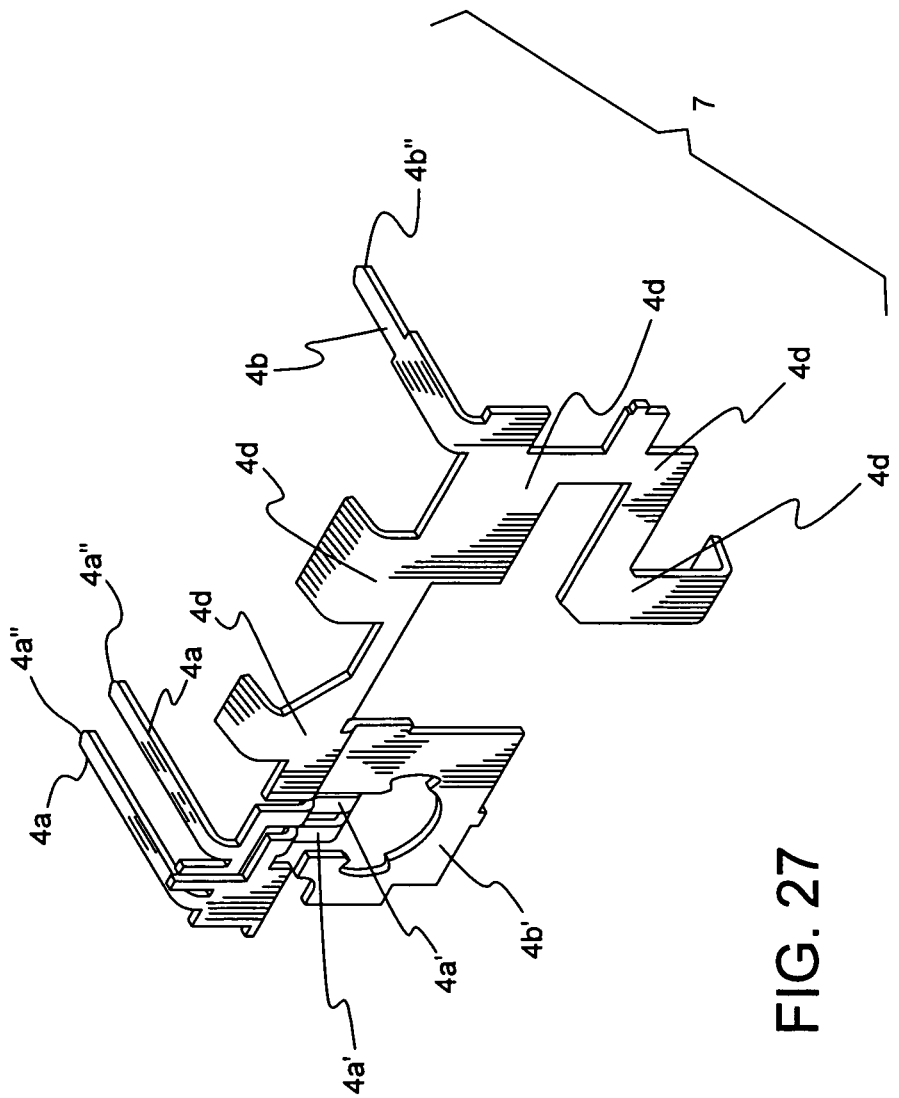
FIG. 27 is an aiming lead frame for a laser diode aiming light source, of the imaging module embodiment shown in FIG. 13.

Laser diode 5$a$ includes one or more leads 77; the embodiment shown in FIG. 29 has three leads 77. Aiming lead frame 7, as employed with one or multiple laser diode light sources 5$a$, comprises one or multiple connector-contacts; laser diode aiming lead frame 7 thusly includes a connector-contact for each laser diode lead 77. For the particular embodiment of aiming lead frame 7 as shown in FIG. 27, connector-contacts comprise two connector-contacts 4$a$, and one connector-contact 4$b$; each connector-contact 4$a$ includes contacting end 4$a'$ and connecting end 4$a''$, and connector-contact 4$b$ includes contacting end 4$b'$ and connecting end 4$b''$.

Connector-contacts serve both a connecting function and a contacting function. As its connecting function, a connector-contact acts to connect the circuit to the printed circuit board of the imaging module. As its contacting function, a connector-contact contacts a lead 77 of laser diode 5$a$.

Connector-contacts may also serve a heat dissipating function—in this capacity, acting to draw away, from laser diode 5$a$, heat generated thereby. Where a connector-contact additionally acts to dissipate heat, it can be configured as providing this function without a discernable heat dissipator section or sections—or it can comprise one or multiple heat dissipator sections 4$d$.

As with connector-receivers 1, connector-seats 2, and interconnectors 3, connector-contacts are electrically insulated from each other, and preferably also are physically separate from each other. Further as with connector-receivers 1, connector-seats 2, and interconnectors 3, connector-contacts are electrically conductive, and connector-contacts employed as heat dissipators are thermally conductive; preferably connector-contacts are both electrically conductive and thermally conductive.

Connector-contacts may be composed of the materials, particularly suitable metals and alloys, as indicated for lead frame components, and further may be provided with plating stated as being suitable for lead frames. And yet additionally, preferably connector-contacts are resilient, for facilitating contact with their respective laser diode leads 77.

Figure 13:
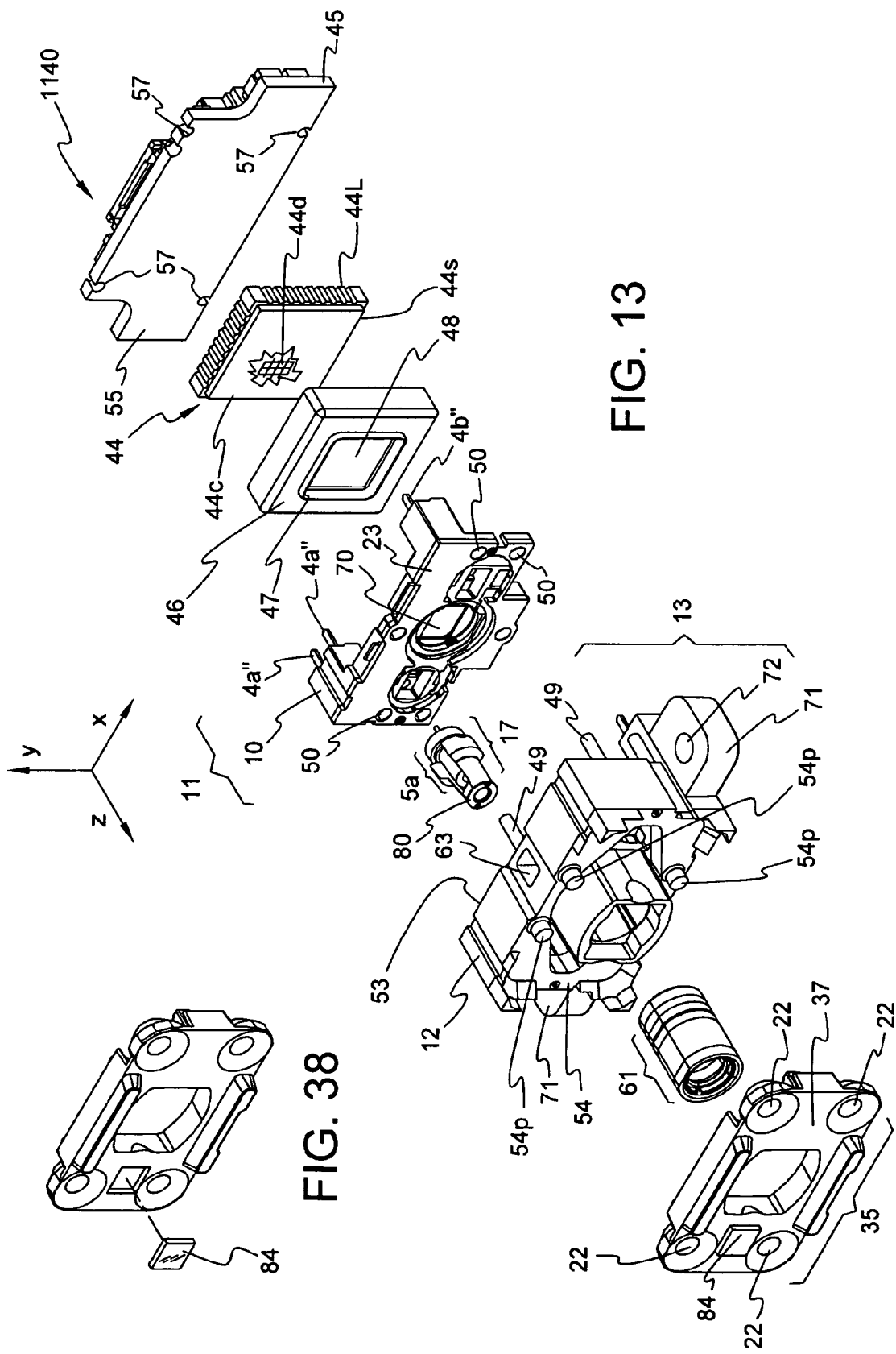
FIG. 13 is a perspective assembly view of an alternative embodiment, of the imaging module of the invention, employing a laser diode as the aiming light source.

Laser diode aiming lead frame 7, comprising one or multiple connector-contacts, is located in a housing; FIG. 13 shows laser diode aiming lead frame 7 thusly situated in housing 10, thereby providing aiming subassembly 11. Connecting ends 4$a''$ and 4$b''$, of laser diode aiming lead frame 7, extend out of the housing legs of aiming housing 10. The positioning of the one or multiple connector-contact components in the housing can be precisely controlled, as with a lead frame comprising a connector-receiver and a connector-seat. And correspondingly, the laser diode aiming housing 10 likewise can comprise the same material—e.g. a suitable plastic—and the laser diode subassembly 11 can be prepared in the same manner—e.g., by means of a molding process, such as that indicated.

As seen In FIG. 13, laser diode 5$a$ is associated with an aimer focusing optic 17—preferably an aimer focusing lens 17—located in front of the laser diode aiming light source. For laser diode 5$a$, aimer focusing optic 17 preferably is a collimating optic—as a matter of particular preference, a collimating lens. Suitable collimating lenses include plano-convex, convex, and biconvex lenses. Preferably, the collimating lens employed as aimer focusing lens 17 is a biconvex lens; as a matter of particular preference, the lens is a symmetrically biconvex lens.

Aimer focusing lens 17 preferably comprises upper lens surface 17$s$ and lower lens surface 17$s'$, as seen in the embodiment shown in FIGS. 29' and 29''. This embodiment, which is a biconvex collimating lens, is seated on the top of laser diode 5$a$, as shown in FIG. 29. In the mounting process, lens 17 is spaced away from laser diode 5$a$ on the Z axis to provide the proper distance, between the lens and laser diode, for focusing the emitted light beam; further as to placement, the positioning of lens 17 with respect to laser diode 5$a$ is also adjusted on the X, Y, and Z axes to effect the requisite focusing—particularly, to achieve an equal, or at least essentially equal, energy profile in the emitted light beam. When lens 17 and laser diode 5$a$ are correctly positioned, with respect to each other, in the X, Y, and Z dimensions, they are held in position by suitable means—such as a mechanism as is known in the art—and bonded together with an appropriate UV adhesive, particularly a UV epoxy. The lens is fixed in place by means of UV radiation.

Figure 37:
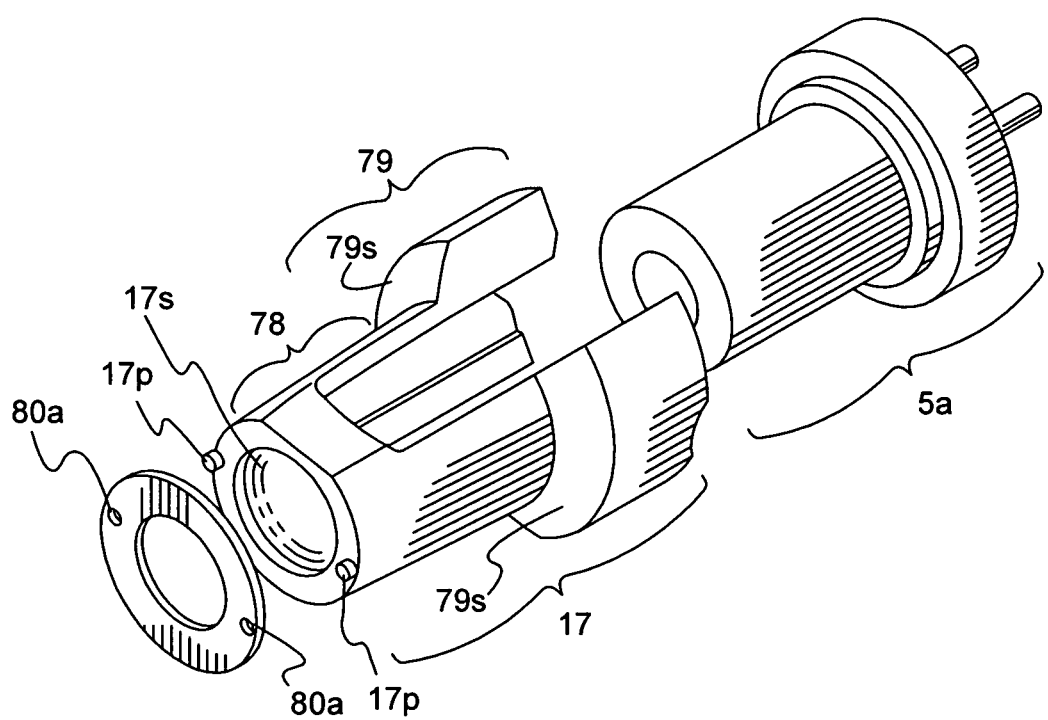
FIG. 37 is a perspective assembly view of an aperture stop, a laser diode aiming light source of the invention, and another embodiment of the laser diode aimer focusing lens of the invention.

In an alternative embodiment, collimating lens 17 may be in the form of a sleeved collimating lens—as shown in FIG. 13, and particularly in FIG. 37. Here, the lens is formed in—preferably, molded into—a sleeve that fits over laser diode light source 5$a$. Sleeved collimating lens 17 includes base 79 and neck 78, and base 79 in turn includes a curved outer surface 79s joining neck 78. Base curved outer surface 79s is a rounded lip, or rim, that surrounds base 79, and forms part of a sphere—i.e., it defines a sphere, in that it would form a sphere if carried to completion.

Laser diode 5a is inserted into sleeved collimating lens 17, and, as with the prior lens 17 embodiment, its location therein is adjusted on the Z axes to effect the indicated focusing objectives. When laser diode 5a is properly positioned in sleeved collimating lens 17, it is fixed in place with a suitable adhesive.

Preferably, and as a matter of particular preference in the embodiments of collimating lens 17 as discussed—upper lens surface 17s and lower lens surface 17s' are configured so that, mounted in the imaging module of the invention, lens 17 focuses light passing therethrough at a point forward of the module. This focus point preferably is at a distance of about 8 to 15 inches from the lens.

As with optical plate 35, collimating lens 17 is molded from a transparent plastic, with the same plastics also being preferable and suitable. Suitable transparent cyclic olefin copolymers, particularly those of optical grade, are preferred. A commercially available cyclic olefin copolymer that may be used is TOPAS® 5013S-04, from Topas Advanced Polymers, Inc, Florence, Ky.

Preferably, aperture stop 80, in the form of a ring or annular element, is situated in front of collimating lens 17—as shown in FIG. 13; particularly with reference to FIGS. 29-29''', and to FIG. 37, aperture stop 80 can be positioned on either of the indicated collimating lens embodiments. Aperture stop 80 serves to control—particularly, to limit—the diameter of the light beam originating from laser diode 5a, and emerging from collimating lens 17, and likewise participates in shaping the beam; aperture stop 80 also eliminates the effect of any directional nonuniformity in the distribution of light around the aiming optical axis. Aperture stop 80 can be mounted to lens 17 by heat staking—with aperture stop 80 fitted, by means of its heat staking apertures 80a, over collimating lens projections 17p, and the portions of projections 17p that protrude out of apertures 80a being deformed into heads by suitable means, such as use of a heating element or an ultrasonic welder.

The aperture stop as disclosed in U.S. Pat. No. 6,060,722 may be employed with laser diode 5a. This patent is incorporated herein in its entirety, by reference thereto.

Figure 26:
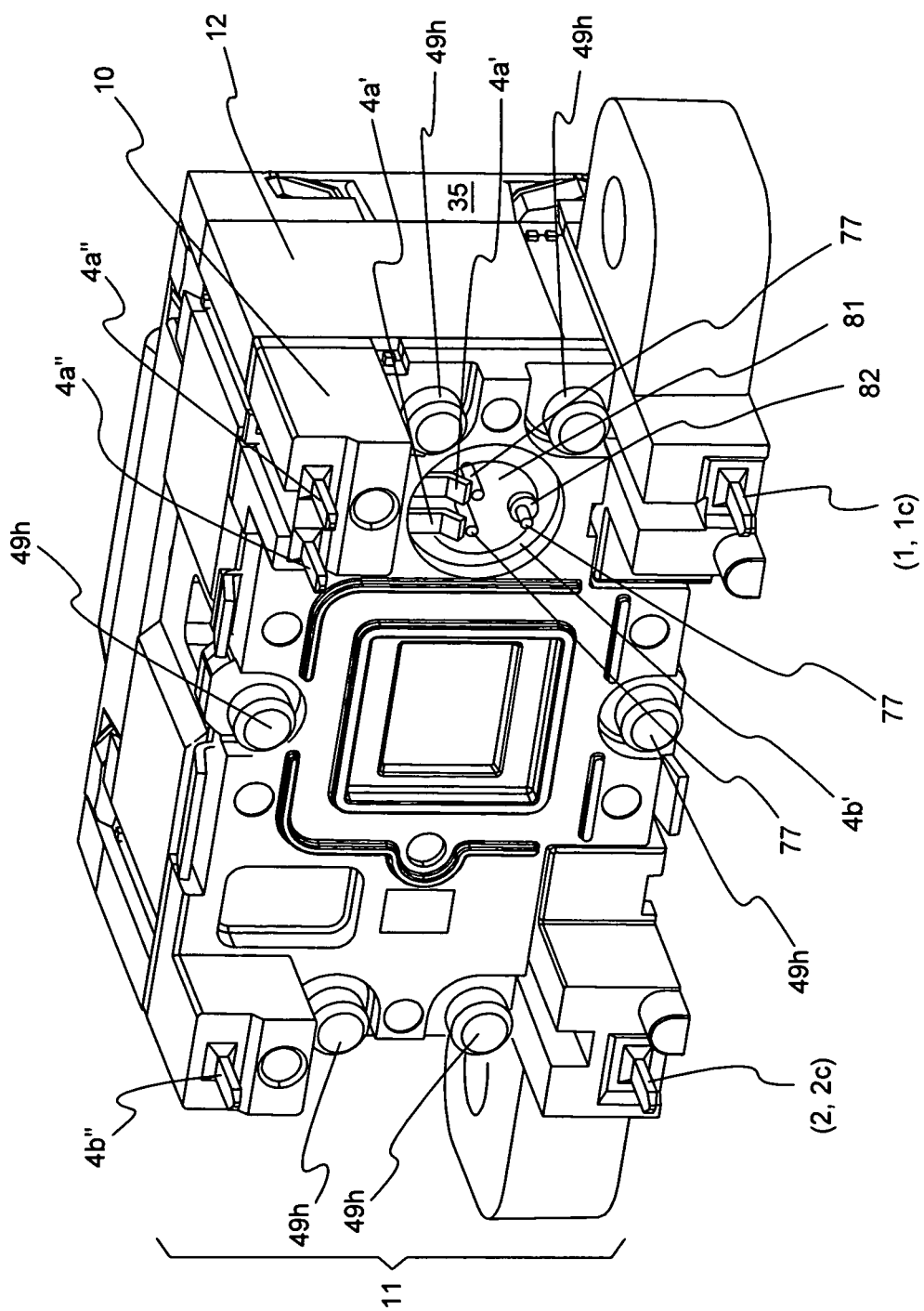
FIG. 26 is a rear perspective view, in the assembled state, of the imaging module embodiment shown in FIG. 13.
Figure 31:
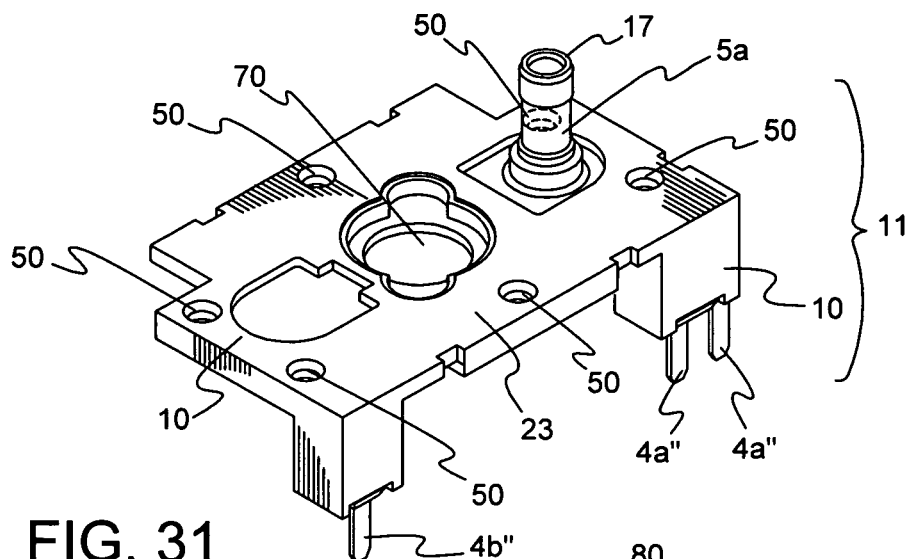
FIGS. 30-32 are cutaway side, front perspective, and rear perspective views of the aperture stop, aimer focusing lens, and laser diode aiming light source mounted on an aiming subassembly.
Figure 30:
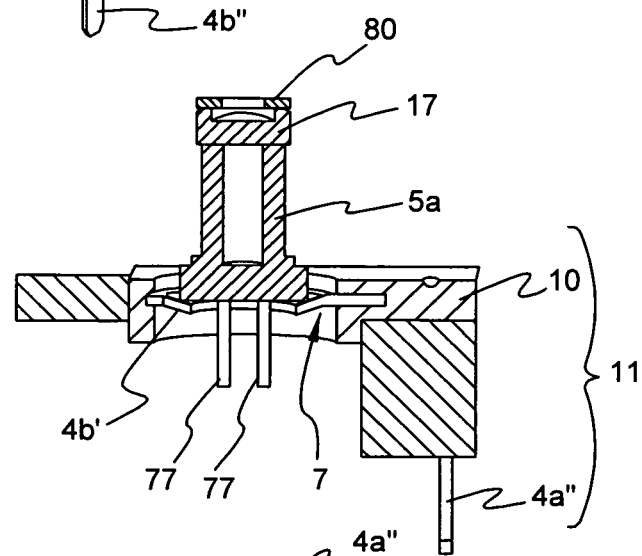
Figure 32:
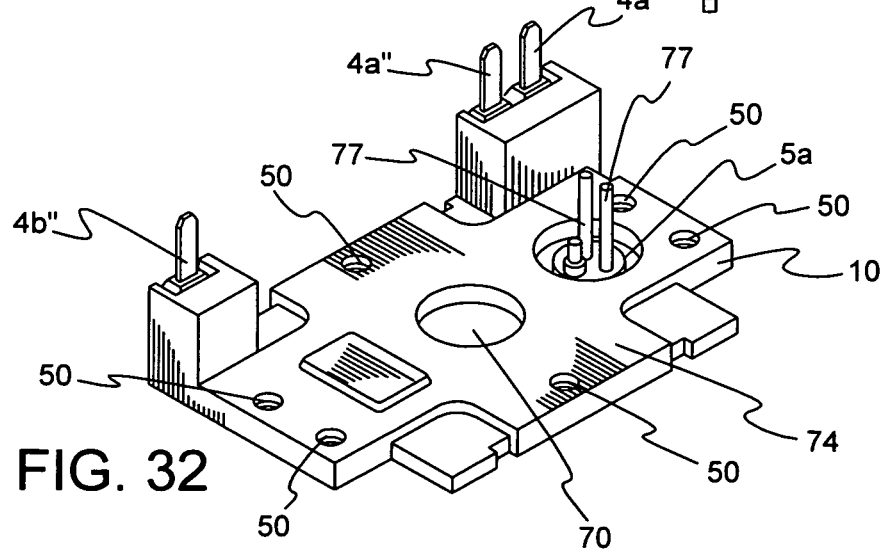

Referring to FIGS. 30-32, laser diode light source 5a—bearing collimating lens 17 and (if employed) aperture stop 80—is itself mounted in aiming subassembly 11 on lead frame 7, at one side of aiming housing aperture 70. Connector-contacts 4a and 4b are positioned in aiming housing 10 so that, as seen in FIG. 26, the mounting of laser diode 5a in lead frame 7 brings each connector-contact into electrical connection with its laser diode lead 77; particularly, the mounting of laser diode 5a in lead frame 7 presses each contacting end 4a' against its corresponding laser diode lead 77, and also compels contacting end 4b' into contact with base 81 of laser diode 5a. Preferably connector-contacts 4a and 4b—and particularly contacting ends 4a' and 4b'—are resilient, in the manner of a spring, so that contacting ends 4a' and 4b' are biased against their corresponding leads 77 and base 81, thereby reinforcing and strengthening the contact.

Further with reference to FIG. 26, the electrical connection of connector-contacts 4a to their leads 77 is effected by the indicated contact maintained between each contacting end 4a' and its lead 77. To provide the electrical connection of connector-contact 4b with its lead 77, electrically conductive collet 82 surrounding this lead is in contact both with base 81, which also is electrically conductive, and with the lead. Contacting end 4b' accordingly is electrically connected to its lead 77 by means of laser diode base 81 and collet 82. The biasing of contacting ends 4a' and 4b' against their corresponding leads 77 and base 81 is sufficient, in itself, to maintain the thusly effected connections. However, these electrical connections can be further secured by soldering.

Figure 28:
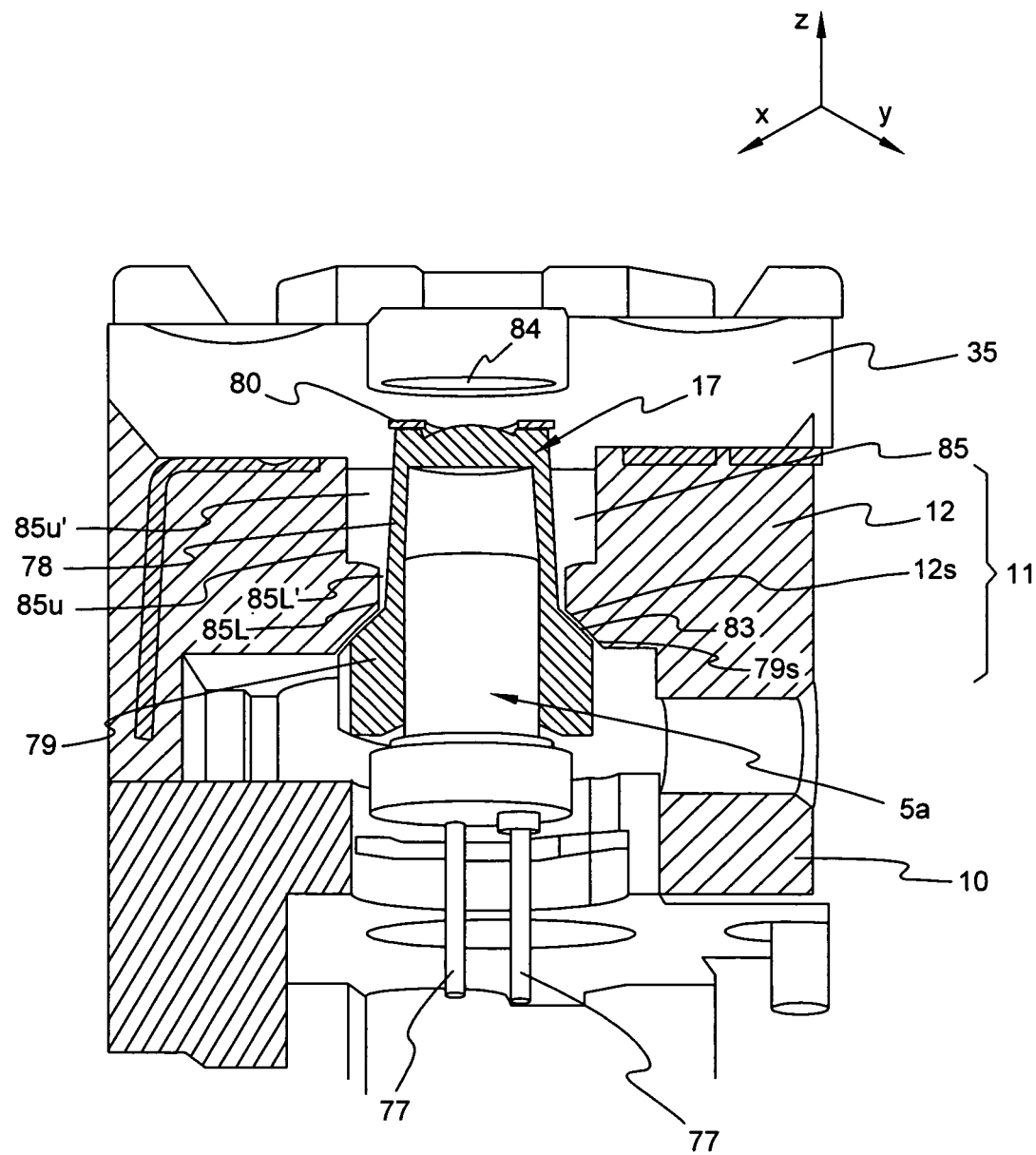
FIG. 28 is a cutaway partial perspective view of the imaging module embodiment shown in FIG. 13.

Connecting ends 4a'' and 4b'' are mounted in printed circuit board 45, in the manner of connector-receiver 1 and connector-seat 2.

Where the embodiment of aimer focusing lens 17 employed with laser diode light source 5a is the sleeved collimating lens, then illumination housing 12 may be configured to allow the assembled lens, laser diode, and (if employed) aperture stop 80 to be aligned—so that the ultimately generated aiming pattern will fall accurately on the intended target—and then fixed in place. Referring to FIG. 28 in this regard, illumination housing 12 includes a curved inner surface 12s, shaped as a rounded collar within the illumination housing. Curved inner surface 12s forms part of a sphere—i.e., it defines a sphere, in that it would form a sphere if carried to completion.

Curved inner surface 12s and curved outer surface 79s engage to form curved interface 83. Above this curved interface, neck 78 of sleeved collimating lens 17 resides in space 85, defined both by surrounding lower interior surface 85L, and by surrounding upper interior surface 85u, within illumination housing 12. Lower interior surface 85L defines a relatively narrower lower portion 85L' of space 85, and upper interior surface 85u defines a relatively wider upper portion 85u' of space 85.

With assembled laser diode 5a, lens 17, and (optional) aperture stop 80 mounted on lead frame 7 in aiming subassembly 11, curved interface 83 enables the rotation of sleeved collimation lens 17—and its incorporated laser diode 5a and (optional) seated aperture stop 80—within illumination housing 12. Neck 78 is sufficiently narrower than both lower portion 85L' and upper portion 85u', of space 85, so as to allow a limited amount of the indicated rotation to occur. This limited amount of rotation may be as little as 3 or 4 degrees, but is sufficient to allow the indicated aiming alignment. When this alignment is achieved, a suitable adhesive is employed at interface 83 to fix curved surfaces 12s and 79s together, and hold assembled sleeved lens 17, laser diode 5a, and (optional) aperture stop 80 in place.

Figure 11:
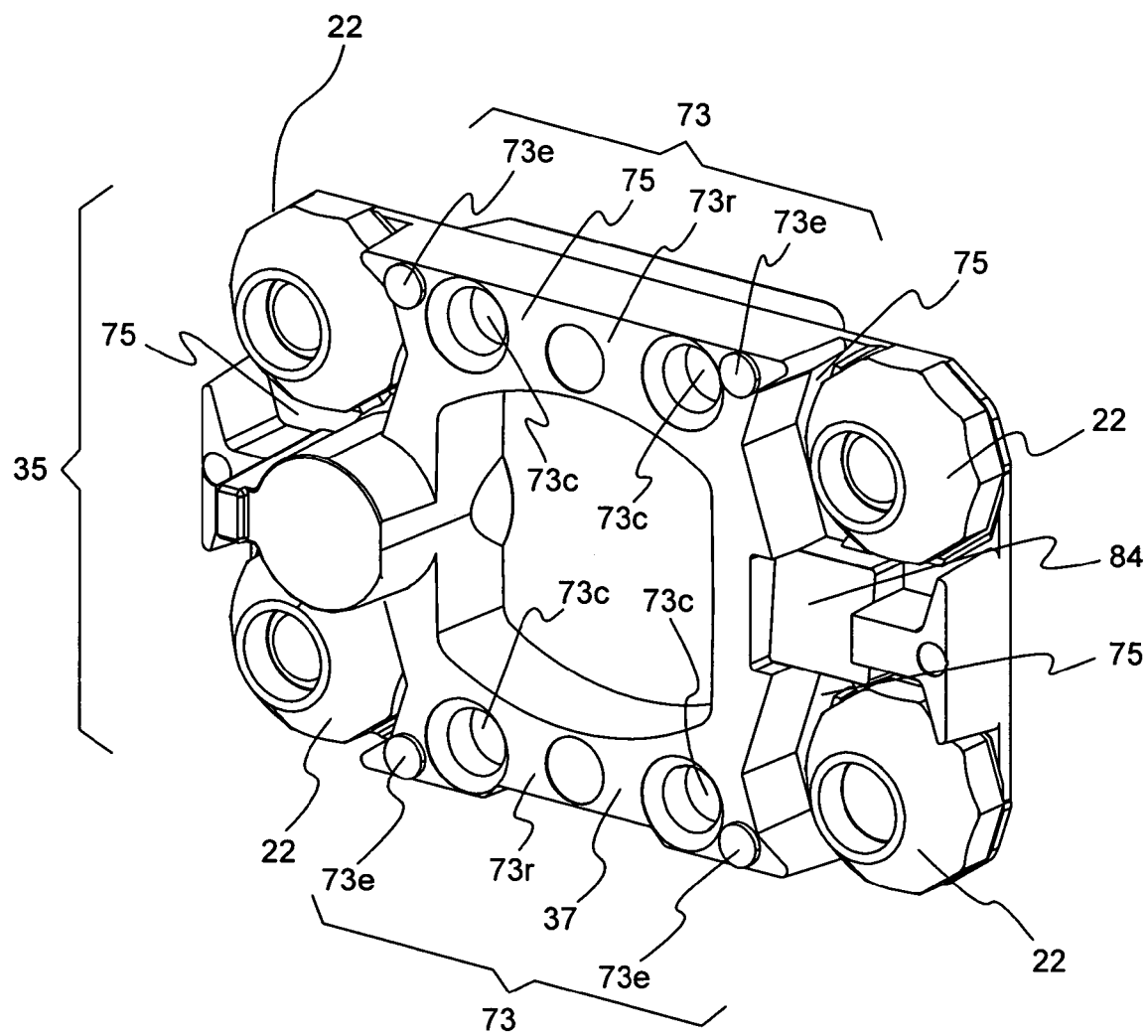
FIG. 11 is a rear perspective view of a variation of the optical plate, as employed with the imaging module embodiment shown in FIG. 13.

As shown in FIGS. 13 and 28, diffractive optical element (DOE) 84, serving as an aiming pattern generator, is positioned in front of collimating lens 17—and, where aperture stop 80 is employed, also in front of this component. Further with reference to FIG. 13, and to FIG. 11, DOE 84 can be formed in optical plate 35, thusly comprising the same material as the rest of this plate. Alternatively, as shown in FIG. 38, DOE 84 can be provided as a separate component—mounted either in optical plate 35, or by other suitable means, as are conventional in the art. As a separate component thusly mounted, DOE 84 can comprise a material conventional for this purpose, such as fused silica, or it can be embossed—employing a suitable material, such as silicon, or an appropriate plastic or sol-gel.

Mounted diffractive optical elements 84 can be those as are known in the art. In this regard, the diffractive optic element as disclosed in U.S. Pat. No. 6,060,732 can be used. Suitable commercially available diffractive optical elements include those from Digital Optics Corporation, Charlotte, N.C.

Figure 25:
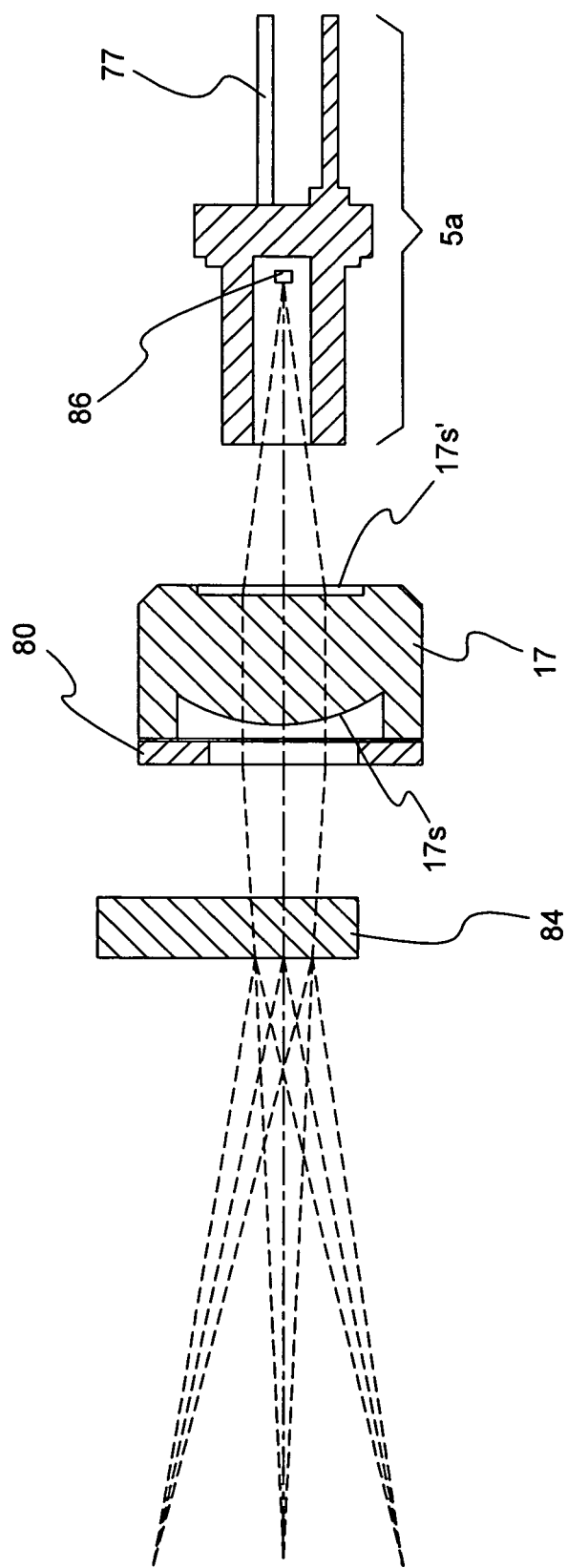
FIG. 25 is a cutaway side view light ray diagram illustrating the aiming optic and light source components of the imaging module embodiment shown in FIG. 13.

As shown in FIG. 25, light emerges from a small aperture 86 of laser diode 5a, toward aimer focusing lens 17, as a diverging beam with a Gaussian power profile—intensity is greatest at the center, and diminishes toward the edges. Aimer focusing lens 17 does not alter the Gaussian intensity distribution, but does have a collimating effect on the aiming light—the lens does not fully collimate the diverging light, but redirects it as a converging beam, configured to focus back to a point at approximately 8 inches in front of the lens.

Aperture stop 80 limits the diameter of the converging light beam received from aimer focusing lens 17, leaving the Gaussian distribution unaffected. The narrowed and converging light beam is redistributed by diffractive optical element 84 into a multiplicity of beams, with DOE 84 also leaving both the degree of convergence and the Gaussian distribution unchanged. The thusly engendered multiplicity of beams provide the aiming pattern for projection onto the intended target.

One, or multiple, trees can serve as an alternative to optical plate 35. Preferably two trees 38 are employed.

Figure 33:
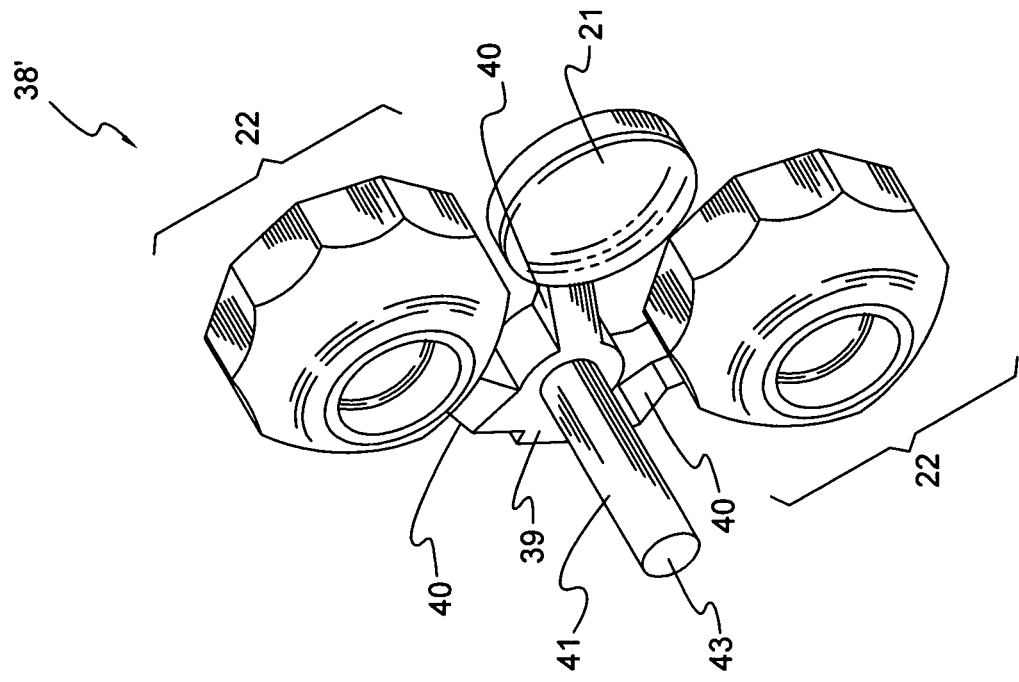
FIG. 33 is a perspective view of an optical tree, for use as an alternative to the optical plate of the imaging module embodiment shown in FIG. 13.
Figure 33:
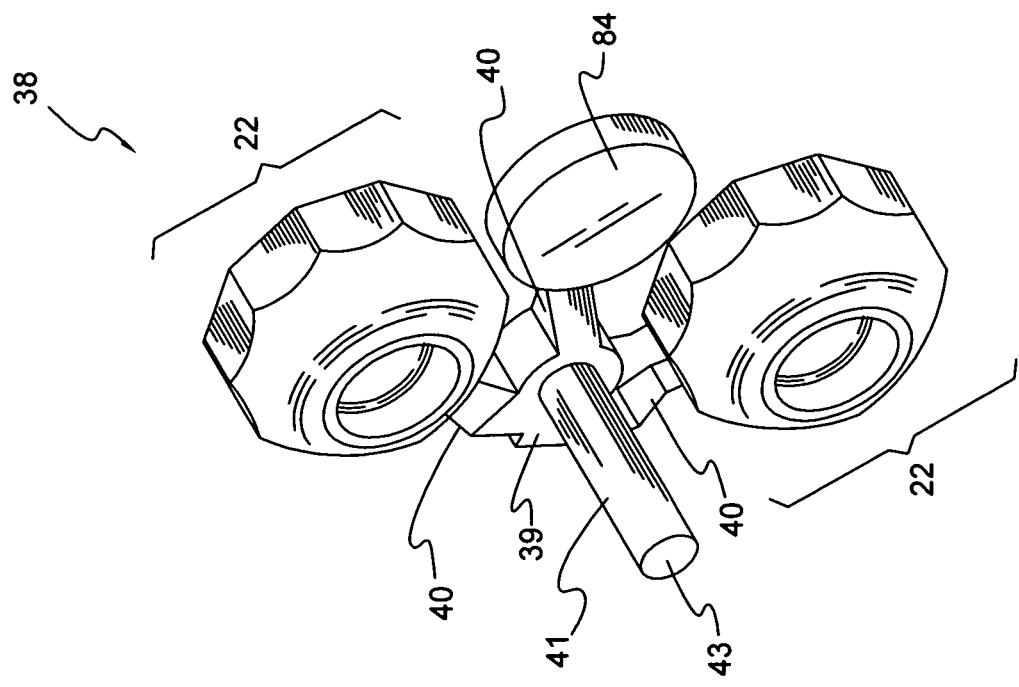

FIG. 33' shows tree 38', two of which can be employed in place of optical plate 35. Tree 38' includes hub 39, one aimer imaging lens 21, two tulip lenses 22, three arms 40—each of which joins one of the lenses to hub 39—and shank 41 extending from hub 39. A variation of tree 38', shown in FIG. 33 as tree 38, is for use when a laser diode is employed as the aiming light source 5a. Tree 38 has diffractive optical element 84 in place of aimer imaging lens 21. With an imaging module of the invention that has a single aiming laser diode 5a, either a tree 38 or a tree 38'—or any suitable variation, such as a tree with neither lens 21 nor element 84—may be used as the other tree.

All of hub 39, aimer imaging lens 21 (or DOE 84), tulip lenses 22, arms 40, and shank 41 preferably are formed in tree 38 or 38', which accordingly is provided as a single piece, as with optical plate 35. Also as with optical plate 35, tree 38 or 38' preferably is molded from a transparent plastic, with the same plastics also being preferable and suitable.

Figure 34:
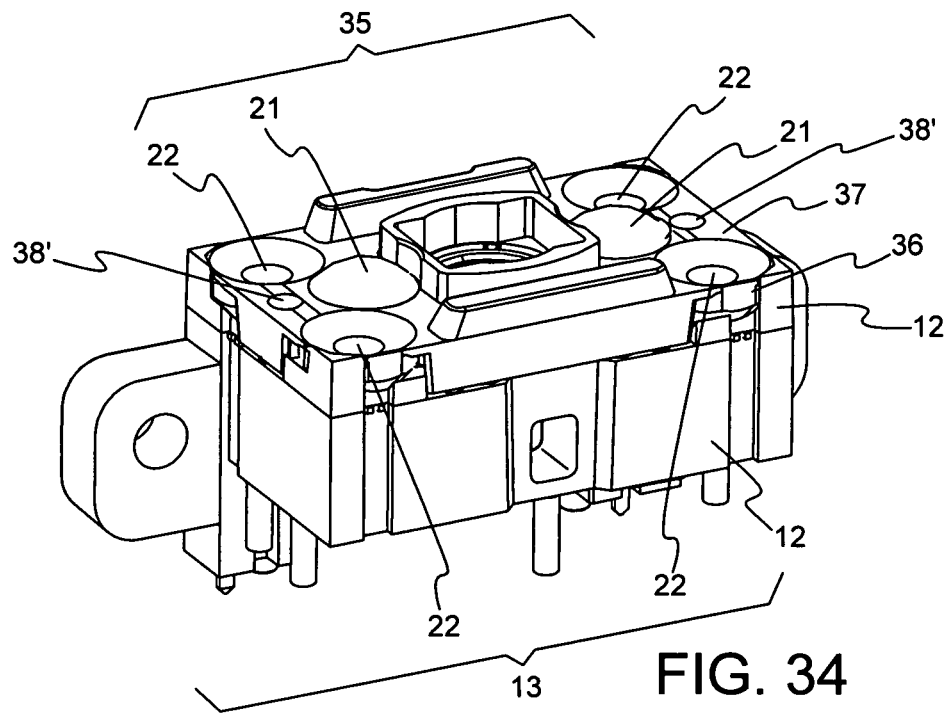
FIG. 34 is a perspective view, in the assembled state, of a variation of the imaging module embodiment shown in FIG. 8, having two of the FIG. 33' trees in place of the optical plate.
Figure 34:
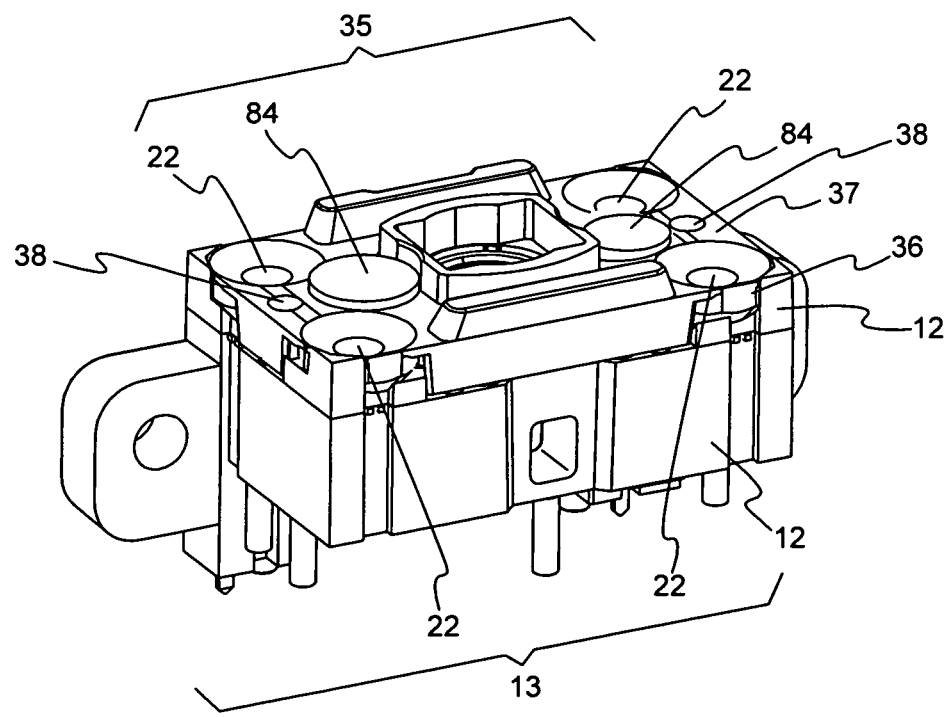

FIGS. 34 and 34' show variations—of the imaging module embodiments seen in FIGS. 8 and 13, respectively—with two trees 38' or 38 in place of optical plate 35. The trees 38' or 38 are mounted in a variation of illumination housing 12, and secured therein by heat staking. In this process, shank 41 is inserted through an illumination housing aperture to protrude therethrough. To secure a tree 38' or 38 to housing 12, the shank portion extending beyond housing 12 is deformed into a head 43 by suitable means, such as use of a heating element or an ultrasonic welder.

Figure 9:
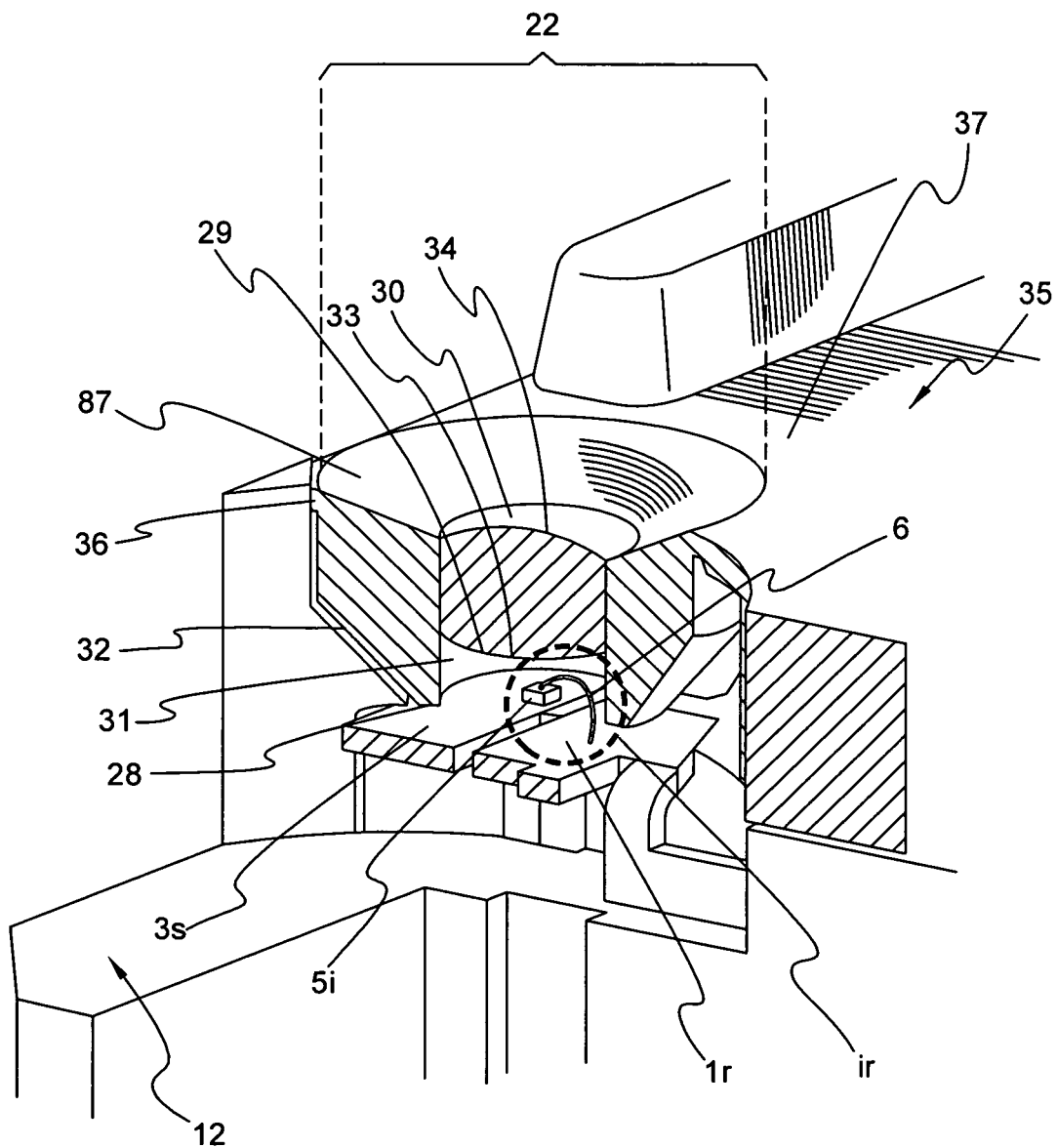
FIG. 9 is a cutaway perspective view, in the assembled state, of the illumination optic and light source components of the imaging module embodiment shown in FIG. 8.

Corresponding to spacer 36 as shown in FIG. 9, this embodiment likewise includes one, or multiple, spacers for preventing interference with the internal reflection characterizing tulip lens or lenses 22. Here, a spacer is provided as a flange, or rim, that is formed in illumination housing 12, and that surrounds or encircles its tulip lenses 22. Alternatively, the encircling or surrounding rim or flange instead can be formed in its tulip lenses 22. And as a third alternative, the encircling or surrounding rim or flange can be an independently formed component, abutting and separating tulip lens 22 from illumination housing 12. And where internal reflection is not employed, for light redirection, a spacer or spacers still may be present, but are not required.

In further embodiments of the invention, the only light source or sources incorporated in the imaging module are one or multiple aiming light sources; there are no separate illumination light sources, or their appurtenant components. One such further embodiment, as a variation of the module represented in FIG. 8, also employs LED dies as the aiming light sources 5a—like the FIG. 8 module. In yet another embodiment, as a variation of the module represented in FIG. 13, the aiming light source 5a is a laser diode—as with the FIG. 13 module. For each of the two indicated further module embodiments—with no dedicated illumination light sources being provided—the optical plate that corresponds to optical plate 35, of the FIGS. 8 and 13 modules, accordingly includes no illumination optics, and the subassembly that corresponds to the FIGS. 8 and 13 subassembly 13 correspondingly is without a lead frame, illumination light sources, bonding wires, or open spaces 15 for exposing areas of lead frame components.

In addition to precise lead frame placement within the housing—which thusly permits exact positioning of the light sources to achieve optimal performance with their respective optics—the housing mounted lead frame of the invention provides additional advantages. These benefits are heat dissipation, and added structural support for the imaging module.

Light sources employed in the imaging module can be capable of producing considerable heat during operation. If no means are provided for removal of this heat, it adversely affects the efficiency of the LED dies, and may shorten their useful life span.

Multiple features of the lead frame contribute to bringing heat away from the mounted light sources. Connector-seats, interconnectors, and connector-contacts that have a heat dissipating function—whether or not they include discernable heat dissipator sections—act to disseminate the heat that they draw away from their mounted light sources into the housing, and the ambient environment.

Connector-seats and connector-contacts also act to conduct heat, especially from their particular mounted light sources, down into the circuit board to which they are secured. The heat flows into the aperture copper plating and solder that thermally, electrically, and physically connect connector-seats and connector-contacts to the printed circuit board, and in turn this copper plating and solder conduct the heat into the printed circuit board, wherein it is dissipated.

To an extent, the solder also disseminates the heat into the ambient environment. Also, with the ends of the connector-seats and the connector-contacts protruding out of the circuit board, a certain limited amount of heat is also released into the ambient environment by these means. However, particularly because of the small surface area of the exposed ends of connector-seats and connector-contacts, a far greater proportion of the heat from these components is directed into the circuit board for dissipation.

No light sources are mounted on connector-receivers. However, to the extent that heat reaches connector-receivers—which are also connected by copper plating and solder to the circuit board, and likewise protrudes therefrom—connector-receivers perform in the same manner with respect to heat removal as do connector-seats and connector-contacts.

As to the matter of structural support, the housed lead frame or frames anchor the subassemblies to the printed circuit board, and contribute to holding the subassemblies and the printed circuit board together. In this manner, lead frames add to the rigidity and strength of the assembled imaging module.

Imaging modules of the invention are broadly suitable as components for imaging devices and data collection devices, particularly image signal generating data collection devices. Among such devices are bar code scanners, optical character recognition (OCR) readers, portable data terminals, personal data assistants, transaction terminals, video cameras, digital cameras, cellular phones, and medical viewing instruments.

Figure 35:
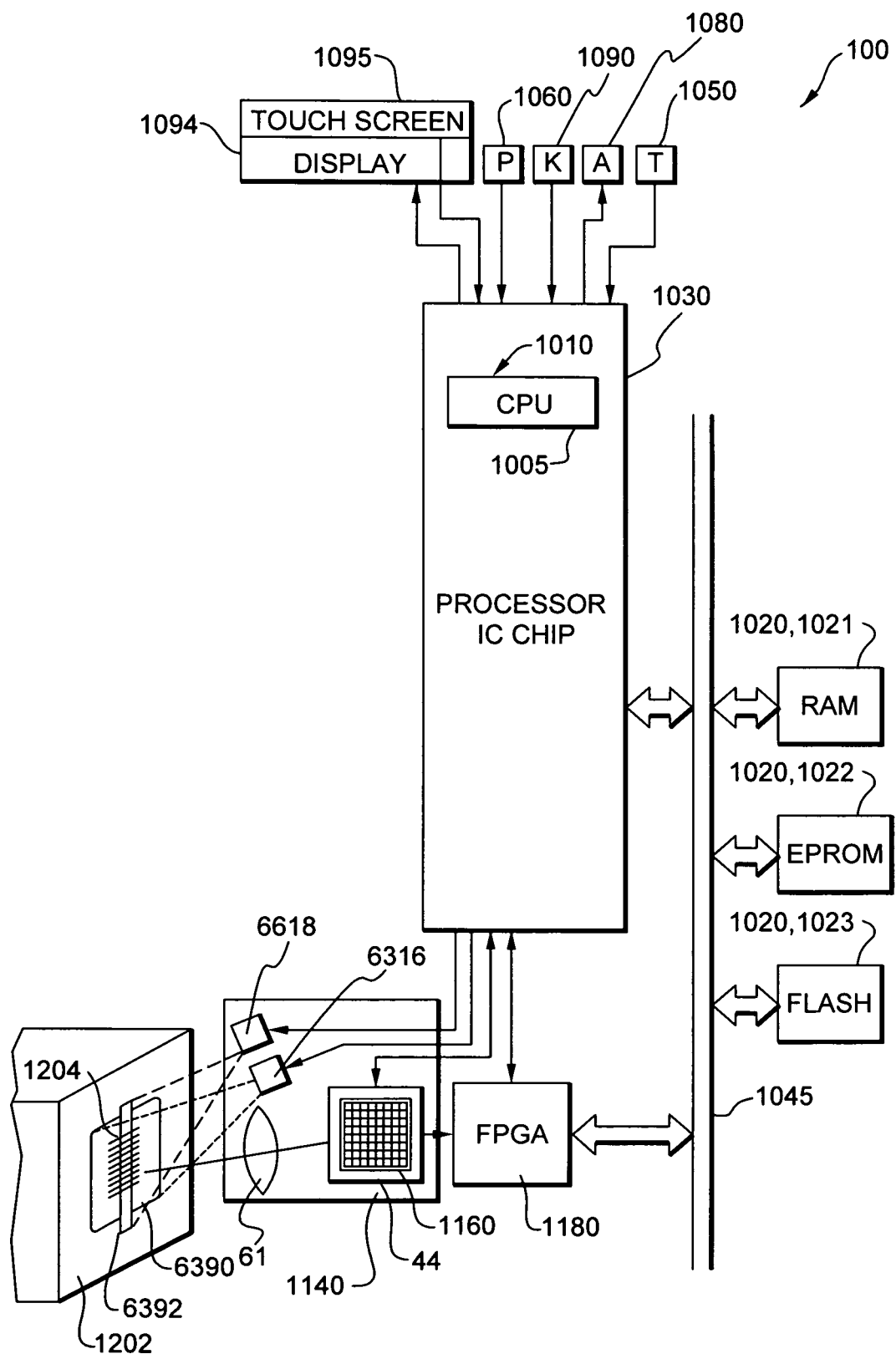
FIG. 35 is a block diagram of a mobile data collection device incorporating an imaging module of the invention.

A block diagram of mobile data collection device 100, incorporating the imaging module of the invention, is shown in FIG. 35. By operation of a control circuit 1010, device 100 receives and processes various input such as location information data and transaction data, and controls various output such as the output of various collected transaction data. In the embodiment of FIG. 35, control circuit 1010 includes a central processing unit or CPU 1005. CPU 1005 may be disposed on processor IC chip 1030, while memory 1020 may be incorporated partially or entirely in IC chip 1030 and partially or entirely in a plurality of memory IC chips such as EPROM IC chip 1022, RAM IC chip 1021, and flash IC chip 1023. EPROM IC chip 1022, RAM IC chip 1021, and flash IC chip 1023 or other nonvolatile storage devices may be in communication with microprocessor IC chip 1030 via system bus 1045. Processor IC chip 1030 operates in accordance with an Operating System (OS) which is typically loaded into RAM 1021 when data collection device 100 is booted up. The device's operating system enables processor IC chip 1030 to recognize input from user input interface components, e.g., trigger 1050, keyboard/keypad 1090, send output to output interfaces, e.g., display 1094, schedule tasks, manage files and directories and control other components such as input/output devices. Examples of suitable operating systems for device 100 include WINDOWS XP, LINUX, WINDOWS CE, OSX.

Figure 36:
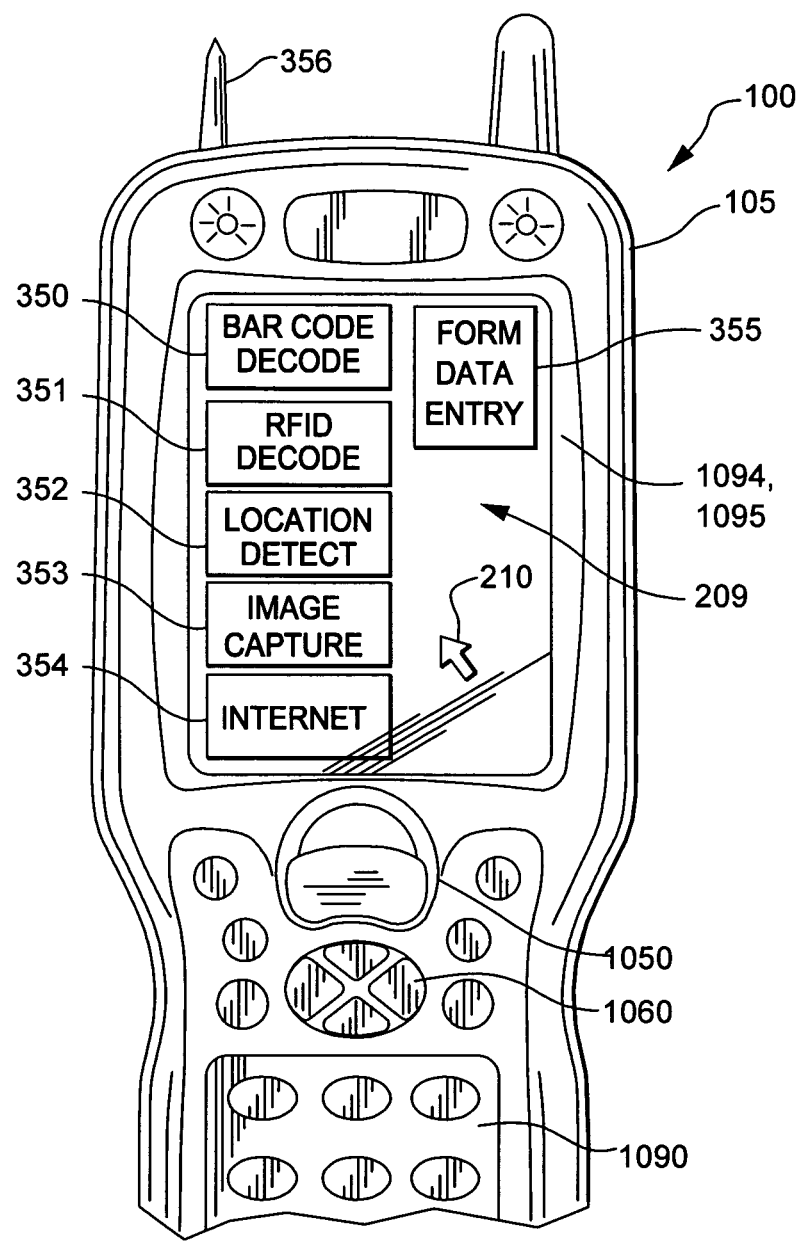
FIG. 36 is a physical view of a mobile data collection device incorporating an imaging module of the invention.

Referring to further elements of device 100, device 100 includes a display 1094. Display 1094 may have an associated touch screen overlay 1095 so that display 1094 operates as a data input interface. The combination of display 1094 and touch screen overlay 1095 can be regarded as a "touch screen." Device 100 may further have a keyboard/keypad 1090 enabling input of data and an acoustic speaker or beeper 1080 to generate audible feedback to the user. Device 100 may also include a graphical user interface ("GUI") as illustrated in FIG. 36. GUI 209 includes a pointer 210. Pointer 210 is moved by an operator to select between various displayed (sometimes referred to as "virtual") control buttons displayed on display 1094. Pointer 210 may be moved during web browsing to select a text or icon hyperlink for highlighting. Control buttons may also be displayed for selecting between various menu options. Device 100 can be configured so that displayed menu options are selected by physically depressing a displayed icon or text, with use of a finger or stylus. As shown in FIG. 36, the control buttons may be a series of icons 350, 351, 352, 353, 354, and 355. Selecting one of the icons changes the mode of operation of the device in accordance with the selected icon. Device 100 includes a pointer controller 1060 enabling movement of pointer 210. In the specific embodiment of FIG. 36, pointer controller 1060 is provided by an arrow navigation matrix. Pointer controller 1060 may also be provided by such means as are used in the art, e.g., a trackball, mouse, or a joystick. Device 100 further includes a trigger 1050 for controlling various data input units of device 100. Trigger 1050 is in communication with control circuit 1010.

Device 100 as shown in FIG. 35 also includes an image signal generating system provided by two dimensional solid state image sensor 1160, available in such technologies as CCD, CMOS, and CID. Two-dimensional solid state image sensors generally have a plurality of photosensor picture elements ("pixels") which are formed in a pattern including a plurality of rows and a plurality of columns of pixels. Device 100 further includes an imaging optics—lens barrel assembly 61, of the imaging module of the invention—focusing an image onto an active surface of image sensor 1160. Image sensor 1160 may be incorporated on an image sensor IC chip—image sensor chip 44, of the imaging module of the invention—having disposed thereon image sensor control circuitry, image signal conditioning circuitry, and an analog-to-digital converter. Device 100 may further include a field programmable gate array 1180 ("FPGA"). Operating under the control of control circuit 1010, FPGA 1180 manages the capture of image data into RAM 1021.

When trigger button 1050 is actuated with device 100 in a bar code decode mode of operation, control circuit 1010 automatically sends appropriate control signals to image sensor chip 44. Image sensor chip 44 in response thereto automatically exposes photosensitive pixels of image sensor 1160 to light and generates image signals. The image signals are thereafter automatically converted into digital values by an analog-to-digital converter, which here is integrated into IC chip 44; in another embodiment, the analog-to-digital converter may be external to IC chip 44. The digital values are received by FPGA 1180 and transferred into RAM 1021 to capture an electronic image representation of a substrate 1202 carrying indicia, such as a bar code symbol 1204. In accordance with a bar code decoding program stored in ROM 1022, control circuit 1010 may attempt to decode a bar code symbol represented in the captured electronic image representation. The capture of image data and decoding of image data occur automatically in response to a trigger signal being generated. A trigger signal can be generated when trigger 1050 is actuated. Control circuit 1010 may be configured to continuously capture image data and attempt to decode bar code symbols represented therein as long as trigger 1050 is actuated. The electronic image representation captured into RAM 1021 may be an image map having a pixel value (gray scale, color scale) for each pixel of the image sensor.

In addition to having a decode mode of operation, device 100 may also be configured to include an image capture mode of operation. In an image capture mode of operation, control circuit 1010 captures an electronic image representation in response to trigger button 1050 being actuated without attempting to decode a decodable symbol represented therein. The captured electronic image representation may be one or more of (i) stored into a designated memory location of memory 1020, (ii) transmitted to an external spaced apart device automatically or in response to a user input command, or (iii) displayed on display 1094 automatically or in response to a user input command.

Imaging assembly 1140, which includes image sensor chip 44 and imaging optics 61, is the imaging module of the invention. As shown in FIG. 35, illumination configuration or subsystem 6316 projects an illumination pattern 6390 onto substrate 1202, while aiming configuration or subsystem 6618 projects an aiming pattern 6392 onto substrate 1202. Subsystem 6316 includes illumination light sources 5i and illumination lenses 22. When aiming light sources 5a are LED dies or leaded LED lamps, aiming subsystem 6618 includes these light sources, along with anamorphic aimer focusing lenses 17, aiming slits 26, and aimer imaging lenses 21; when the aiming light source is a laser diode 5a, aiming subsystem 6618 includes the laser diode 5a, along with its collimating aimer focusing lens 17, (optional) aperture stop 80, and diffractive optical element 84. Although aimer focusing lens 17 and diffractive optical element 84 are described and shown herein as separate components, it is understood that in some circumstances the diffractive technology would allow the integration of the laser focusing lens 17 into the diffractive optical pattern generator element 84, to form a single diffractive optical element 84 that both generates the optical pattern and focuses the lens in a single unit. It is accordingly further understood that such integration of components, to provide the indicated single element, is within the scope of the invention.

Imaging module (image engine) 1140 can be associated with a decode circuit which decodes various 1D and 2D bar codes, OCR fonts, and which is equipped with various image capture modes of operation. In the circuit of FIG. 35, control circuit 1010, in response to receipt of a trigger signal, captures an image and decodes a bar code to produce a decoded out message. Circuit 1030 may decode such symbologies as PDF417, MicroPDF417, MaxiCode, Data Matrix, QR Code, Aztec, Aztec Mesa, Code 49, UCC Composite, Snowflake, Dataglyphs, Code 39, Code 128, Codabar, UPC/EAN, Interleaved 2 or 5, RSS, Code 93, Codablock, BC 412, Postnet (US), Planet Code, BPO 4 State, Canadian 4 State, Japanese Post, Kix (Dutch Post) and OCR-A, OCR-B. This decoding is accomplished with the use of software stored in memory 1020, in accordance with conventional practice as is known and employed in the art.

Finally, although the invention has been described with reference to particular means, materials, and embodiments, it should be noted that the invention is not limited to the particulars disclosed, and extends to all equivalents within the scope of the claims.

What is claimed is:

1. An imaging module comprising:
   (a) an image sensor;
   (b) at least one housing for a light source support;
   (c) at least one light source support fixed in the at least one housing, the fixing of the at least one light source support in the at least one housing providing for precise placement, of the at least one light source support, in a predetermined position in the at least one housing; and
   (d) at least one light source mounted on the at least one light source support, the at least one light source comprising at least one member selected from the group consisting of aiming light sources and illumination light sources.

2. The imaging module of claim 1, wherein:
   (a) the at least one housing comprises an aiming housing;
   (b) the at least one light source support comprises an aiming light source support, fixed in the aiming housing; and
   (c) the at least one light source comprises at least one aiming light source, mounted on the aiming light source support.

3. The imaging module of claim 2, wherein the at least one aiming light source comprises at least one LED die, the imaging module further comprising at least one anamorphic aimer focusing lens, the at least one anamorphic aimer focusing lens comprising an anamorphic aimer focusing lens for each LED die aiming light source, each anamorphic aimer focusing lens being situated in front of its LED die aiming light source, for collecting and focusing light emanating from the LED die aiming light source.

4. The imaging module of claim 1, wherein:
   (a) the at least one housing comprises an illumination housing;
   (b) the at least one light source support comprises an illumination light source support, fixed in the illumination housing; and
   (c) the at least one light source comprises at least one illumination light source, mounted on the illumination light source support.

5. The imaging module of claim 4, wherein the at least one illumination light source comprises at least one LED die, the imaging module further comprising at least one converging lens illumination optic, the at least one converging lens illumination optic comprising a converging lens illumination optic for each LED die illumination light source, each converging lens illumination optic being situated in front of its LED die illumination light source, for collecting and distributing light emanating from the LED die illumination light source.

6. The imaging module of claim 1, wherein:
   (a) the at least one housing comprises an aiming housing and an illumination housing;
   (b) the at least one light source support comprises an aiming light source support, fixed in the aiming housing, and an illumination light source support, fixed in the illumination housing; and
   (c) the at least one light source comprises at least one aiming light source, mounted on the aiming light source support, and at least one illumination light source, mounted on the illumination light source support.

7. The imaging module of claim 1, wherein:
   (a) the at least one housing comprises an aiming housing;
   (b) the at least one light source support comprises an aiming light source support, fixed in the aiming housing; and
   (c) the at least one light source comprises at least one aiming light source mounted on the aiming light source support, the at least one aiming light source comprising a laser diode.

8. An imaging module comprising:
   (a) an image sensor;
   (b) at least one illumination housing, for an illumination light source support;
   (c) at least one illumination light source support fixed in the at least one illumination housing, the fixing of the at least one illumination light source support, in the at least one illumination housing, providing for precise placement, of the at least one illumination light source support, in a predetermined position in the at least one illumination housing;
   (d) at least one LED die illumination light source mounted on the at least one illumination light source support; and
   (e) at least one tulip lens illumination optic, the at least one tulip lens illumination optic comprising a tulip lens illumination optic for each LED die illumination light source, each tulip lens illumination optic being situated in front of its LED die illumination light source, for collecting and distributing light emanating from the LED die illumination light source.

9. An imaging module comprising:
   an image sensor;
   at least one housing for a light source support;
   at least one light source support fixed in the at least one housing, the fixing of the at least one light source support, in the at least one housing, providing for precise placement, of the at least one light source support, in a predetermined position in the at least one housing;
   at least one light source mounted on the at least one light source support, the at least one light source comprising at least one member selected from the group consisting of aiming light sources and illumination light sources; and
   a circuit board, wherein:
   (a) the image sensor is mounted on the circuit board;
   (b) the at least one light source support comprises at least one lead frame, the at least one lead frame comprising support components fixed in the at least one housing and contributing to the formation of at least one electrical circuit, the fixing of the support components in the at least one housing providing for precise placement, of the support components, in predetermined positions in the at least one housing, the support components comprising:
      (i) a connector-receiver for:
         (A) connecting at least one electrical circuit to the circuit board; and
         (B) providing at least one attachment site, each for attachment of an electrically conductive bridging component connected to a light source mounted on another support component; and (ii) a connector-seat for:
(A) connecting at least one electrical circuit to the circuit board; and
(B) providing at least one mounting site, each for seating a light source; and
(c) the at least one light source comprises at least one light source each seated at a mounting site.

10. The imaging module of claim 9, wherein the support components are embedded in the at least one housing.

11. The imaging module of claim 9, wherein:
(a) the at least one mounting site comprises multiple mounting sites, each for seating a light source; and
(b) the at least one light source comprises multiple LED dies having substantially the same forward voltage, each LED die seated at a mounting site.

12. The imaging module of claim 9, wherein:
(a) the support components further comprise at least one interconnector for:
(i) providing at least one attachment site, each for attachment of an electrically conductive bridging component connected to a light source mounted on another support component; and
(ii) providing at least one mounting site, each for seating a light source; and
(b) the at least one light source comprises multiple light sources, comprising
(i) at least one light source, each seated at a connector-seat mounting site; and
(ii) at least one light source, each seated at an interconnector mounting site.

13. The imaging module of claim 12, wherein at least one support component, selected from the group consisting of the connector-seat and the at least one interconnector, further is for drawing heat away from a seated light source, and comprises at least one heat dissipator section for drawing heat away from a seated light source.

14. An imaging module comprising:
an image sensor;
at least one housing for a light source support;
at least one light source support fixed in the at least one housing, the fixing of the at least one light source support, in the at least one housing, providing for precise placement, of the at least one light source support, in a predetermined position in the at least one housing;
at least one light source mounted on the at least one light source support, the at least one light source comprising at least one member selected from the group consisting of aiming light sources and illumination light sources; and
a circuit board, wherein:
(a) the image sensor is mounted on the circuit board;
(b) the at least one housing comprises an aiming housing;
(c) the at least one light source support comprises an aiming lead frame, the aiming lead frame comprising aiming support components fixed in the aiming housing and contributing to the formation of at least one electrical circuit, the fixing of the aiming support components in the aiming housing providing for precise placement, of the aiming support components, in a predetermined position in the aiming housing, the aiming support components comprising:
(i) an aiming connector-receiver for:
(A) connecting at least one electrical circuit to the circuit board; and
(B) providing at least one attachment site, each for attachment of an electrically conductive bridging component connected to an aiming light source mounted on another aiming support component;
(ii) an aiming connector-seat for:
(A) connecting at least one electrical circuit to the circuit board; and
(B) providing at least one mounting site, each for seating an aiming light source; and
(iii) an aiming interconnector for:
(A) providing at least one attachment site, each for attachment of an electrically conductive bridging component connected to an aiming light source mounted on another aiming support component; and
(B) providing at least one mounting site, each for seating an aiming light source; and
(d) the at least one light source comprises multiple aiming light sources, comprising:
(i) an aiming light source seated at an aiming connector-seat mounting site; and
(ii) an aiming light source seated at an aiming interconnector mounting sight.

15. The imaging module of claim 14, wherein the multiple aiming light sources comprise LED dies, the imaging module further comprising multiple anamorphic aimer focusing lenses, each situated in front of a different LED die aiming light source for collecting and focusing light emanating from the LED die aiming light source.

16. The imaging module of claim 14, wherein:
(a) the at least one housing further comprises an illumination housing;
(b) the at least one light source support further comprises an illumination lead frame, the illumination lead frame comprising illumination support components fixed in the illumination housing and contributing to the formation of at least one electrical circuit, the fixing of the illumination support components in the illumination housing providing for precise placement, of the illumination support components, in a predetermined position in the illumination housing, the illumination support components comprising:
(i) an illumination connector-receiver for:
(A) connecting at least one electrical circuit to the circuit board; and
(B) providing at least one attachment site, each for attachment of an electrically conductive bridging component connected to an illumination light source mounted on another illumination support component;
(ii) an illumination connector-seat for:
(A) connecting at least one electrical circuit to the circuit board; and
(B) providing at least one mounting site, each for seating an illumination light source; and
(iii) multiple illumination interconnectors, comprising:
(A) a first illumination interconnector for:
(I) providing at least one attachment site, each for attachment of an electrically conductive bridging component that is connected to an illumination light source seated at an illumination connector-seat mounting site; and
(II) providing at least one mounting site, each for seating an illumination light source;
(B) a second illumination interconnector for:
(I) providing at least one attachment site, each for attachment of an electrically conductive bridging component that is connected to an illumination light source seated at a first illumination interconnector mounting site; and
(II) providing at least one mounting site, each for seating an illumination light source; and
(C) a third illumination interconnector for:
(I) providing at least one attachment site, each for attachment of an electrically conductive bridging component that is connected to an illumination light source seated at a second illumination interconnector mounting site; and
(II) providing at least one mounting site, each for seating an illumination light source; and
(c) the at least one light source further comprises multiple illumination light sources, comprising:
(i) an illumination light source seated at an illumination connector-seat mounting site;
(ii) an illumination light source seated at a first illumination interconnector mounting site;
(iii) an illumination light source seated at a second illumination interconnector mounting site; and
(iv) an illumination light source seated at a third illumination interconnector mounting site.

17. The imaging module of claim 16, wherein the multiple illumination light sources comprise LED dies, the imaging module further comprising multiple converging lens illumination optics, each situated in front of a different LED die illumination light source for collecting and distributing light emanating from the LED die illumination light source.

18. The imaging module of claim 17, wherein the multiple converging lens illumination optics comprise multiple tulip lens illumination optics.

19. An imaging module comprising:
an image sensor;
at least one aiming housing, for an aiming light source support;
at least one aiming light source support fixed in the at least one aiming housing, the fixing of the at least one aiming light source support, in the at least one aiming housing, providing for precise placement, of the at least one aiming light source support, in a predetermined position in the at least one aiming housing;
at least one aiming light source mounted on the at least one aiming light source support, the at least one aiming light source comprising a laser diode; and
a circuit board, wherein:
(a) the image sensor is mounted on the circuit board;
(b) the laser diode comprises at least one lead;
(c) the aiming light source support comprises an aiming lead frame, the aiming lead frame comprising at least one aiming support component fixed in the aiming housing and contributing to the formation of at least one electrical circuit, the fixing of the at least one aiming support component in the aiming housing providing for precise placement, of the at least one aiming support component, in a predetermined position in the aiming housing, the at least one aiming support component comprising at least one connector-contact, the at least one connector-contact comprising a connector-contact:
(i) for each laser diode lead;
(ii) for connecting at least one electrical circuit to the circuit board; and
(iii) for effecting electrical connection with its laser diode lead.

20. The imaging module of claim 19, wherein at least one connector-contact further is for drawing heat away from the laser diode, and comprises at least one heat dissipator section for drawing heat away from the laser diode.

21. The imaging module of claim 19, wherein, with the laser diode mounted in the aiming lead frame, each connector-contact is brought into electrical connection with its laser diode lead.

22. The imaging module of claim 21, wherein each connector-contact comprises a resilient contacting end, biased into electrical connection with its laser diode lead.

23. An imaging module comprising:
an image sensor;
at least one aiming housing, for an aiming light source support;
at least one aiming light source support fixed in the at least one aiming housing, the fixing of the at least one aiming light source support, in the at least one aiming housing, providing for precise placement, of the at least one aiming light source support, in a predetermined position in the at least one aiming housing;
at least one aiming light source mounted on the at least one aiming light source support, the at least one aiming light source comprising a laser diode; and
an aimer focusing lens for focusing light emanating from the laser diode, the aimer focusing lens comprising a sleeved aimer focusing lens in which the laser diode resides, the sleeved aimer focusing lens comprising:
(a) an upper lens surface and a lower lens surface, situated in front of the laser diode;
(b) a neck situated below the lower lens surface;
(c) a base situated below the neck, and comprising a rounded lip that:
(i) surrounds the base, joining the base to the neck; and
(ii) provides a curved outer surface that defines a sphere.

24. The imaging module of claim 23, wherein:
(a) the at least one housing further comprises an illumination housing;
(b) the at least one light source support further comprises an illumination light source support, fixed in the illumination housing;
(c) the at least one light source further comprising at least one illumination light source, mounted on the illumination light source support;
the illumination housing:
defining an inner space for accommodating the neck of the sleeved aimer focusing lens, where the laser diode, residing in the sleeved aimer focusing lens, is mounted in the aiming lead frame; and
comprising an inner rounded collar situated below the defined inner space, the inner rounded collar providing a curved inner surface that defines a sphere;
the curved inner surface of the illumination housing, and the curved outer surface of the sleeved aimer focusing lens, forming a curved interface;
the curved interface enabling rotation, of the sleeved aimer focusing lens and the laser diode residing therein, to achieve alignment, thereby allowing the curved inner and outer surfaces to be fixed together, at the curved interface, when the alignment is achieved.

25. The imaging module of claim 24, the illumination housing inner space comprising:
(a) a wider upper space defined by a surrounding upper interior surface; and
(b) a narrower lower space defined by a surrounding lower interior surface;
thereby limiting rotation of the sleeved aimer focusing lens and the laser diode residing therein.

* * * * *